US012272265B2

(12) United States Patent
Naufel

(10) Patent No.: US 12,272,265 B2
(45) Date of Patent: Apr. 8, 2025

(54) SYSTEMS, METHODS, AND APPARATUSES FOR IMPLEMENTING AN ADAPTIVE AND SCALABLE AI-DRIVEN PERSONALIZED LEARNING PLATFORM

(71) Applicant: Arizona Board of Regents on Behalf of Arizona State University, Scottsdale, AZ (US)

(72) Inventor: Mark Naufel, Scottsdale, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/661,040

(22) Filed: May 10, 2024

(65) Prior Publication Data
US 2024/0379019 A1    Nov. 14, 2024

Related U.S. Application Data

(60) Provisional application No. 63/501,879, filed on May 12, 2023.

(51) Int. Cl.
*G09B 5/00* (2006.01)
*G06F 40/40* (2020.01)
(Continued)

(52) U.S. Cl.
CPC .............. *G09B 7/02* (2013.01); *G06F 40/40* (2020.01); *G06N 3/0895* (2023.01)

(58) Field of Classification Search
CPC ............. G09B 7/00; G09B 7/02; G06F 40/40; G06N 3/08495
See application file for complete search history.

(56) References Cited

U.S. PATENT DOCUMENTS 8,412,514 B1 *   4/2013   Feng ..................... G06F 16/338
                                                            704/10
10,275,713 B2    4/2019   Bhat et al.
(Continued)

FOREIGN PATENT DOCUMENTS

WO        2021243903 A1    12/2021

OTHER PUBLICATIONS

Bonner et al., "Large Language Model-Based Artificial Intelligence in the Language Classroom: Practical Ideas for Teaching", Teaching English with Technology, vol. 23, No. 1, pp. 23-41, Retrieved from the Internet on Oct. 7, 2024 from URL: https://files.eric.ed.gov/fulltext/EJ1383526.pdf.

(Continued)

*Primary Examiner* — Peter R Egloff
(74) *Attorney, Agent, or Firm* — Shumaker & Sieffert, P.A.

(57) ABSTRACT

Processing circuitry of a learning platform may be configured to maintain a graph database describing student learners. Processing circuitry may obtain new student learner data and load the data into the graph database. Processing circuitry may receive an engagement or interaction from the new student learner and responsively extract new learnings about the new student learner which are loaded into the graph database. Processing circuitry may receive an inquiry from the new student learner and in response, extract the new student learner data and the new learnings from the graph database and contextualize, using a large language model, a learning unit from the educational content provided by the learning platform as a response to the inquiry using the new student learner data and the new learnings. Processing circuitry may further return the learning unit contextualized by the large language model to the new student learner.

20 Claims, 19 Drawing Sheets

(51) Int. Cl.
  *G06N 3/0895* (2023.01)
  *G09B 7/02* (2006.01)

(56) References Cited

U.S. PATENT DOCUMENTS

| | | | | |
|---|---|---|---|---|
| 2017/0358234 | A1* | 12/2017 | Bohlen | G09B 5/12 |
| 2018/0075770 | A1 | 3/2018 | Falash et al. | |
| 2021/0124782 | A1 | 4/2021 | Karaca et al. | |
| 2021/0158714 | A1* | 5/2021 | Bohlen | G09B 7/077 |
| 2021/0279553 | A1 | 9/2021 | Zhu et al. | |
| 2021/0287800 | A1 | 9/2021 | Ghosh et al. | |
| 2022/0138193 | A1 | 5/2022 | Xu et al. | |
| 2022/0139245 | A1* | 5/2022 | Wilson | G06F 16/2457 434/362 |
| 2022/0310083 | A1 | 9/2022 | Mohanty et al. | |
| 2022/0414228 | A1 | 12/2022 | Difonzo et al. | |
| 2022/0415199 | A1 | 12/2022 | Venkatasubramanyam | |
| 2023/0061906 | A1 | 3/2023 | Gaur et al. | |
| 2023/0281486 | A1 | 9/2023 | Varro et al. | |
| 2024/0012953 | A1 | 1/2024 | Varro et al. | |
| 2024/0054909 | A1* | 2/2024 | Rushkin | G06F 40/232 |
| 2024/0146563 | A1* | 5/2024 | Sheth | H04L 65/1089 |
| 2024/0160955 | A1 | 5/2024 | Zhao et al. | |
| 2024/0161648 | A1* | 5/2024 | Davies | G09B 7/00 |

OTHER PUBLICATIONS

International Search Report and Written Opinion of International Application No. PCT/US2024/028892 dated Sep. 24, 2024, 9 pp.
Maddigan et al., "Chat2VIS: Generating Data Visualizations via Natural Language Using ChatGPT, Codex and GPT-3 Large Language Models", IEEE Access, vol. 11, IEEE, May 8, 2023, pp. 45181-45193.
Office Action from U.S. Appl. No. 18/644,776 dated Jul. 3, 2024, 7 pp.
Response to Office Action dated Jul. 3, 2024 from U.S. Appl. No. 18/644,776, filed Oct. 2, 2024, 16 pp.
U.S. Appl. No. 18/644,776, filed Apr. 24, 2024, naming inventors Naufel et al.
Zhu et al., "A natural language interface to a graph-based bibliographic information retrieval system", Data & Knowledge Engineering, vol. 111, Elsevier, Sep. 1, 2017, pp. 73-89.
Notice of Allowance from U.S. Appl. No. 18/644,776 dated Oct. 29, 2024, 8 pp.

* cited by examiner

SYSTEMS, METHODS, AND APPARATUSES FOR IMPLEMENTING AN ADAPTIVE AND SCALABLE AI-DRIVEN PERSONALIZED LEARNING PLATFORM

CLAIM OF PRIORITY

This application is a track one utility application of U.S. Provisional Patent Application No. 63/501,879, filed 12 May 2023, the entire contents of which is incorporated herein by reference.

TECHNICAL FIELD

Examples of the invention relate generally to the field of artificial intelligence (AI) and database technology, and more particularly, to systems, methods, and apparatuses for implementing an adaptive and scalable Artificial Intelligence (AI) driven personalized learning platform.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to examples of the claimed inventions.

Within the context of computing, artificial intelligence ("AI," "Ai," or "ai") represents the apparent "intelligence" demonstrated by computing machines, as opposed to the natural "intelligence" of humans and other animals. Artificial intelligence generally includes many sub-tasks and sub-disciplines, such as speech recognition, computer vision, language translation, and complex input mapping and data correlations, which very often overwhelm human intelligence.

Recently, artificial intelligence applications have become more commonplace, and include tools such as modern web search engines, content or product recommendation systems, human speech recognition systems, gaming engines and gaming playing AI models, as well as trained artificial intelligence models capable of generating completely new and never before seen music, lyrics, poetry, and even photo-realistic visual "AI art."

Natural Language Processing ("NLP") is a subfield of artificial intelligence that focuses on enabling computers to understand, interpret, and generate human language. Example NLP systems handle tasks including expert translation between languages, analyzing and identifying "sentiment," and general information extraction and summarization. Such NLP systems typically utilize machine learning models as part of their "training," including application of deep learning via neural networks, to capture and learn the complex patterns and structures represented within human language.

Large Language Models (LLMs) are another subfield of artificial intelligence programs capable of recognizing and generating text, among other tasks. LLMs are trained on massive sets of data, potentially consuming millions of gigabytes worth of text, utilizing a type of neural network called a transformer model. In such a way, a trained LLM model is a computer program that has been provided with a sufficient number of examples to be able to recognize and interpret human language or other types of complex data.

SUMMARY

In general, this disclosure is directed to systems, methods, and apparatuses for implementing an adaptive and scalable Artificial Intelligence (AI) driven personalized learning platform. Aspects of the invention utilize graph-based Natural Language Processing (NLP) for querying, analyzing, and visualizing complex data structures. Certain examples expand upon a contextualized Generative Pre-trained Transformer (GPT-x) to contextualize educational content for individual learners. Other examples implement a feedback loop which is specially configured to improve educational experiences by incorporating user feedback into a trained large language model (LLM) to further improve user experiences within an educational environment. In yet other examples, a learning platform utilizes a combination of improved Natural Language Processing (NLP), improved machine learning methodologies, and improved graph database technologies for enabling users to efficiently explore, analyze, and/or visualize interconnected data, uncovering hidden patterns, trends, and insights to facilitate individualized learning pathways.

Previously available data educational content delivery systems typically require users to conform to pre-established learning pathways which are common amongst large cohorts of students. Moreover, such prior tools lacked the ability to generate user-specific content at scale which at times, could discourage certain learners struggling with educational content within particular sub-disciplines.

The improved techniques described herein provide a more comprehensive and scalable personalized learning solution, capable of dynamically adapting to the needs of individual learners, to the benefit of such individual learners within an educational context. Moreover, aspects of the disclosure provide solutions enabling delivery of a rich array of learning content and formats. Such solutions are further capable of integrating advanced features such as learning analytics, collaborative learning, and emotional intelligence to enhance the learning experience.

The present state of the art may therefore benefit from the systems, methods, and apparatuses for implementing an adaptive and scalable AI-driven personalized learning platform, as is described herein.

In at least one example, processing circuitry is configured to perform a method. Such a method may include processing circuitry executing an AI large language model. In such an example, processing circuitry may maintain a graph database describing student learners subscribed to educational content provided by the learning platform. According to such an example, processing circuitry may obtain new student learner data about a new student learner subscribed to the educational content provided by the learning platform. In such an example, processing circuitry may load, into the graph database, the new student learner data within new nodes and new relationships with directionality between the new nodes and having metadata parameters within the new nodes describing the new student learner data loaded into the graph database. According to this example, processing circuitry may receive input from the new student learner as an engagement with the educational content provided by the learning platform. In response to receipt of the input from the new student learner as the engagement with the educational content provided by the learning platform, processing circuitry may extract new learnings about the new student learner. Responsive to extraction of the new learnings about the new student learner, processing circuitry may load the new learnings about the new student learner into the graph database in association with one or more of the new nodes for the new student learner. According to at least one example, processing circuitry may receive an inquiry from the new student learner. Responsive to receipt of the inquiry from the new student learner, processing circuitry may extract the new student learner data and the new learnings about the new student learner from the graph database. Further in response to receipt of the inquiry from the new student learner, processing circuitry may contextualize, using a large language model communicably interfaced with the graph database, a learning unit from the educational content provided by the learning platform as a response to the inquiry using at least the new student learner data and the new learnings about the new student learner extracted from the graph database provided as contextual input to the large language model. According to one example, processing circuitry may return as output to the new student learner, the learning unit contextualized by the large language model.

In at least one example, a system includes processing circuitry; non-transitory computer readable media; and instructions that, when executed by the processing circuitry, configure the processing circuitry to perform operations. In such an example, processing circuitry may maintain a graph database describing student learners subscribed to educational content provided by the learning platform. According to such an example, processing circuitry may obtain new student learner data about a new student learner subscribed to the educational content provided by the learning platform, In such an example, processing circuitry may load, into the graph database, the new student learner data within new nodes and new relationships with directionality between the new nodes and having metadata parameters within the new nodes describing the new student learner data loaded into the graph database. According to this example, processing circuitry may receive input from the new student learner as an engagement with the educational content provided by the learning platform. In response to receipt of the input from the new student learner as the engagement with the educational content provided by the learning platform, processing circuitry may extract new learnings about the new student learner. Responsive to extraction of the new learnings about the new student learner, processing circuitry may load the new learnings about the new student learner into the graph database in association with one or more of the new nodes for the new student learner. According to at least one example, processing circuitry may receive an inquiry from the new student learner. Responsive to receipt of the inquiry from the new student learner, processing circuitry may extract the new student learner data and the new learnings about the new student learner from the graph database. Further in response to receipt of the inquiry from the new student learner, processing circuitry may contextualize, using a large language model communicably interfaced with the graph database, a learning unit from the educational content provided by the learning platform as a response to the inquiry using at least the new student learner data and the new learnings about the new student learner extracted from the graph database provided as contextual input to the large language model. According to one example, processing circuitry may return as output to the new student learner, the learning unit contextualized by the large language model.

In one example, there is computer-readable storage media having instructions that, when executed, configure processing circuitry to maintain a graph database describing student learners subscribed to educational content provided by the learning platform. According to such an example, processing circuitry may obtain new student learner data about a new student learner subscribed to the educational content provided by the learning platform, In such an example, processing circuitry may load, into the graph database, the new student learner data within new nodes and new relationships with directionality between the new nodes and having metadata parameters within the new nodes describing the new student learner data loaded into the graph database. According to this example, processing circuitry may receive input from the new student learner as an engagement with the educational content provided by the learning platform. In response to receipt of the input from the new student learner as the engagement with the educational content provided by the learning platform, processing circuitry may extract new learnings about the new student learner. Responsive to extraction of the new learnings about the new student learner, processing circuitry may load the new learnings about the new student learner into the graph database in association with one or more of the new nodes for the new student learner. According to at least one example, processing circuitry may receive an inquiry from the new student learner. Responsive to receipt of the inquiry from the new student learner, processing circuitry may extract the new student learner data and the new learnings about the new student learner from the graph database. Further in response to receipt of the inquiry from the new student learner, processing circuitry may contextualize, using a large language model communicably interfaced with the graph database, a learning unit from the educational content provided by the learning platform as a response to the inquiry using at least the new student learner data and the new learnings about the new student learner extracted from the graph database provided as contextual input to the large language model. According to one example, processing circuitry may return as output to the new student learner, the learning unit contextualized by the large language model.

The details of one or more examples of the disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the text and figures.

DETAILED DESCRIPTION

Figure 1:
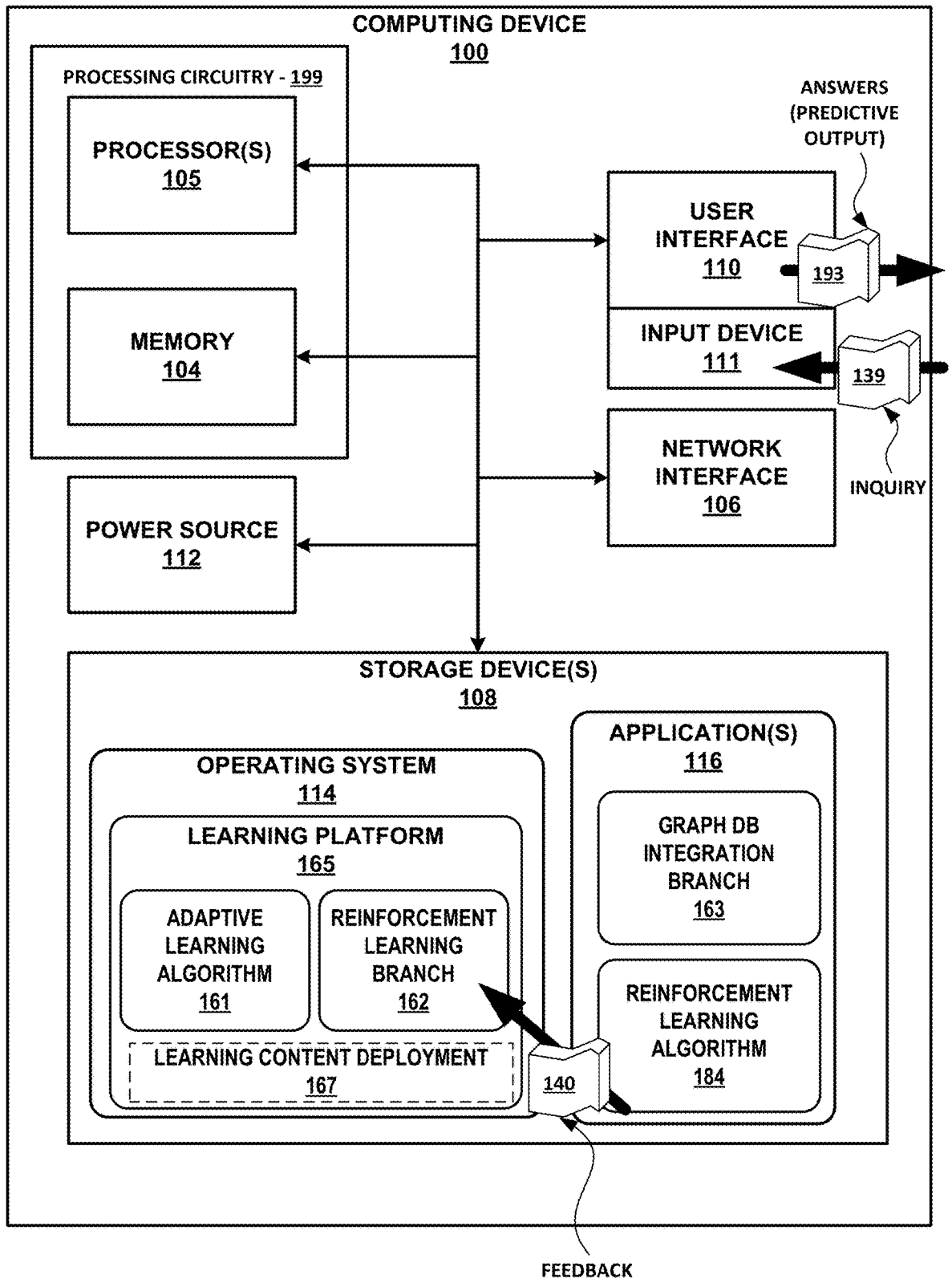
FIG. 1 is a block diagram illustrating further details of one example of computing device, in accordance with aspects of this disclosure.

Described herein are systems, methods, and apparatuses for implementing an adaptive and scalable Artificial Intelligence (AI) driven personalized learning platform.

For instance, aspects of the disclosure provide techniques, systems, and methodologies for the implementation of specially configured education technology, and more particularly, the implementation of an adaptive and scalable AI-driven personalized learning platform 200 (see FIG. 2) that dynamically tailors learning content, pathways, and experiences for individual learners.

In addition to disclosed examples which overcome the limitations of traditional learning systems, example examples set forth herein provide a platform having functionality for dynamically tailoring learning content, pathways, and experiences for individual learners, thus providing a more effective and engaging educational experience.

Within the generalized field of educational systems, prior known techniques fail to cater to the unique needs, preferences, and learning styles of individual students. The one-size-fits-all approach utilized by prior systems leads to disengagement, frustration, and suboptimal learning outcomes for many learners. Advances in artificial intelligence and machine learning have facilitated the development of adaptive learning systems, but these systems often lack comprehensive personalization, accessibility, and scalability.

Unfortunately, while prior known techniques provide some level of customization, they remain limited in scope, and are simply unable to fully address the diverse needs of learners. Furthermore, these platforms are not equipped to handle the rapid growth of content and user engagements or to support a wide range of content types and delivery formats.

The improved techniques described herein provide a more comprehensive and scalable personalized learning solution, capable of dynamically adapting to the needs of individual learners, to the benefit of such individual learners within an educational context. Moreover, aspects of the disclosure provide solutions enabling delivery of a rich array of learning content and formats. Such solutions are further capable of integrating advanced features such as learning analytics, collaborative learning, and emotional intelligence to enhance the learning experience.

The present state of the art may therefore benefit from the systems, methods, and apparatuses for implementing an adaptive and scalable AI-driven personalized learning platform, as is described herein.

In the following description, numerous specific details are set forth such as examples of specific systems, languages, components, etc., in order to provide a thorough understanding of the various examples. It will be apparent, however, to one skilled in the art that these specific details need not be employed to practice the examples disclosed herein. In other instances, well-known materials or methods are described in detail in order to avoid unnecessarily obscuring the disclosed examples.

In addition to various hardware components depicted in the figures and described herein, examples further include various operations that are described below. The operations described in accordance with such examples may be performed by hardware components or may be embodied in machine-executable instructions, which may be used to cause a general-purpose or special-purpose processor programmed with the instructions to perform the operations. Alternatively, the operations may be performed by a combination of hardware and software.

Examples also relate to an apparatus for performing the operations disclosed herein. This apparatus may be specially constructed for the described purposes, or it may be a general-purpose computer selectively activated, and thus in-situ specially configured, or specially reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various special purpose and specially customized systems may be used with programs in accordance with the teachings herein, or it may prove convenient to construct a more specialized apparatus to perform the method steps. The structure for a variety of these systems appears as set forth in the description below. In addition, examples are not described with reference to any particular programming language. It will be appreciated that a variety of programming languages may be used to implement the teachings of the examples as described herein.

Examples may be provided as a computer program product, or software, that may include a machine-readable medium having stored thereon instructions, which may be used to program a computer system (or other programmable electronic devices) to perform a process according to the disclosed examples. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed examples may be used alone or together with one another in any combination. Although various examples may have been partially motivated by deficiencies with conventional techniques and approaches, some of which are described or alluded to within the specification, the examples need not necessarily address or solve any of these deficiencies, but rather, may address only some of the deficiencies, address none of the deficiencies, or be directed toward different deficiencies and problems which are not directly discussed.

FIG. 1 is a block diagram illustrating further details of one example of computing device, in accordance with aspects of this disclosure. FIG. 1 illustrates only one particular example of computing device 100. Many other examples of computing device 100 may be used in other instances.

As shown in the specific example of FIG. 1, computing device 100 may include processing circuitry 199 including one or more processors 105 and memory 104. Computing device 100 may further include network interface 106, one or more storage devices 108, user interface 110, and power source 112. Computing device 100 may also include an operating system 114. Computing device 100, in one example, may further include one or more applications 116, such as graph database (DB) integration branch 163 and reinforcement learning algorithm 184. One or more other applications 116 may also be executable by computing device 100. Components of computing device 100 may be interconnected (physically, communicatively, and/or operatively) for inter-component communications.

Operating system 114 may execute various functions including executing a trained AI model and performing AI model training. As shown here, operating system 114 executes learning platform 165 which includes both adaptive learning algorithm 161 and reinforcement learning branch 162. Reinforcement learning branch 162 may receive as input feedback 140 as provided by reinforcement learning algorithm 184 as output. Such feedback 140 may originate from user prompts providing direct feedback to learning platform 165 or from indirect feedback, such as requesting learning platform 165 to change its recommended learning pathways or a lack of engagement with content generated and output by learning platform 165. Learning platform 165 further includes learning content deployment 167 module to coordinate deployment, output, and delivery of educational content produced by learning platform 165 including modified content generated by learning platform 165 responsive to feedback 140 processed by reinforcement learning branch 162.

Computing device 100 may receive an inquiry 139 via input device 111 and provide inquiry 139 to learning platform 165 executing via operating system 114. Computing device 100 may provide answers (e.g., predictive output) 193 as output to a connected user device via user interface 110.

In some examples, processing circuitry 199 including one or more processors 105, implements functionality and/or process instructions for execution within computing device 100. For example, one or more processors 105 may be capable of processing instructions stored in memory 104 and/or instructions stored on one or more storage devices 108.

Memory 104, in one example, may store information within computing device 100 during operation. Memory 104, in some examples, may represent a computer-readable storage medium. In some examples, memory 104 may be a temporary memory, meaning that a primary purpose of memory 104 may not be long-term storage. Memory 104, in some examples, may be described as a volatile memory, meaning that memory 104 may not maintain stored contents when computing device 100 is turned off. Examples of volatile memories may include random access memories (RAM), dynamic random-access memories (DRAM), static random-access memories (SRAM), and other forms of volatile memories. In some examples, memory 104 may be used to store program instructions for execution by one or more processors 105. Memory 104, in one example, may be used by software or applications running on computing device 100 (e.g., one or more applications 116) to temporarily store data and/or instructions during program execution.

One or more storage devices 108, in some examples, may also include one or more computer-readable storage media. One or more storage devices 108 may be configured to store larger amounts of information than memory 104. One or more storage devices 108 may further be configured for long-term storage of information. In some examples, one or more storage devices 108 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 100, in some examples, may also include a network interface 106. Computing device 100, in such examples, may use network interface 106 to communicate with external devices via one or more networks, such as one or more wired or wireless networks. Network interface 106 may be a network interface card, such as an Ethernet card, an optical transceiver, a radio frequency transceiver, a cellular transceiver or cellular radio, or any other type of device that can send and receive information. Other examples of such network interfaces may include BLUETOOTH®, 3G, 4G, 1G, LTE, and WI-FI® radios in mobile computing devices as well as USB. In some examples, computing device 100 may use network interface 106 to wirelessly communicate with an external device such as a server, mobile phone, or other networked computing device.

User interface 110 may include one or more input devices 111, such as a touch-sensitive display. Input device 111, in some examples, may be configured to receive input from a user through tactile, electromagnetic, audio, and/or video feedback. Examples of input device 111 may include a touch-sensitive display, mouse, keyboard, voice responsive system, video camera, microphone or any other type of device for detecting gestures by a user. In some examples, a touch-sensitive display may include a presence-sensitive screen.

User interface 110 may also include one or more output devices, such as a display screen of a computing device or a touch-sensitive display, including a touch-sensitive display of a mobile computing device. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output devices may include a speaker, a cathode ray tube (CRT) monitor, a liquid crystal display (LCD), or any other type of device that can generate intelligible output to a user.

Computing device 100, in some examples, may include power source 112, which may be rechargeable and provide power to computing device 100. Power source 112, in some examples, may be a battery made from nickel-cadmium, lithium-ion, or other suitable material.

Examples of computing device 100 may include operating system 114. Operating system 114 may be stored in one or more storage devices 108 and may control the operation of components of computing device 100. For example, operating system 114 may facilitate the interaction of one or more applications 116 with hardware components of computing device 100.

Figure 2:
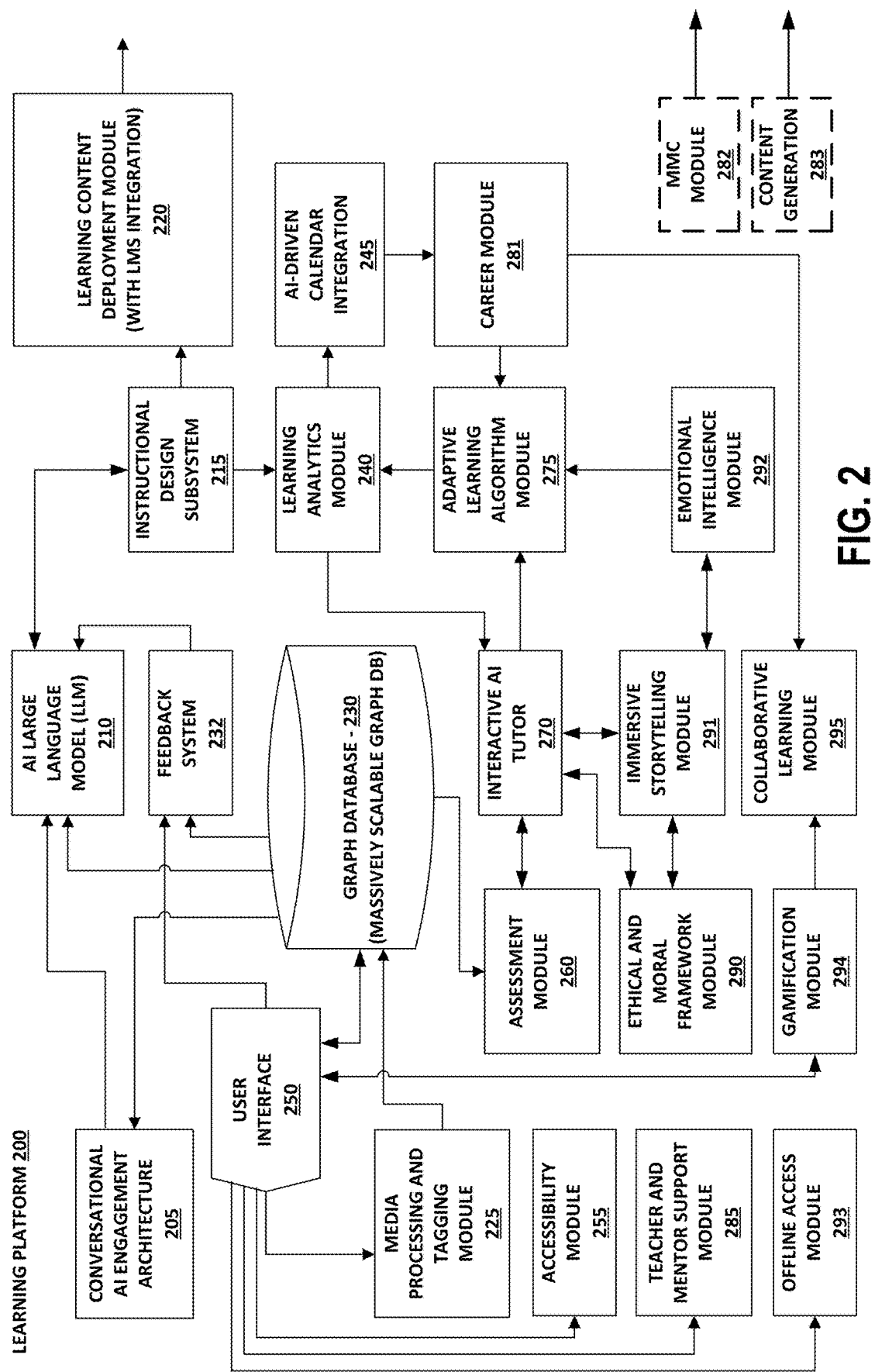
FIG. 2 depicts an overview of learning platform 200, and more particularly, an AI-driven personalized learning platform 200, in accordance with aspects of the disclosure.

FIG. 2 depicts an overview of learning platform 200, and more particularly, an AI-driven personalized learning platform 200, in accordance with aspects of the disclosure.

As shown here, there are multiple functional blocks in the architecture of the AI-driven personalized learning platform 200 which directly or indirectly interact with graph database 230. In particular, functional components which interact with graph database 230, according to the example shown, include conversational AI engagement architecture 205, AI large language model (LLM) 210, media processing and tagging module 225, user interface 250, and feedback system 232.

Other functional components depicted within learning platform 200 may interact indirectly with graph database 230. For instance, user interface 250 interacts with graph database 230 and additionally may interact with each of accessibility module 255, teacher and mentor support module 285, offline access module 293, and gamification module 294.

Large language module 210 interacts with graph database 230 and further indirectly interacts with interactive AI tutor 270. In turn, interactive AI tutor 270 interacts with each of ethical and moral framework module 290, immersive storytelling module 291, adaptive learning algorithm module 275 and learning analytics module 240. Interactive AI tutor 270 indirectly interacts with collaborative learning module 295, gamification module 294, emotional intelligence module 292, AI-Driven calendar integration 245 module 245, conversational AI engagement architecture 205, career module 281, and user interface 250. Additionally depicted are several optional modules, including multi-modal content (MMC) module 282, and content generation module 283.

Large language module 210 is depicted as interacting with conversational AI engagement architecture 205, feedback system 232 and instructional design subsystem 215, which feed into learning content deployment module 220 (with Learning Management Systems (LMS)) integration, as depicted. All of the depicted modules of learning platform 200 are interfaced in some manner (directly or indirectly) through each of user interface 250 and graph database 230 to enable and carry out the various methodologies of learning platform 200 as described in accordance with aspects of the disclosure.

A large language model or "LLM," such as large language model 210 provides a type of artificial intelligence (AI) or AI based algorithms and modules that utilize deep learning techniques and massively large data sets to understand, summarize, generate and predict new content. Closely connected with LLM 210 are generative AI models of which LLM 210 is just one type. Generative AI models are specifically designed to help generate text-based content. Graph-based Natural Language Processing (NLP) may further be utilized for querying, analyzing, and visualizing complex data structures within graph database 230. Certain examples expand upon a contextualized Generative Pre-trained Transformer (GPT-x) as well as a combination of generative AI and improved Natural Language Processing (NLP) to enable improved machine learning methodologies and improved graph database technologies enabling learners to efficiently explore, analyze, and/or visualize interconnected data, uncovering hidden patterns, trends, and insights.

Large language model 210 represents the evolution of the language model concept in AI by dramatically expanding upon the type of input data which may be used for training and determining predictions and inferences. This expansion of input training data results in dramatically improved capabilities of the AI model. For instance, it is common for LLM 210 model 210 to exploit over one billion parameters. Parameters in the context of such AI models represent the variables present in the model upon which LLM 210 was trained and can therefore reference and utilize to determine predictive output and inferences.

Figure 3:
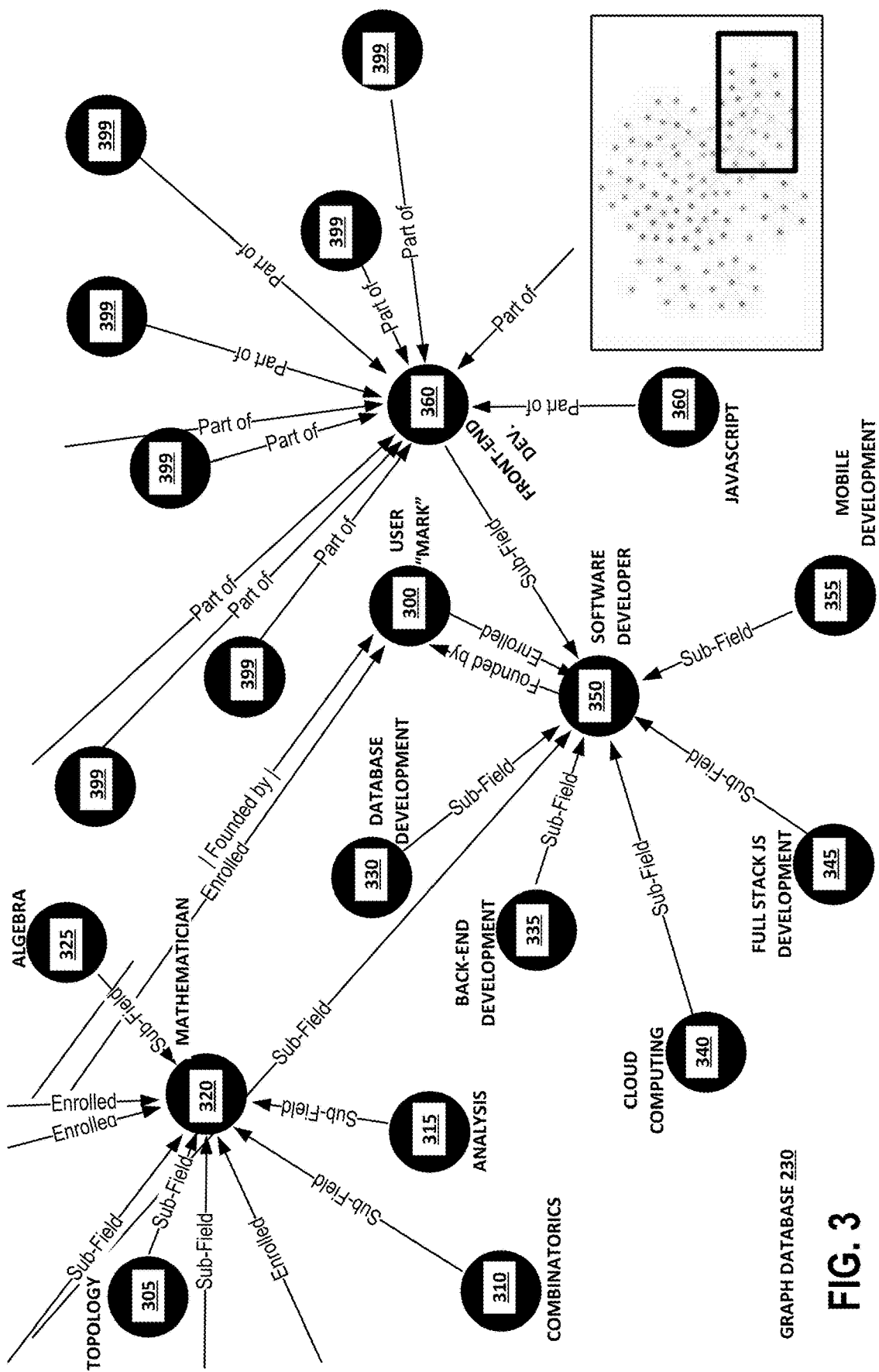
FIG. 3 depicts an example representation of graph database 230 showing users and associated learning and enrollment of those users, in accordance with aspects of the disclosure.

FIG. 3 depicts an example representation of graph database 230 showing users and associated learning and enrollment of those users, in accordance with aspects of the disclosure.

For instance, as shown here, user 300 ("Mark") is depicted as a node near the center of graph database 230. Other users may also be viewed if the view of graph database 230 is shifted or if the view is zoomed out. Nonetheless, user 300 is depicted as having numerous relationships with other nodes, including being enrolled in software developer node 350. In turn, software developer node 350 is depicted as "founded by" user 300 and is a sub-field of cloud computing node 340, full stack JavaScript (JS) development node 345, mobile development node 355, back-end development node 335, and database development node 330, and front-end development node 360. In a similar manner, front-end development node 360 is depicted as being a "part of" javascript node 360, as well as numerous other unspecified nodes 399.

Further depicted within graph database 230 is mathematician node 320, which is a sub-field of algebra node 325, analysis node 315, combinatorics node 310, and topology node 305.

Graph databases 230 are a type of NoSQL database that stores data in the form of nodes, edges, and properties, representing entities, relationships, and attributes. Graph databases 230 enable the storage, retrieval, and analysis of complex, interconnected data.

Data visualization tools enable users to create interactive and informative visual representations of their data such as that which is depicted at FIG. 3. Such tools support a wide range of chart types and provide various customization options to enhance the clarity and aesthetics of the visualizations.

Massively Scalable Graph Database 230: Examples of learning platform 200 utilize graph database 230 to store and manage the scope and sequence of learning pathways, enabling rapid retrieval of educational content and supporting growth in content and user engagements. Graph databases 230 synergizes with an AI Large Language Model 210 (see FIG. 2) and a robust feedback system 232 (see FIG. 2) to generate and refine content at scale through a symbiotic relationship between learners and artificial intelligence systems.

Figure 4A:
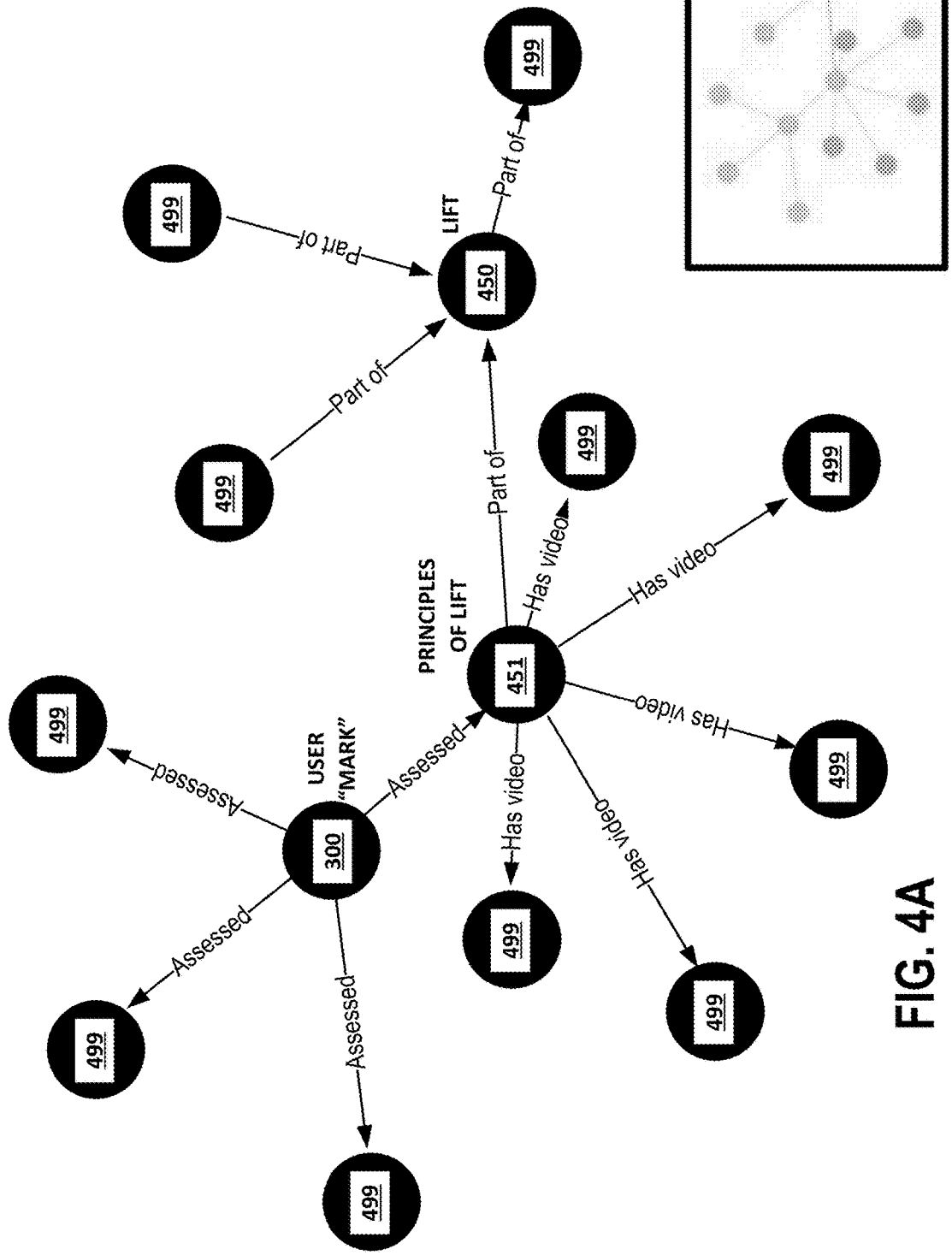
FIGS. 4A and 4B illustrate example representations of graph database 230 showing users and assessed learning for those users, in accordance with aspects of the disclosure.
Figure 4B:
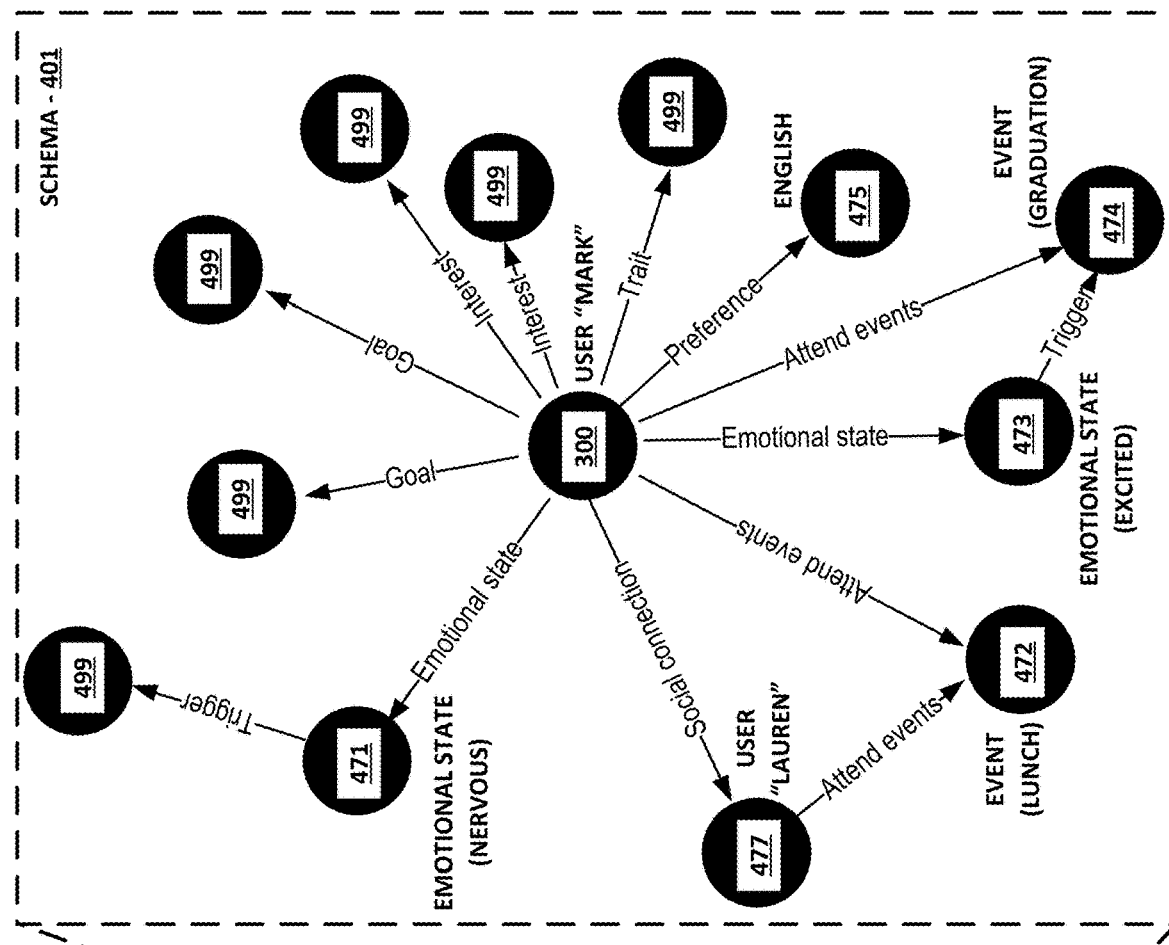
Figure 4B:
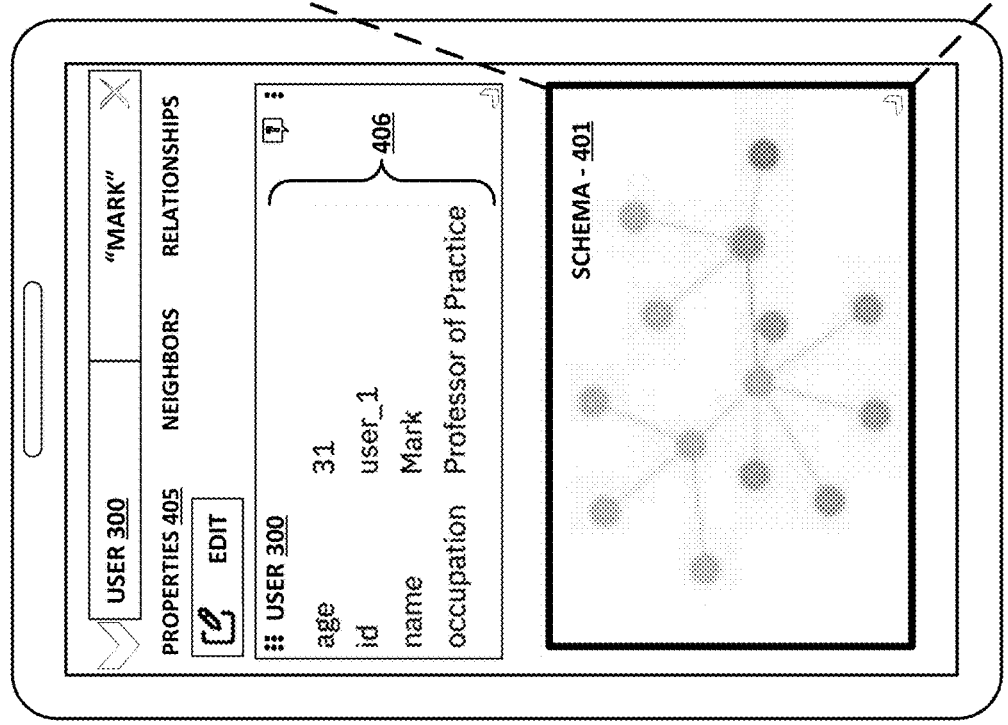

FIGS. 4A and 4B illustrate example representations of graph database 230 showing users and assessed learning for those users, in accordance with aspects of the disclosure.

For instance, graph database 230 schema 400 at FIG. 4A depicts user 300 ("Mark") has assessed multiple nodes 499. Further depicted is user 300 having assessed principles of lift node 451 which is related to many other nodes 499, each of which depicting "has video" as their relationship back to principles of lift node 451. Further still, principles of lift node 451 is part of lift node 450 according to this example, and lift node 450 in turn is part of multiple other unspecified nodes 499.

Depicted at FIG. 4B, is an easy-to-read example of user data depicted by another graph database 230 schema 401. Following the example user 300, properties 406 are stored as a data representation within schema 401 depicting example data that LLM 210 is trained to detect and write queries for based on any input coming in from a user 300.

For instance, as shown here, user 300 "Mark" has various properties 406 including age of 31, identifier "user_1," name "Mark" and occupation "Professor of Practice." Within schema 401, details about user 300 are depicted including a social connection with user 477 "Lauren", events attended together including lunch event 472 and graduation event 474, various emotional states 473 and 471 which include "excited" and "nervous" and which are additionally linked via a "trigger" with other various nodes. A preference node 475 indicates "English" and there are several other goals, interests, and traits further depicted, each of which forming relationships from the node for user 300 "Mark" to other unspecified nodes 499.

As noted above, large language model ("LLM") 210 may be trained to detect and write queries based on any input obtained in relation to user 300.

Generally speaking, LLM 210 is a language model consisting of a neural network with many parameters (e.g., potentially billions of weights) trained on large quantities of unlabeled text using self-supervised learning methodologies.

Computing device 100 may implement a graph-based Natural Language Processing (NLP) system by implementing a hybrid model that combines graph-based and vector-based approaches. Such a hybrid model may append attribute data to the nodes within graph database 230, wherein the attribute data includes but is not limited to metadata, context-specific information, or vector embeddings that represent the semantic meaning of the data or its relation to other data points within the graph. Utilizing the appended attributes to augment the retrieval process, may enable such a hybrid model system to perform more nuanced queries that consider both the graph structure and the semantic relationships encapsulated within the vector embeddings of the attribute data, thus allowing for a deeper and more comprehensive exploration and analysis of the data. For instance, such a hybrid model system may leverage an enhanced Retrieval-Augmented Generation (RAG) process to dynamically query, retrieve, and visualize data, facilitating both breadth and depth in data exploration and insights generation, with the capability to address complex user queries that benefit from understanding the interplay between different data points and their attributes. In certain examples, computing device 100 executes AI large language model 210 in conjunction with the hybrid graph/vector-based model to generate structured data queries and predictive outputs that are informed by the enriched data model, providing outputs that reflect a more sophisticated understanding of the query context and user intent, based on the enhanced representation of data within the hybrid model.

A vector space model considers the relationship between data represented by vectors. Such a model is an algebraic model for representing text documents (or more generally, items) as vectors such that the distance between vectors represents the relevance between the documents. It is useful with information filtering, information retrieval, indexing and relevancy rankings. However, it can be limited in terms of semantic comprehension. Conversely, a graph model is a visual representation of complex relationships between entities. Graph models have two main parts: nodes and edges. Nodes are the basic units of a graph, and represent individual entities. Edges are the relationships between nodes, and can be single or directed. Each node-edge-node combination, or "triple", describes a particular fact. A hybrid model combines both concepts into concurrent use providing additional useful information for AI large language model 210 and potentially increasing the sophistication of the hybrid model through increased contextual understanding of human language and incoming natural language requests (e.g., questions asked in human language).

User Data Representation and Data Schema 400, 401:

Set forth below is an example graph database schema 400, 401 defining 19 possible example "nodes" in accordance with aspects of the invention. More particularly, the 19 nodes described below include enumerated properties and relationships for each of the 19 nodes within a graph database in accordance with aspects of the disclosure, including "User" nodes, "Preferences" nodes, "Interests" nodes, "Social Connections" nodes, "Goals" nodes, "Lessons" nodes, "Progress" nodes, "Feedback" nodes, "Hobbies" nodes, "Personality Traits" nodes, "Achievements" nodes, "Core Values" nodes, "Life Aspirations" nodes, "Challenges" nodes, "Reflections" nodes, "Emotional States" nodes, "Events" nodes, "AI Interactions" nodes, and "Thoughts" nodes. In such an example, the 19 graph database nodes 499 are defined as follows:

Node 1: User (see element 300):
Properties:
  id: int
  name: string
  age: int
  gender: string
  location: string
  occupation: string
  education level: string
  bio: string
Relationships:
  OUTGOING: (User)-[:HAS_PREFERENCES]→(Preferences)
  OUTGOING: (User)-[:HAS_INTERESTS]→(Interests)
  OUTGOING: (User)-[:HAS_SOCIAL_CONNECTIONS]→(Social Connections)
  OUTGOING: (User)-[:HAS_GOALS]→(Goals)

OUTGOING: (User)-[:HAS_LESSONS]→(Lessons)
OUTGOING: (User)-[:HAS_PROGRESS]→(Progress)
OUTGOING: (User)-[:HAS_FEEDBACK]→(Feedback)
OUTGOING: (User)-[:HAS_HOBBIES]→(Hobbies)
OUTGOING: (User)-[:HAS_PERSONALITY_TRAITS]→(Personality Traits)
OUTGOING: (User)-[:HAS_ACHIEVEMENTS]→(Achievements)
OUTGOING: (User)-[:HAS_CORE_VALUES]→(Core Values)
OUTGOING: (User)-[:HAS_LIFE_ASPIRATIONS]→(Life Aspirations)
OUTGOING: (User)-[:HAS_CHALLENGES]→(Challenges)
OUTGOING: (User)-[:HAS_REFLECTIONS]→(Reflections)
OUTGOING: (User)-[:HAS_EMOTIONAL_STATES]→(Emotional States)

Node 2: Preferences
Properties:
  learning_style: string
  language: string
  time_of_day: string
  learning_duration: int
  content_type: string
  notification_preferences: string
Relationships:
  INCOMING: (User)-[:HAS_PREFERENCES]→(Preferences)

Node 3: Interests
Properties:
  interest_name: string
  interest_category: string
  interest_level: string
  interest_start_date: date
  interest_last_updated: date
Relationships:
  INCOMING: (User)-[:HAS_INTERESTS]→(Interests)
  INCOMING: (Social Connections)-[:SHARES_INTERESTS]→(Interests)
  OUTGOING: (Interests)-[:RELATED_TO]→(Lessons)
  OUTGOING: (Interests)-[:RELATED_TO]→(Goals)
  OUTGOING: (Interests)-[:RELATED_TO]→(Challenges)
  OUTGOING: (Interests)-[:RELATED_TO]→(Life Aspirations)
  OUTGOING: (Interests)-[:RELATED_TO]→(Hobbies)

Node 4: Social Connections
Properties:
  friend_id: int
  relationship_type: string
  connection_strength: int
  frequency_of_interaction: string
  last_interaction_date: date
  shared_interests: list
  shared_goals: list
  shared_events_attended: list
  friend_personality_traits: list
  communication_channel: string
Relationships:
  INCOMING: (User)-[:HAS_SOCIAL_CONNECTIONS]→(Social Connections)
  OUTGOING: (Social Connections)-[:SHARES_INTERESTS]→(Interests)
  OUTGOING: (Social Connections)-[:SHARES_GOALS]→(Goals)
  OUTGOING: (Social Connections)-[:ATTENDS_EVENTS_TOGETHER]→(Events)

Node 5: Goals
Properties:
  goal_name: string
  goal_category: string
  goal_type: string
  goal_completion_status: string
  goal_deadline: date
  goal_priority: string
  goal_start_date: date
Relationships:
  INCOMING: (User)-[:HAS_GOALS]→(Goals)
  INCOMING: (Social Connections)-[:SHARES_GOALS]→(Goals)
  OUTGOING: (Goals)-[:RELATED_TO]→(Interests)
  OUTGOING: (Goals)-[:HAS_FEEDBACK]→(Feedback)
  OUTGOING: (Goals)-[:RELATED_TO]→(Reflections)

Node 6: Lessons
Properties:
  lesson_id: int
  lesson_name: string
  lesson_category: string
  lesson_difficulty_level: string
  lesson_completion_status: string
  lesson_start_date: date
  lesson_end_date: date
  lesson_format: string
Relationships:
  INCOMING: (User)-[:HAS_LESSONS]→(Lessons)
  OUTGOING: (Lessons)-[:RELATED_TO]→(Interests)
  OUTGOING: (Lessons)-[:HAS_FEEDBACK]→(Feedback)

Node 7: Progress
Properties:
  progress_id: int
  progress_type: string
  progress_level: string
  progress_date: date
  progress_description: string
Relationships:
  INCOMING: (User)-[:HAS_PROGRESS]→(Progress)

Node 8: Feedback
Properties:
  feedback_id: int
  feedback_text: string
  feedback_sentiment: string
  feedback_date: date
  feedback_context: string
Relationships:
  INCOMING: (User)-[:HAS_FEEDBACK]→(Feedback)
  INCOMING: (Lessons)-[:HAS_FEEDBACK]→(Feedback)
  INCOMING: (Goals)-[:HAS_FEEDBACK]→(Feedback)
  INCOMING: (Challenges)-[:HAS_FEEDBACK]→(Feedback)
  INCOMING: (AI Interactions)-[:HAS_FEEDBACK]→(Feedback)

Node 9: Hobbies
Properties:
  hobby_name: string
  hobby_category: string
  hobby_start_date: date
  hobby_last_updated: date Relationships:
   INCOMING: (User)-[:HAS_HOBBIES]→(Hobbies)
   OUTGOING: (Hobbies)-[:RELATED_TO]→(Interests)
Node 10: Personality Traits
Properties:
   trait_name: string
   trait_value: int
Relationships:
   INCOMING: (User)-[:HAS_PERSONALITY TRAITS]→(Personality Traits)
Node 11: Achievements
Properties:
   achievement_id: int
   achievement_name: string
   achievement_description: string
   achievement_category: string
   achievement_date: date
Relationships:
   INCOMING: (User)-[:HAS_ACHIEVEMENTS]→(Achievements)
Node 12: Core Values
Properties:
   value_name: string
   value_importance: int
Relationships:
   INCOMING: (User)-[:HAS_CORE_VALUES]→(Core Values)
Node 13: Life Aspirations
Properties:
   aspiration_name: string
   aspiration_category: string
   aspiration_status: string
   aspiration_start_date: date
   aspiration_last_updated: date
Relationships:
   INCOMING: (User)-[:HAS_LIFE_ASPIRATIONS]→(Life Aspirations)
   OUTGOING: (Life Aspirations)-[:RELATED_TO]→(Interests)
Node 14: Challenges
Properties:
   challenge_id: int
   challenge_name: string
   challenge_description: string
   challenge_start_date: date
   challenge_end_date: date
   challenge_status: string
   challenge_category: string
Relationships:
   INCOMING: (User)-[:HAS_CHALLENGES]→(Challenges)
   OUTGOING: (Challenges)-[:RELATED_TO]→(Interests)
   OUTGOING: (Challenges)-[:HAS_FEEDBACK]→(Feedback)
Node 15: Reflections
Properties:
   reflection_id: int
   reflection_text: string
   reflection_sentiment: string
   reflection_date: date
   reflection_context: string
Relationships:
   INCOMING: (User)-[:HAS_REFLECTIONS]→(Reflections)
   OUTGOING: (Reflections)-[:RELATED_TO]→(Goals)
   OUTGOING: (Reflections)-[:RELATED_TO]→(Challenges)
   OUTGOING: (Reflections)-[:RELATED_TO]→(AI Interactions)
Node 16: Emotional States
Properties:
   emotion_id: int
   emotion_name: string
   emotion_intensity: int
   emotion_timestamp: datetime
   emotion_trigger: string
Relationships:
   INCOMING: (User)-[:HAS_EMOTIONAL_STATES]→(Emotional States)
   OUTGOING: (Emotional States)-[:TRIGGERED_BY]→(Events)
   OUTGOING: (Emotional States)-[:TRIGGERED_BY]→(AI Interactions)
   OUTGOING: (Emotional States)-[:TRIGGERED_BY]→(Thoughts)
Node 17: Events
Properties:
   event_id: int
   event_name: string
   event_date: date
   event_description: string
Relationships:
   INCOMING: (Social Connections)-[:ATTENDS_EVENTS_TOGETHER]→(Events)
Node 18: AI Interactions
Properties:
   interaction_id: int
   interaction_type: string
   interaction_date: date
   interaction_description: string
Relationships:
   OUTGOING: (AI Interactions)-[:HAS_FEEDBACK]→(Feedback)
   OUTGOING: (AI Interactions)-[:TRIGGERED_BY]→(Emotional States)
   OUTGOING: (AI Interactions)-[:RELATED_TO]→(Reflections)
Node 19: Thoughts
Properties:
   thought_id: int
   thought_text: string
   thought_date: date
Relationships:
   OUTGOING: (Thoughts)-[:TRIGGERED_BY]→(Emotional States).

The 19 example nodes 499 describe examples consistent with FIGS. 4A and 4B, however, there may be a different number of such nodes 499, including fewer nodes 499 or more nodes 499, and likely many more nodes 499 defined by such a schema 401, 402 than what is depicted. Moreover, learning platform 200 and specifically large language model 210 may dynamically discover and define additional nodes 499 on the fly which are not within a current variant of graph database 230 or its schema 401, 402. Consequently, a very large number of nodes 499 and relationships, vectors, parameters, etc., may result.

Advanced AI Large Language Model 210 Integration: Referring again to FIG. 2, learning platform 200 may employ advanced AI Large Language Model 210 to generate content, assess learners, and adapt the learning pathways to the individual needs of learners, ensuring a high level of quality and relevance.

Comprehensive Personalization: Learning platform 200 may incorporate adaptive learning algorithms that continuously analyze the performance, progress, and preferences of individual learners and responsively adjust the learning experience delivered by learning platform 200 to such individual learners in real-time. For instance, learning platform 200 may optimize both the pace and content for each individual learner. Moreover, conversational AI engagement architecture 205 and interactive AI tutor 270 enable learning platform 200 to deliver personalized guidance, feedback, and mentorship to individual learners throughout the learning process, by adapting responses and support provided by conversational AI engagement architecture 205 and interactive AI tutor 270 modules based on unique needs and goals of individual learners.

Multimodal Content and Delivery Formats: Learning platform 200 supports a wide range of content types and delivery formats, including text, audio, video, and interactive content, as well as immersive experiences such as virtual reality.

Collaborative learning module 295: Learning platform 200 may integrate collaborative learning, enabling group discussions, project-based activities, and peer review, fostering engagement and engagement between learners.

Learning analytics module 240: According to at least one example, learning platform 200 provides tools that provide insights into learners' progress, engagement, and performance, supporting data-driven decisions and optimization of the learning experience.

Accessibility module 255: Learning platform 200 enables accessibility for learners with diverse needs, by incorporating features such as adjustable font sizes, screen readers, closed captioning, and multi-language support.

Teacher and mentor support module 285: Learning platform 200 integrates features that facilitate communication and engagement between learners and educators, bridging the gap between AI-generated content and human mentorship.

Immersive storytelling module 291: Learning platform 200 may leverage AI large language model 210 to generate contextually relevant and engaging stories that intertwine with the learning content, offering immersive narratives that adapt to interests and experiences of individual learners.

Emotional intelligence module 292: Learning platform 200 may detect and respond to user emotions, integrating emotional intelligence and empathy into the AI-driven tutoring component to enhance the learning experience.

Ethical and moral framework module 290: Learning platform 200 provides content and activities that encourage the development of ethical reasoning and moral values, integrating ethical and moral teaching alongside academic subjects.

AI-Driven Engagement Inquiries: Learning platform 200 provides conversational AI engagement architecture 205 to enable learning platform 200 to assess the current state of engagement with the user, generate relevant inquiries to achieve specific goals, and automatically queue and send messages to the user at a frequency determined by their ongoing preferences and engagement.

AI-Driven calendar integration 245: According to certain examples, learning platform 200 may contextualize a calendar (see also FIG. 5, new calendar event 507) of individual learners, scheduling learning modules accordingly, detecting lifestyle patterns, and optimizing the learning experience of users based on this knowledge.

Learning content deployment module 220 with LMS Integration 220: Learning platform 200 enables easy integration with existing learning management systems, career development services, and job placement services, further enhancing the utility and value of learning platform 200 to both learners and institutions.

By combining these advanced features and capabilities, learning platform 200 provides uniquely personalized and engaging learning experiences to users, catering to the unique needs and preferences of individual learners, while promoting learner success and facilitating continuous improvement.

Massively Scalable Graph Database 230 and Language Model Enabled by Large Language Models (LLMS) 210:

According to some examples, learning platform 200 utilizes a massively scalable graph database 230 to store the scope and sequence of learning pathways, ensuring rapid retrieval and efficient management of educational content. Graph database 230 is designed to support the growth of content and user engagements over time, allowing learning platform 200 to accommodate a large number of users without sacrificing performance or quality.

To enable the generative production of learning scope and sequence, learning platform 200 may utilize advanced AI large language model 210. In such examples, LLM 210 is responsible for generating the full structure of learning pathways down to the learning unit level for educational content packages. Such learning pathways may be based on chosen learning pathways indicated by individual users. This dynamic generation of learning pathways enables learning platform 200 to adapt to the needs and preferences of individual learners while maintaining a high level of content quality and relevance.

The integration of graph database 230 and AI large language model 210 enable learning platform 200 to create a powerful and adaptable learning environment. Artificial Intelligence (AI) large language model 210 generates a learning pathway for a specific learner and self-generated queries to add the new structure of the learning pathway to existing graph database 230. This process ensures that the learning content is organized efficiently, facilitating rapid access and retrieval for users.

As LLM 210 of learning platform 200 grows and evolves, the combination of the scalable graph database 230, feedback system from users, and LLM 210 allow for continuous adaptation and refinement of learning pathways, resulting in a highly scalable and self-correcting system. In such a way, learning platform 200 enables a unique approach to learning content generation and organization and thus, establishes a robust foundation for a personalized and adaptive learning experience, catering to educational goals amongst diverse individual learners.

Feedback System 232:

Learning platform 200 may utilize feedback system 232 to harness user feedback and continuously refine the learning content and pathways through the application of reinforcement learning. Feedback system 232 may incorporate multiple LLM 210 (within learning platform 200 as well as those provided by third-party vendors which are accessible to learning platform 200) via APIs with a system context that votes on the relevance of proposed changes to content based on user feedback, ensuring that learning platform 200 remains up-to-date, accurate, and responsive to learners' needs.

Example features and interactions of feedback system 232:

User Feedback Collection: According to certain examples, learning platform 200 allows users to provide feedback on various aspects of the learning content, such as stale content, incorrect structure, or content relevance. This feedback collection process enables learning platform 200 to gather valuable input from learners and maintain a high level of content quality and effectiveness.

AI large language model 210 Voting System: According to certain examples, once user feedback is collected, multiple AI large language model 210 APIs may evaluate proposed changes to content. The APIs may use the graph structure of the related change for contextualization, ensuring that evaluation of such changes are accurate and appropriate. This voting system enables learning platform 200 to harness the power of AI to make informed decisions about content adjustments.

Majority Vote-Based Changes: According to certain examples, if a majority of AI large language model 210 APIs vote in favor of the proposed change, learning platform 200 proceeds to implement the modification. LLM 210 may generate any necessary query to make the needed change in graph database 230, ensuring that the content is updated efficiently and effectively.

Continuous Improvement: According to certain examples, feedback system 232 is implemented and enables learning platform 200 to continuously refine its content and structure based on user feedback and AI analysis. This ongoing improvement process ensures that learning platform 200 remains relevant, engaging, and effective for learners, adapting to evolving needs and preferences of such learners.

Integration with Other Modules: According to certain examples, feedback system 232 interacts seamlessly with other modules, such as graph database 230, adaptive learning algorithm module 275, and learning analytics module 240. Such integration ensures that the feedback-driven changes are implemented cohesively across learning platform 200, providing a unified and continuously improving learning experience.

Feedback system 232 may facilitate maintaining responsiveness and effectiveness of learning platform 200. For instance, by combining user feedback with advanced AI analysis, feedback system 232 enables learning platform 200 to continuously refine its content and structure, ensuring a dynamic and adaptive learning experience that meets the needs of diverse learners.

Instructional Design Subsystem 215:

In at least one example, instructional design subsystem 215 leverages the power of LLM 210 to create comprehensive and coherent course details tailored to unique needs of individual learners. By producing various elements, such as learning objectives, assessments, prerequisites, reading materials, assignments, lecture notes, and personalized content, instructional design subsystem 215 enables the generation of educational content which is relevant, pedagogically sound, and adaptable to individual learning preferences.

Example features and interactions of the advanced instructional design subsystem 215:

Learning Objectives: According to certain examples, instructional design subsystem 215 generates clear and concise learning objectives for each course, ensuring that learners understand the key concepts and skills they will acquire throughout the learning experience.

Assessments: According to certain examples, instructional design subsystem 215 creates assessments, quizzes, and tests that align with the learning objectives and accurately measure learners' progress and understanding of the course material. These assessments are designed to challenge learners while providing valuable feedback for improvement.

Prerequisites: According to certain examples, instructional design subsystem 215 identifies and establishes prerequisite knowledge or skills required for each course, ensuring that learners have the necessary foundation to successfully engage with the content and achieve their learning goals. Instructional design subsystem 215 may iteratively search graph database 230 to establish relevant connections using AI and/or user feedback.

Reading Materials: Instructional design subsystem 215 may curate relevant and high-quality reading materials, including articles, textbooks, and research papers, that support and enhance the learning experience by providing additional context and information.

Assignments: Instructional design subsystem 215 may generate engaging and meaningful assignments, projects, and activities that encourage active learning, critical thinking, and problem-solving, helping learners apply their newfound knowledge and skills in real-world situations.

Lecture Notes: Instructional design subsystem 215 may produce comprehensive lecture notes and supplementary materials that cover essential course content, providing learners with valuable resources for review and reinforcement.

Personalized Content: According to certain examples, instructional design subsystem 215 utilizes learner data and preferences to create personalized learning content tailored to unique needs, learning style, and goals of individual learners. This adaptive approach ensures that the learning experience remains engaging, relevant, and effective for every individual.

Integration with Other Modules: According to certain examples, instructional design subsystem 215 interacts seamlessly with other modules, such as graph database 230, adaptive learning algorithm module 275, and collaborative learning module 295. As before, such integration ensures that learning platform 200 learned instructional features, weights, learned association, and style, are consistently applied across all learning content and experiences, providing a comprehensive and well-rounded learning environment.

Instructional design subsystem 215 enhances learning experience by producing high-quality, relevant, and pedagogically sound course materials tailored to unique needs of individual learners. By incorporating the power of an AI LLM 210 and advanced instructional design principles, instructional design subsystem 215 ensures that learning platform 200 delivers a comprehensive, adaptable, and engaging learning experience for every user.

Adaptive Learning Algorithm Module 275:

According to certain examples, adaptive learning algorithm module 275 integrates advanced adaptive learning algorithms to enable dynamic personalization of content and learning pathways. Adaptive learning algorithm module 275 may operate in conjunction with the other modules, such as graph database 230, LLM 210 enabled by AI large language model 210, and the various content generation and delivery modules, to provide a holistic and tailored learning experience for each user.

Adaptive learning algorithm module 275 provides adaptive learning algorithms which may continuously analyze performance, preferences, and progress of individual learners through various data points, such as assessment scores, time spent on learning units, engagement patterns, and feedback. This data-driven approach allows learning platform 200 to adjust the learning experience in real-time, optimizing both the pace and content for each user.

Example features and interactions of adaptive learning algorithm module 275:

Personalized Learning Pathways: Adaptive learning algorithm module 275 may analyze goals, interests, and prior knowledge of individual learners. Such adaptive algorithms may generate customized learning pathways that align with desired learning outcomes of individual learners. Adaptive learning algorithm module 275 may create personalized pathways by selecting relevant fields, subfields, topics, subtopics, and learning units from graph database 230, ensuring a targeted and efficient learning experience.

Dynamic Content Adaptation: Adaptive learning algorithm module 275 may work in tandem with learning content deployment module 220 to adjust delivery of learning content based on the needs and preferences of individual learners. For instance, adaptive learning algorithm module 275 may modify the difficulty level, format, or focus of the content to better suit current skill levels and learning styles of individual learners.

Real-time Performance Analysis: According to certain examples, adaptive learning algorithm module 275 iteratively or constantly monitors progress and performance of learners, utilizing data collected through learning analytics module 240, adaptive learning algorithm module 275, and other components of learning platform 200 which collect relevant data. Real-time or near real-time analysis enables learning platform 200 to identify areas where learners may need additional support or resources. Learning platform 200 may responsively adjust learning pathways accordingly.

Continuous Feedback Loop: Adaptive algorithms provided by adaptive learning algorithm module 275 learn from user feedback and engagements. In some examples, adaptive algorithms refine the learning experience over time. This continuous feedback loop ensures that learning platform 200 remains responsive to evolving needs and preferences of users, maintaining its effectiveness as a personalized learning solution.

In such a way, adaptive learning algorithm module 275 enhances the utility and effectiveness of learning platform 200, providing a highly personalized and responsive learning experience that adapts to unique needs and goals of individual learners. By combining advanced adaptive learning technologies with other innovative features of learning platform 200, adaptive learning algorithm module 275 enables learning platform 200 to deliver a tailored and engaging educational experience to individual learners that optimizes learning outcomes.

Collaborative Learning Module 295:

According to certain examples, collaborative learning module 295 integrates various interactive features, such as group discussions, project-based activities, and peer review, to promote engagement, enhance the learning experience, and enable learners to collaborate with their peers. By incorporating these collaborative learning features, learning platform 200 supports development of essential teamwork, communication, and critical thinking skills, enriching the overall learning process.

Example features and interactions of collaborative learning module 295:

Group Discussions: Collaborative learning module 295 may provide integrated discussion forums and chat rooms where learners can engage in real-time conversations about learning topics, ask questions, and share insights. Such group discussions facilitate peer-to-peer learning, enabling users to benefit from knowledge, perspectives, and experiences of other individual learners.

Project-Based Activities: Collaborative learning module 295 may offer project-based activities that encourage learners to work together on practical, hands-on tasks. These activities are designed to align with the learning objectives and content provided by learning content deployment module 220 providing generative AI content, ensuring that learning objectives are relevant and contribute to progress of individual learners. By participating in collaborative projects, learners may apply their knowledge, develop problem-solving skills, and learn to work effectively in a team.

Peer Review: Collaborative learning module 295 may incorporate a peer review system that enables learners to assess and provide feedback on work by other individual learners, such as assignments, projects, or presentations. This process promotes critical thinking, self-reflection, and constructive feedback, fostering a deeper understanding of the learning material and enables learners to evaluate and improve their own work.

Social Learning Features: Collaborative learning module 295 may include features such as user profiles, connections, and activity feeds that enable learners to establish a sense of community and social presence with other users and learners associated with (e.g., subscribed or otherwise utilizing) learning platform 200. These social learning features encourage networking, collaboration, and the exchange of ideas, providing an engaging and supportive learning environment.

Integration with Other Modules: Collaborative learning module 295 seamlessly interacts with other modules, such as adaptive learning algorithm module 275, learning analytics module 240, and assessment module 276. This integration ensures that collaborative learning activities are personalized, relevant, and informed by learners' progress and performance data.

In such a way, collaborative learning module 295 provides a comprehensive and engaging educational experience. By incorporating interactive, collaborative learning features, learning platform 200 fosters a supportive learning environment that promotes the development of essential skills and enhances the overall learning process for all users.

Media Processing and Tagging Module 225:

Learning platform 200 includes media processing and tagging module 225 which enables efficient organization and retrieval of educational content. Media processing and tagging module 225 works seamlessly with the other components of learning platform 200 to provide users with a comprehensive learning experience.

Example features and interactions of media processing and tagging module 225:

Media File Analysis: Media processing and tagging module 225 analyzes incoming media files, such as videos, text documents, audio files, and other multimedia content. Media processing and tagging module 225 utilizes advanced machine learning algorithms to identify key themes, topics, and concepts within the media files.

Tag Generation: Media processing and tagging module 225 automatically generates a set of relevant tags based on the analysis of the media files. Media processing and tagging module 225 ensures that the generated tags accurately represent the key themes, topics, and concepts of such content to facilitate effective indexing and categorization.

Content Indexing and Categorization: Media processing and tagging module 225 integrates the generated tags with graph database 230 of learning platform 200 to index and categorize the media files. Media processing and tagging module 225 enables educational content to be organized in a manner that makes it easy for users to search and access the information they need.

Scalable Algorithm Design: Media processing and tagging module 225 may handle large volumes of content, allowing learning platform 200 to efficiently manage a growing library of educational resources. Media processing and tagging module 225 may continuously update the tagging system as new media files are added, ensuring accurate and up-to-date search results for users.

Seamless Integration with Other Platform Modules: Media processing and tagging module 225 works in conjunction with the other components of learning platform 200, such as graph database 230, adaptive learning algorithm module 275, and collaborative learning module 295, to deliver a cohesive learning experience. In so doing, integration contributes to increased overall effectiveness of learning platform 200 to provide personalized and engaging educational content.

By leveraging advanced machine learning algorithms to analyze, tag, and organize incoming media files, media processing and tagging module 225 enables learning platform 200 to provide users with a comprehensive and accessible learning experience. Scalability and integration of media processing and tagging module 225 with other learning platform 200 components enables learning platform 200 to remain effective and efficient as the library of educational content grows.

Gamification Module 294:

Gamification module 294 enhances user motivation and engagement by introducing game-like elements into the learning experience. By incorporating features such as badges, points, leaderboards, and challenges, gamification module 294 makes learning more enjoyable, rewarding, and interactive, encouraging users to spend more time on learning platform 200 and achieve their learning goals.

Example features and interactions of gamification module 294:

Badges: According to certain examples, gamification module 294 awards badges to learners for accomplishing specific milestones, completing tasks, or demonstrating mastery of particular skills. These badges serve as visual representations of achievements by learners, motivating them to continue their progress and collect more badges.

Points: A points subsystem of gamification module 294 assigns points to various learning activities, rewarding learners for their engagement and effort. Accumulating points helps learners track their progress, set personal goals, and gain a sense of accomplishment.

Leaderboards: According to certain examples, gamification module 294 incorporates leaderboards that display user rankings based on their points, badges, or other performance metrics. These leaderboards foster a sense of friendly competition and encourage learners to improve their skills and advance in the rankings.

Challenges: Gamification module 294 may include challenges sub-module which provide various challenges that learners can participate in, such as timed quizzes, problem-solving tasks, or collaborative projects. These challenges provide opportunities for learners to apply their knowledge, practice skills, and demonstrate their abilities in a competitive and engaging context.

Progress Tracking and Feedback: Gamification module 294 integrates with learning analytics module 240 to provide learners with detailed feedback on their performance and progress. This feedback helps learners understand their strengths, identify areas for improvement, and develop strategies to achieve their learning goals.

Social Engagement: Gamification module 294 promotes social engagement by allowing learners to share their achievements, compete with their peers, and collaborate on group challenges. Gamification module 294 feature fosters a sense of community and camaraderie, further enhancing user engagement and motivation.

Integration with Other Modules: Gamification module 294 interacts seamlessly with other modules, such as graph database 230, adaptive learning algorithm module 275, and collaborative learning module 295. This integration ensures that learning platform 200 gamification features are consistently applied across all learning content and experiences, providing a cohesive and immersive learning environment.

In such a way, gamification module 294 enhances the learning experience by introducing game-like elements that increase user motivation and engagement. By incorporating features that make learning enjoyable, rewarding, and interactive, gamification module 294 encourages users to spend more time on learning platform 200, helping them achieve their learning goals and ultimately fostering long-term success.

Learning Analytics Module 240:

According to described examples, learning analytics module 240 implements advanced tools and techniques to provide valuable insights into progress, engagement, and performance of individual learners. Insights by learning analytics module 240 enable educators, administrators, and learners themselves to make data-driven decisions, identify areas for improvement, and optimize the learning experience.

Example features and interactions of learning analytics module 240:

Progress Tracking: According to certain examples, learning analytics module 240 tracks progress of individual learners through their personalized learning pathways, monitoring the completion of learning units, milestones, and assessments. This progress tracking by learning analytics module 240 allows educators and learners to visualize achievements, identify areas where additional support may be beneficial, and adjust learning plans accordingly.

Engagement Analysis: Learning analytics module 240 assesses various engagement metrics, such as time spent on learning units, engagement patterns, and participation in collaborative learning activities. This analysis helps identify patterns of engagement, pinpointing areas where learners may be struggling or disengaged, and informing targeted interventions to enhance the learning experience.

Performance Assessment: Learning analytics module 240 may gather and analyze data from assessment module 276, providing insights into performance by learners across various learning objectives, assignments, and projects. This performance data enables educators and administrators to evaluate the effectiveness of the learning content, identify areas for improvement, and make data-driven decisions to optimize the learning experience.

Personalized Recommendations: By integrating with adaptive learning algorithm module 275, learning analytics module 240 uses the collected data to generate personalized recommendations for learners. These recommendations may include additional resources, tailored learning activities, or modifications to the learning pathway, all aimed at enhancing the learning experience and promoting learner success.

Figure 5:
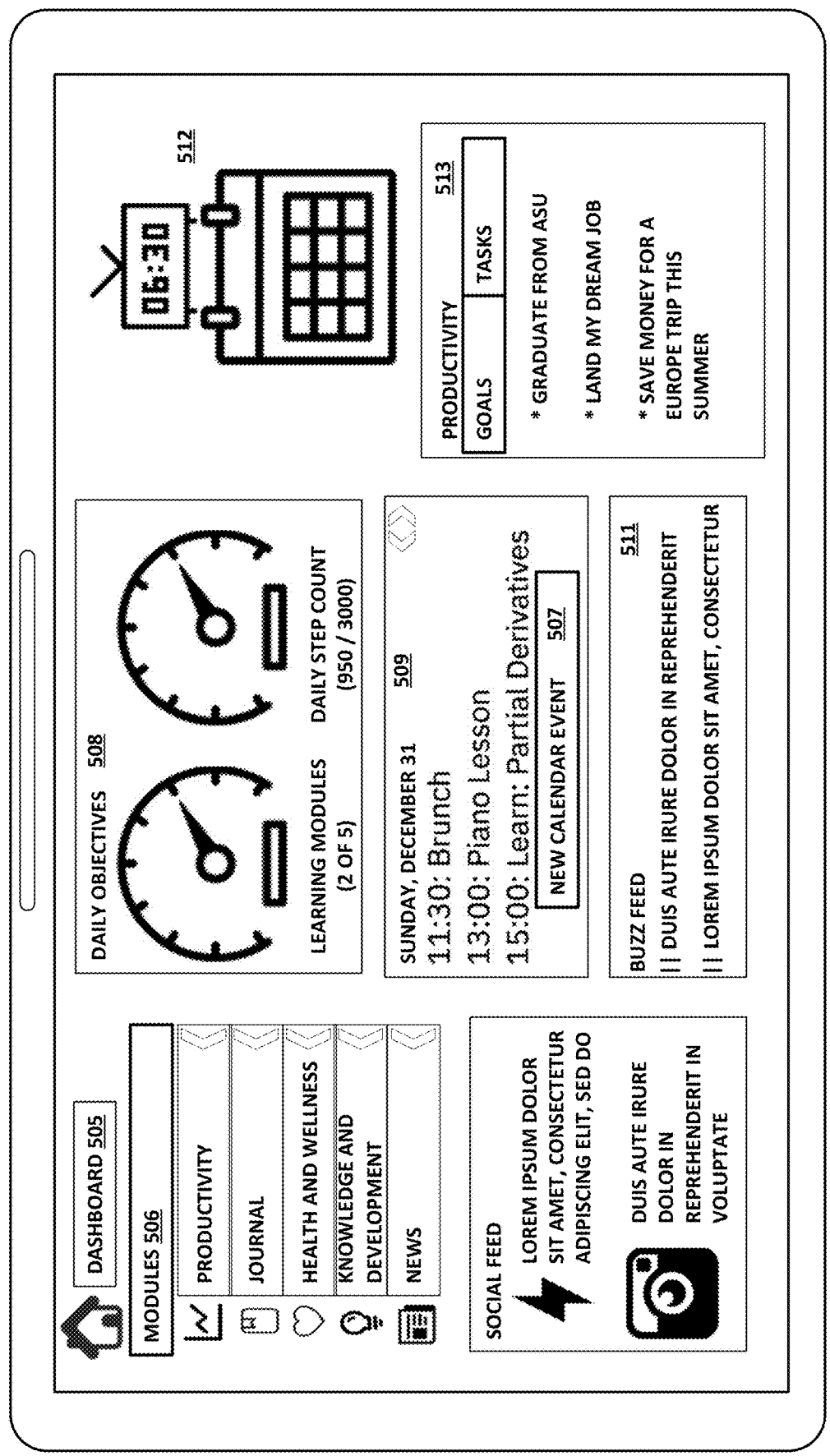
FIG. 5 illustrates an example dashboard 505 view of an AI-driven personalized learning platform 200, in accordance with aspects of the disclosure.

FIG. 5 illustrates an example dashboard 505 view of an AI-driven personalized learning platform 200, in accordance with aspects of the disclosure.

In particular, dashboard 505 view includes various modules 506 including productivity, a journal, a health and wellness module, a knowledge and development module, and a news module. Beneath the modules 506 interface is a social feed showing information derived from social networks connected by a user. Daily objectives 508 are further depicted, showing here that 2 of 5 learning modules have been completed and that a daily step count for the user is partially completed.

Additionally depicted within this example of dashboard 505 are schedule 509 which enables the user to flip through their calendar day by day, as well as an option to add a new calendar event 507. A buzz feed 511 is provided providing insights into various trending topics, stories, and news items. A date and time clock 512 may be provided, as depicted in the example of FIG. 5. Productivity 513 may likewise be provided, tracking progress against goals and tasks or other configurable metrics.

Reporting and Visualization: With reference again to FIG. 2, learning analytics module 240 offers user-friendly reporting and visualization tools, presenting data in the form of charts, graphs, and dashboards 505 (see FIG. 5). These tools enable educators, administrators, and learners to easily understand and interpret the data, facilitating informed decision-making and continuous improvement of the learning process.

Integration with Other Modules: Learning analytics module 240 seamlessly interacts with other modules, such as collaborative learning module 295, adaptive learning algorithm module 275, and assessment module 276. This integration ensures that the insights and recommendations generated by learning analytics module 240 are aligned with other features of learning platform 200, providing a comprehensive and data-driven learning experience.

In such a way, learning analytics module 240 provides a highly effective and personalized learning experience. By incorporating advanced analytics tools and techniques, the module empowers educators, administrators, and learners to make informed, data-driven decisions, ultimately enhancing the overall learning process and promoting learner success.

Career Module 281:

An optional career development and job placement services API provided by career module 281 may integrate with various career development and job placement services to help learners align their educational goals with their professional aspirations. Career module 281 may incorporate a range of features and services designed to support learners throughout their career journey, from job market trend analysis to personalized career recommendations and job placement support.

Example features and interactions of career module 281 may include:

Job Market Trend Analysis: Career module 281 may analyze current job market trends and demand for various skills, fields, and industries. This analysis helps learners make informed decisions about their educational and career paths, ensuring that they are pursuing relevant and in-demand skills.

Personalized Career Recommendations: Career module 281 may generate personalized career recommendations based on interests, strengths, and educational progress of individual learners. These recommendations may include specific job roles, industries, or further education opportunities that align with goals and professional aspirations of the learners.

Resume Building and Optimization: Career module 281 may enable integrated tools and resources via an API interface to assist learners in building and optimizing their resumes. These tools exposed by career module 281 may help learners effectively showcase their skills, experiences, and accomplishments, increasing their chances of securing interviews and job opportunities.

Interview Preparation: Career module 281 may provide resources and support for interview preparation, such as mock interviews, interview coaching, and curated content on best practices and strategies. This support ensures that learners are well-prepared and confident when facing real-life interviews.

Job Placement Support: Career module 281 may connect learners with job placement services utilizing an API interface, such as job boards, career fairs, and networking events. These services help learners find and apply for relevant job opportunities, increasing their chances of successful job placement.

Integration with Other Modules: Career module 281 may integrate with other modules, such as adaptive learning algorithm module 275, learning analytics module 240, and collaborative learning module 295. This integration ensures that career development and job placement support for learners are aligned with their educational progress and learning experiences utilizing learning platform 200.

In such a way, career module 281 supports professional aspirations and success of individual learners. By incorporating a range of career development features and services, career module 281 enables learners to effectively align their educational goals with their professional ambitions, maximizing the value of their learning experience on learning platform 200.

Accessibility Module 255:

Accessibility module 255 ensures that the learning experience is accessible to learners with diverse needs, such as those with disabilities or language barriers. By incorporating a range of accessibility features, accessibility module 255 makes learning platform 200 more inclusive and usable for a wider audience, promoting equal learning opportunities for all. Example features and interactions of accessibility module 255 include:

Adjustable Font Sizes: Accessibility module 255 may provide options for users to adjust the font size of learning content according to their preferences and needs. This feature ensures that learners with visual impairments can comfortably access and engage with the educational materials.

Screen Readers: Accessibility module 255 may integrate with screen reader software, which converts text content into speech or Braille output. This feature supports learners with visual impairments or reading difficulties, enabling them to access the learning content and navigate learning platform 200 effectively.

Closed Captioning: Accessibility module 255 may provide closed captioning for video and multimedia content, providing real-time text descriptions of the audio components. This feature is particularly beneficial for learners with hearing impairments, as it ensures that they can fully comprehend the content and participate in the learning experience.

Multi-Language Support: Accessibility module 255 may include multi-language support, allowing learning platform 200 to cater to learners with diverse linguistic backgrounds. This feature enables learners to access content in their preferred language, breaking down language barriers and promoting a more inclusive learning environment.

Alternative Text Descriptions: Accessibility module 255 may render all visual content, such as images and diagrams, with accompanying alternative text descriptions. These descriptions make the content more accessible for screen reader users and learners with visual impairments, providing a comprehensive understanding of the learning materials.

Keyboard Navigation: Accessibility module 255 may be fully navigable using only a keyboard, ensuring that learners with mobility impairments or those who cannot use a mouse can effectively access and engage with the learning content and platform features.

Integration with Other Modules: Accessibility module 255 seamlessly interacts with other modules, such as graph database 230, adaptive learning algorithm module 275, and collaborative learning module 295. This integration ensures that learning platform 200 accessibility features are consistently applied across all learning content and experiences, providing an inclusive and equitable learning environment for all users.

In such a way, accessibility module 255 promotes equal learning opportunities and fostering an inclusive learning environment. By incorporating a wide range of accessibility features, the module ensures that learning platform 200 caters to the diverse needs of its users, enabling all learners to access and engage with the educational content effectively.

Offline Access Module 293:

Offline access module 293 may provide users with the flexibility and convenience of accessing learning content even when internet connectivity is limited or unavailable. By enabling users to download content and interact with learning platform 200, offline access module 293 increases utility for learners in remote or low-resource environments, ensuring that educational opportunities remain accessible to all.

Example features and interactions of offline access module 293 include:

Content Download: Offline access module 293 may enable users to download learning content, such as videos, articles, and interactive activities, for offline access. This feature ensures that learners can continue their education without being hindered by internet connectivity issues or data limitations.

Offline Progress Tracking: Offline access module 293 may include offline progress tracking capabilities, enabling learners to keep track of their progress and achievements even when they are not connected to the internet. Once learners reconnect to learning platform 200, their offline progress is automatically synced and updated.

Offline Assessments and Quizzes: Offline access module 293 may provide offline assessments and quizzes, allowing learners to test their knowledge and skills without requiring internet connectivity. When users reconnect to learning platform 200, their offline assessment results are uploaded and integrated into their learning analytics and progress data.

Offline Collaboration: Offline access module 293 may enable offline collaboration features, such as peer review, group discussions, and project-based activities, allowing learners to engage with their peers and work together on assignments even when they are offline. Such a system may incorporate version control techniques to handle editing conflicts that are not able to be resolved with confidence by LLM 210.

Offline Accessibility Features: Offline access module 293 may extend learning platform 200 accessibility features, such as adjustable font sizes, screen readers, and closed captioning, to users even when not connected to the internet.

Integration with Other Modules: Offline access module 293 seamlessly interacts with other modules, such as graph database 230, adaptive learning algorithm module 275, and collaborative learning module 295. This integration ensures that learning platform 200 offline access features are consistently applied across all learning content and experiences, providing a comprehensive and versatile learning environment.

In such a way, offline access module 293 enhances learning platform 200 utility and versatility, ensuring that learners can access educational content and engage with learning platform 200 regardless of their internet connectivity. By incorporating features that enable offline access and engagement, this module helps bridge the digital divide and promote equal learning opportunities for learners in various environments and situations.

Teacher and Mentor Support Module 285:

Teacher and mentor support module 285 may facilitate communication and engagement between learners and educators. By integrating features that enable seamless collaboration, Teacher and mentor support module 285 may help bridge the gap between AI-generated content and human mentorship, further enhancing the learning experience and promoting deeper understanding.

Example features and interactions of teacher and mentor support module 285 include:

Messaging: Teacher and mentor support module 285 may incorporate a messaging system that allows learners to communicate with educators and mentors directly. This feature enables learners to ask questions, seek clarification, and receive personalized guidance, fostering a supportive and interactive learning environment.

Video Conferencing: Teacher and mentor support module 285 may include video conferencing capabilities, enabling real-time, face-to-face engagement between learners and educators. This feature allows for live discussions, virtual classes, and one-on-one mentoring sessions, enhancing the learning experience by incorporating human connection and support.

Shared Workspaces: Teacher and mentor support module 285 may provide shared workspaces, such as virtual whiteboards or collaborative documents, where learners and educators can work together on projects, assignments, or problem-solving activities. These shared workspaces promote collaboration, teamwork, and active learning, while also enabling educators to provide real-time feedback and guidance.

Scheduling and Calendar Integration: Teacher and mentor support module 285 may provide tools for scheduling and calendar integration, allowing learners and educators to coordinate their availability for meetings, tutoring sessions, or virtual classes. This feature simplifies the process of scheduling and ensures that learners can access the support they need when they need it.

Educator Profiles and Reviews: Teacher and mentor support module 285 may include educator profiles and reviews, enabling learners to find the most suitable mentors or teachers based on their expertise, experience, and feedback from other learners. This feature helps ensure that learners are paired with educators who can best support their learning needs and goals.

Integration with Other Modules: Teacher and mentor support module 285 may integrate seamlessly with other modules, such as adaptive learning algorithm module 275, learning analytics module 240, and collaborative learning module 295. This integration ensures that learning platform 200 human support and mentorship features are consistently applied across all learning content and experiences, providing a comprehensive and well-rounded learning experience.

In such a way, teacher and mentor support module 285 enhances the learning experience by integrating human mentorship and support with AI-generated content. By incorporating features that facilitate communication and collaboration between learners and educators, this module fosters a more engaging, interactive, and supportive learning environment, ultimately contributing to learners' success and growth.

Multi-Modal Content Module 282:

An optional multi-modal content (MMC) module 282 expands the range of content delivery formats to cater to different learning styles and preferences. Multi-modal content module 282 may provide various content formats, such as video, audio, interactive simulations, virtual labs, and text-based materials. Additionally, multi-modal content module 282 may integrate virtual and augmented reality (VR/AR) technologies, creating immersive, interactive, and engaging learning environments. VR/AR technologies can be especially beneficial for teaching complex concepts, visualizations, or simulations that are difficult to convey through traditional methods.

Example features and interactions of multi-modal content module 282 include:

Video: Multi-modal content module 282 may provide high-quality video lectures, demonstrations, or animations that visually explain concepts and ideas to learners.

Audio: Multi-modal content module 282 may provide podcasts, audiobooks, or narrated presentations that allow learners to listen to content while engaged in other activities.

Interactive Simulations: Multi-modal content module 282 may provide digital simulations that enable learners to explore and manipulate virtual environments, providing a hands-on learning experience.

Virtual Labs: Multi-modal content module 282 may provide online laboratories that allow learners to conduct experiments and explore scientific concepts in a safe and controlled environment.

Text-based Materials: Multi-modal content module 282 may provide eBooks, articles, and written content that provide in-depth explanations of concepts and ideas.

Virtual Reality (VR): Multi-modal content module 282 may provide immersive experiences that transport learners to virtual environments where they can explore and interact with digital objects and simulations.

Augmented Reality (AR): Multi-modal content module 282 may enable overlaying digital information onto a real-world view of an individual learner, enhancing understanding of concepts and ideas of such learners by providing contextually relevant information.

Figure 6:
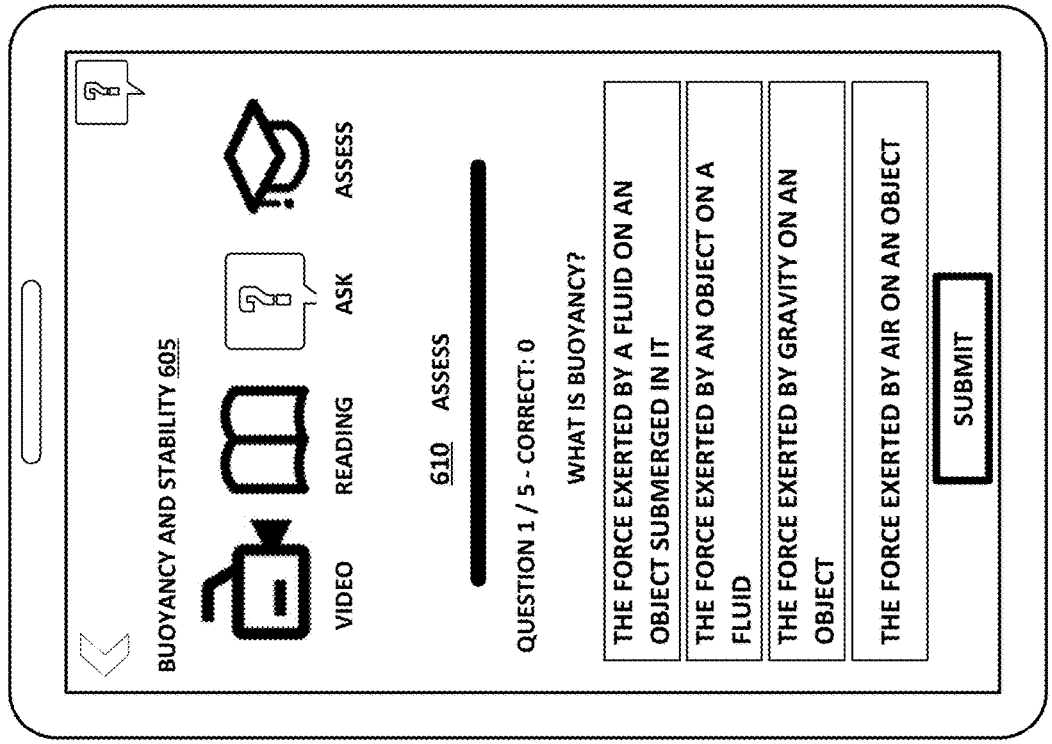
FIG. 6 illustrates example AI learning interfaces 600, 601 showing learning unit 605 for "buoyancy and stability" and different modalities 615, in accordance with aspects of the disclosure.
Figure 6:
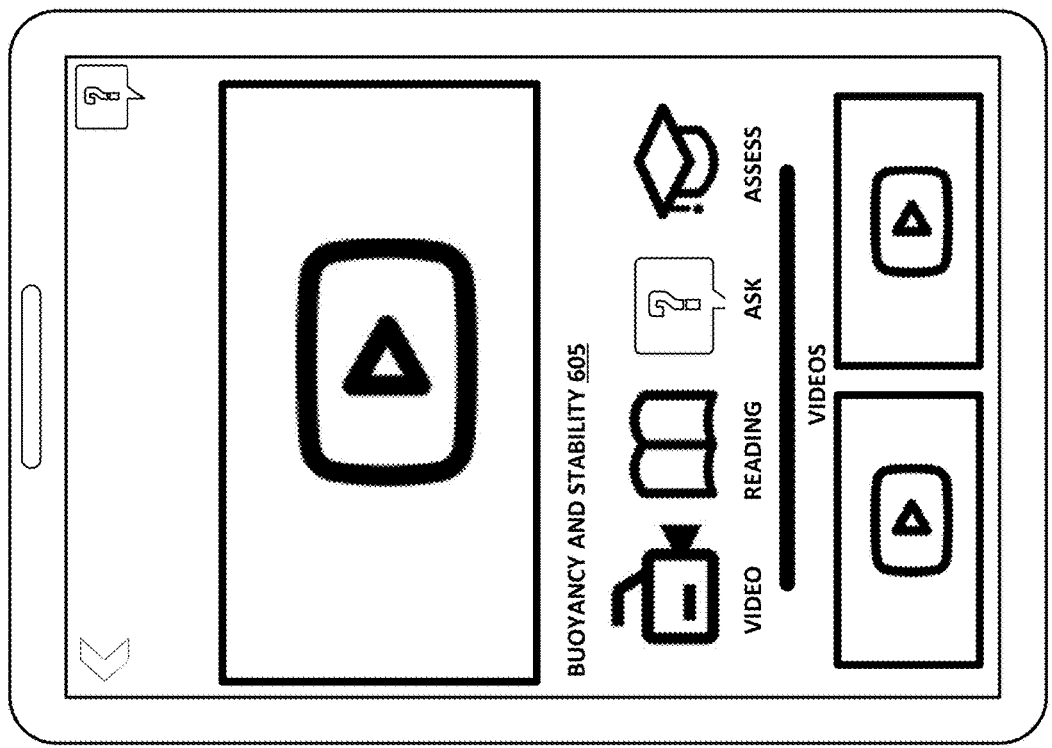

FIG. 6 illustrates example AI learning interfaces 600, 601 showing learning unit 605 for "buoyancy and stability" and different modalities 615, in accordance with aspects of the disclosure.

For instance, as depicted here, modalities 615 for learning via video, reading, asking interactive questions, and assessment are provided by AI learning interface 600. At AI learning interface 601, a student learner has selected assess 610 as one of the available learning modalities 615 is therefore presented with questions to test the knowledge of the learner on the topic of "buoyancy and stability." AI learning interface 601 shows that the learner is presented with question 1 of 5 and has yet to answer any questions.

By offering a diverse range of content delivery formats and educational modalities 615, learning platform 200 supports better retention and understanding of complex concepts, making it accessible and engaging for learners with different learning styles and preferences.

Figure 7A:
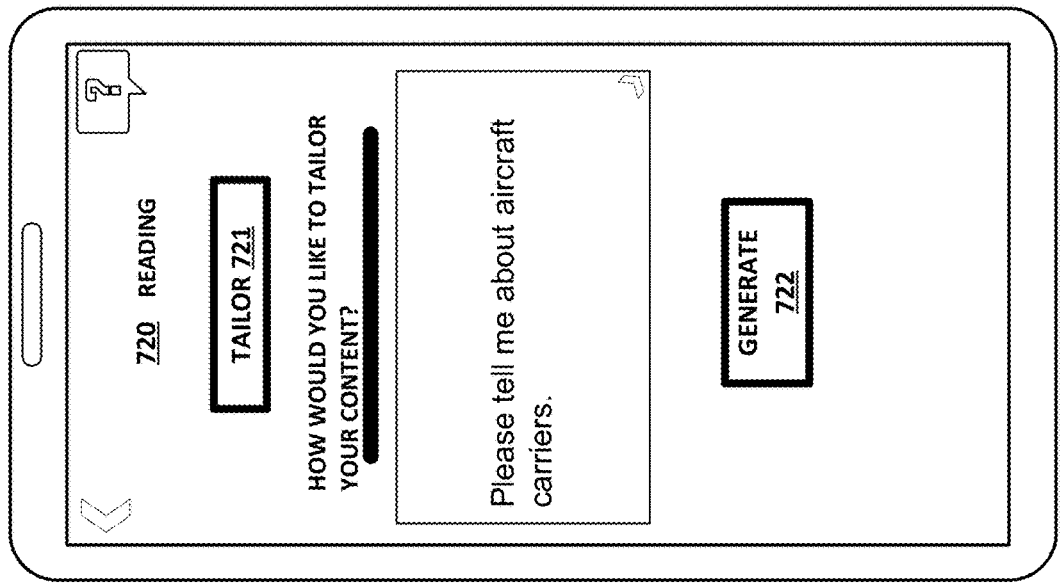
FIGS. 7A and 7B illustrate example AI interfaces 701, 702, and 703 which output personalized, AI generated content to a student learner, in accordance with aspects of the disclosure.
Figure 7A:
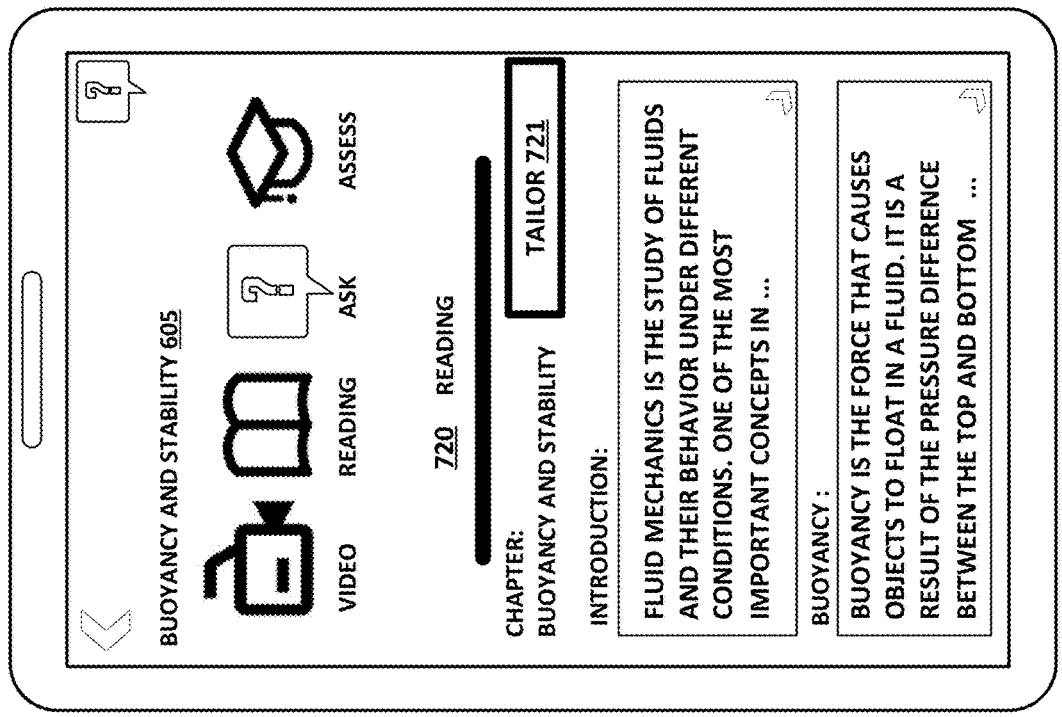
Figure 7B:
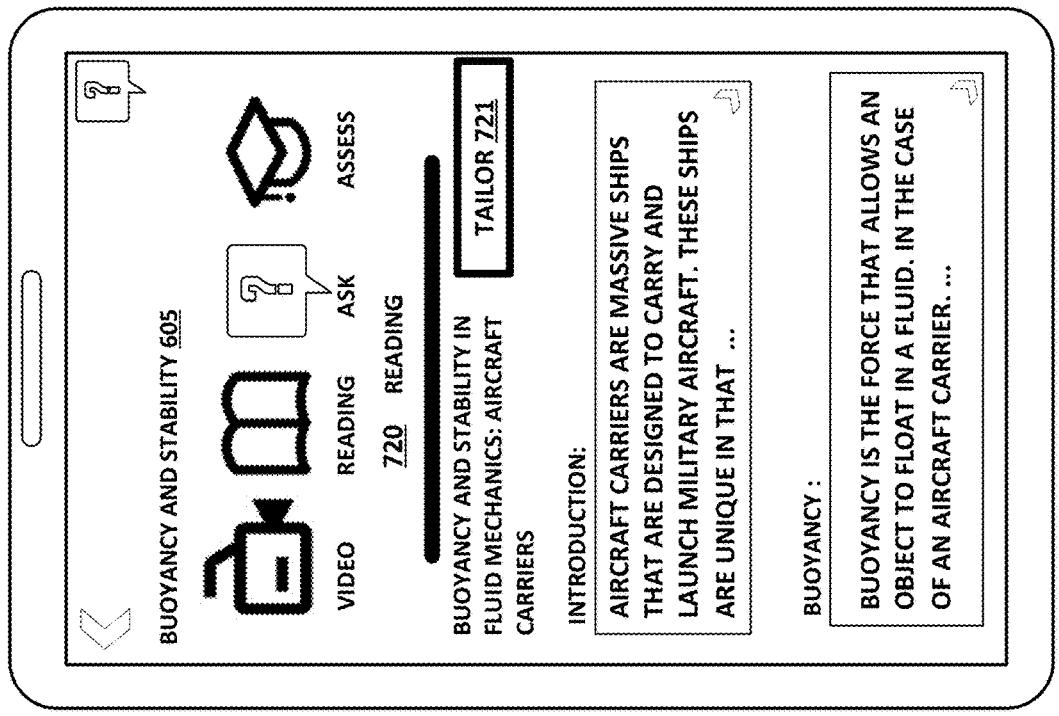
Figure 7B:
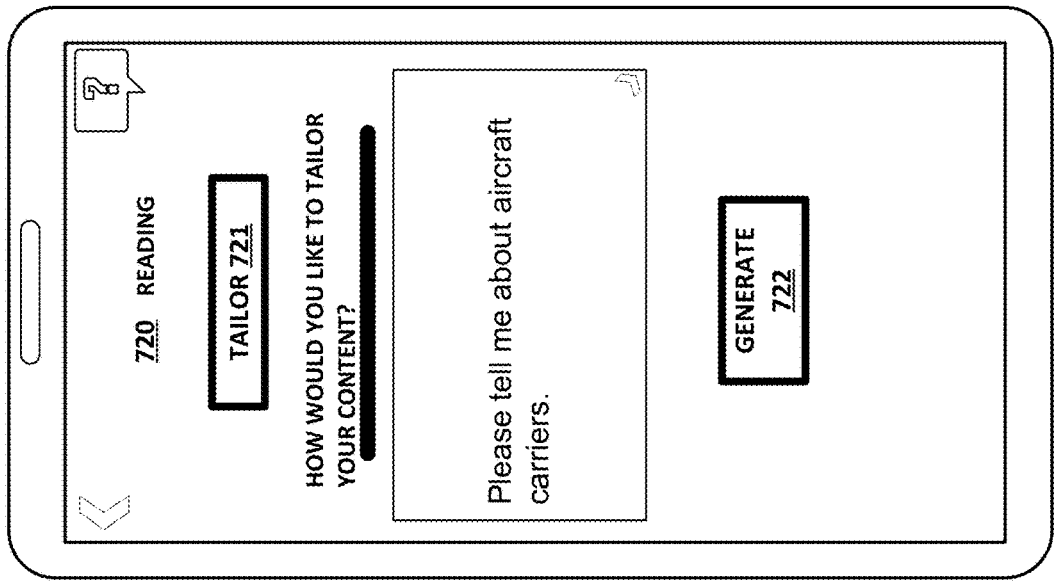

FIGS. 7A and 7B illustrate example AI interfaces 701, 702, and 703 which output personalized, AI generated content to a student learner, in accordance with aspects of the disclosure.

In particular, FIG. 7A depicts AI learning interface 701 for which a learner has selected a reading 720 modality for the "buoyancy and stability" learning unit 605. The student learner may click the "tailor" button 721 on user interface 250 of AI learning interface 701 which then navigates the user to AI learning interface 702. At AI learning interface 701, the user is presented with a natural language inquiry generated by LLM 210, asking: "How would you like to tailor your content?" In the example depicted, the user inquires: "Please tell me about aircraft carriers." The user may then press the generate 722 UI button to generate tailored reading content within the "buoyancy and stability" learning unit 605.

FIG. 7B depicts AI learning interface 702 described previously and further depicts AI learning interface 703 within which learning platform 200 has self-generated newly tailored educational content about aircraft carriers within the "buoyancy and stability" learning unit 605. Notably, the subject matter of the "buoyancy and stability" learning unit 605 remains available for reading, but is modified or "tailored" 721 based on the user inquiry. Specifically, the "buoyancy and stability" learning unit 605 is tailored to discuss "buoyancy and stability" within the context of aircraft carriers, which may be of particular interest to the learner and may therefore enhance the learning experience of the individual learner.

Content Generation 283 and AI Content Production Module:

With reference again to FIG. 2B, content generation 283 and AI content production module leverages advanced generative AI algorithms to create high-quality educational materials for each of the content delivery formats discussed in the context of multi-modal content module 282 providing multi-modal content delivery and virtual/augmented reality integration module. Generative AI algorithms produce contextually relevant, engaging, and pedagogically sound content that aligns with the learning objectives and requirements of each learning pathway.

Example features and interactions of content generation 283 and AI content production module leverages and sub-modules include:

Video Generation: Content generation 283 module may utilize AI algorithms to analyze the learning objectives and automatically generate video scripts, storyboards, and animations, ensuring that the content visually explains concepts and ideas to learners in an engaging manner.

Audio Generation: Content generation 283 module may utilize AI to generate audio materials such as podcasts, audiobooks, or narrated presentations by analyzing the learning objectives, creating scripts, and converting them into natural-sounding speech using text-to-speech technology.

Interactive Simulations Generation: Content generation 283 module may utilize AI to design and develop digital simulations that enable learners to explore and manipulate virtual environments, providing a hands-on learning experience that aligns with the learning objectives.

Virtual Labs Generation: Content generation 283 module may utilize AI to create online laboratory scenarios that allow learners to conduct experiments and explore scientific concepts in a safe and controlled environment, ensuring that the virtual labs are pedagogically sound and relevant to the learning objectives.

Text-based Materials Generation: Content generation 283 module may utilize AI algorithms to generate written content such as eBooks, articles, and in-depth explanations of concepts and ideas by analyzing the learning objectives and using natural language processing techniques to produce coherent, informative, and engaging text.

Virtual Reality (VR) Content Generation: Content generation 283 module may utilize AI algorithms to develop immersive VR experiences by creating virtual environments, digital objects, and simulations that align with the learning objectives, providing learners with engaging and interactive educational experiences.

Augmented Reality (AR) Content Generation: Content generation 283 module may utilize AI algorithms to generate AR experiences by overlaying digital information onto real-world view of individual learners, enhancing their understanding of concepts and ideas by providing contextually relevant information that aligns with the learning objectives.

In such a way, content generation 283 and AI content production module ensures that learning platform 200 consistently delivers high-quality, engaging, and personalized educational materials across all content delivery formats, catering to diverse learning styles and preferences while maintaining a high level of pedagogical efficacy.

Learning Content Deployment Module 220 with LMS Integration:

Referring again to FIG. 2, learning content deployment module 220 (with LMS integration) enables seamless deployment of the learning content generated by learning platform 200 to Learning Management Systems (LMS) using Learning Tools Interoperability (LTI) and widely-accepted e-learning standards, such as xAPI (Experience API) or SCORM (Sharable Content Object Reference Model). This integration ensures that learning platform 200 high-quality and personalized educational materials can be easily accessed and utilized in various learning environments.

Learning content deployment module 220 with LMS Integration includes the following sub-modules:

LTI Integration: Learning content deployment module 220 may utilize LTI enabling learning platform 200 to securely integrate its content with different LMS type systems, allowing users to access the learning materials within their existing learning environment. This integration ensures a smooth user experience and streamlines content management for educators and administrators.

xAPI Compatibility: Learning content deployment module 220 may utilize the xAPI standard, which enables tracking and reporting of user learning experiences and engagements with the content. By utilizing xAPI, Learning content deployment module 220 provides detailed insights into progress, performance, and engagement of individual learners, facilitating data-driven decision-making and optimization of the learning experience.

SCORM Compatibility: Learning content deployment module 220 may support SCORM, a widely-used e-learning standard that defines how content is structured, packaged, and communicated with an LMS. By adhering to SCORM standards, the learning content deployment module ensures compatibility with a broad range of LMSs and enables efficient content management and reporting.

In such a way, learning content deployment module 220 with LMS Integration ensures that educational materials can be easily accessed, managed, and tracked in various LMS systems, providing flexibility for users and institutions while maintaining a high-quality learning experience from learning platform 200.

Figure 8:
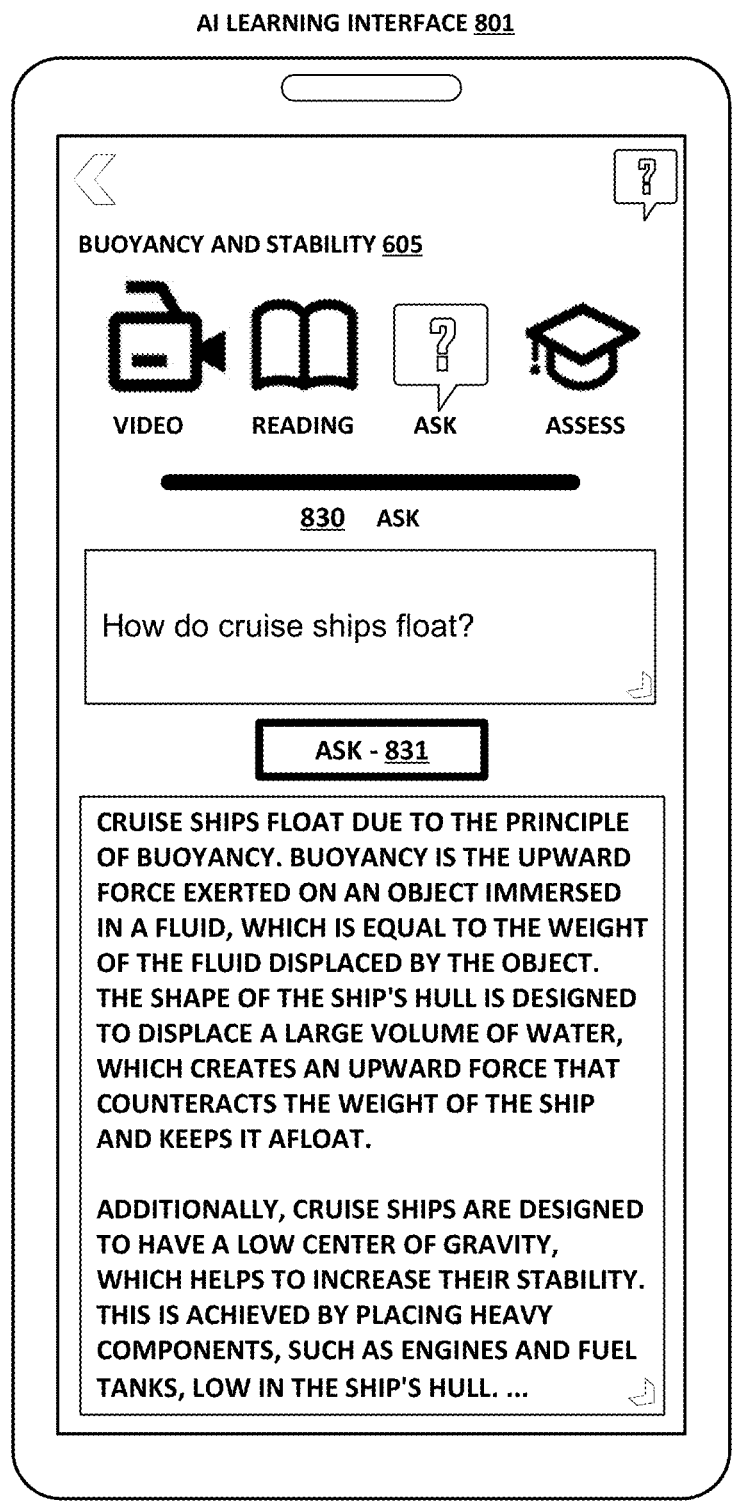
FIG. 8 illustrates an example AI learning interface 801 providing an AI based tutor to student learners capable of answering questions contextualized to a current learning area, in accordance with aspects of the disclosure.

FIG. 8 illustrates an example AI learning interface 801 providing an AI based tutor to student learners capable of answering questions contextualized to a current learning area, in accordance with aspects of the disclosure.

In particular, depicted here is AI learning interface 801 which displays learning unit 605 for "buoyancy and stability" within the ask 830 modality type. AI learning interface 801 enables a user to ask a natural language question just in the same manner that a student learner may pose an inquiry to a teacher, professor, or tutor. As shown here, the learner inputs "How do cruise ships float?" within the area for the prompt. Users may then click the ask button 831, responsive to which, AI learning interface 801 automatically generates and outputs for display, an answer responsive to the question asked. Here, the answer describes how cruise ships float within the context of learning unit 605 for "buoyancy and stability."

Interactive AI Tutor 270 Module:

With reference again to FIG. 2, interactive AI tutor 270 module complements teacher and mentor support module 285 by incorporating an AI-driven tutoring component that simulates human-like engagement and support. Interactive AI tutor 270 provides personalized guidance, feedback, and mentorship throughout the learning process, ensuring that each learner receives tailored assistance in line with their needs and goals.

Example features and interactions of interactive AI tutor 270 module includes:

Personalized Guidance: Interactive AI tutor 270 analyzes progress, strengths, weaknesses, and learning preferences of individual learners to provide customized recommendations and advice on how to effectively navigate their learning pathway. This can involve suggesting specific resources, identifying knowledge gaps, and offering targeted tips to optimize learning outcomes.

Real-time Feedback: As learners engage with learning platform 200, interactive AI tutor 270 delivers immediate and constructive feedback on their performance, helping them to identify areas for improvement and adjust their approach accordingly. This real-time feedback system 232 enables learners to refine their understanding and application of concepts more efficiently.

Mentorship and Support: Interactive AI tutor 270 emulates human-like mentorship by engaging with learners through conversation and interactive problem-solving exercises. This fosters a more engaging and supportive learning environment, motivating learners to actively participate in the educational process and enhancing their overall learning experience.

Seamless Integration: Interactive AI tutor 270 module works in harmony with the other modules of learning platform 200, such as the adaptive learning algorithm module 275, collaborative learning module 295, and learning analytics module 240. This ensures a cohesive and comprehensive learning experience that leverages the strengths of both AI-driven and human-driven support systems.

By incorporating interactive AI tutor 270 into learning platform 200, interactive AI tutor 270 provides learners with a more engaging, supportive, and personalized educational experience, ultimately contributing to improved learning outcomes and user satisfaction.

Immersive Storytelling Module 291:

Immersive storytelling module 291 leverages AI large language models (LLMs) 210 to generate contextually relevant and engaging stories that intertwine seamlessly with the learning content. Immersive storytelling module 291 provides immersive narratives that adapt to interests and experiences of individual learners, creating a more engaging and personalized learning environment.

Example features and interactions of immersive storytelling module 291 include:

Contextually Relevant Stories: Immersive storytelling module 291 may utilize LLM 210, or a similar advanced language model to generate stories that are directly related to the learning content, ensuring that the narratives are both meaningful and relevant to educational goals of individual learners. This helps to create a more immersive and enjoyable learning experience while reinforcing key concepts and ideas.

Personalized Narratives: Immersive storytelling module 291 considers interests, preferences, and experiences of individual learners to craft unique and customized narratives. This personalization fosters a more engaging and relatable learning environment, ultimately increasing motivation and investment of individual learners in the educational process.

Adaptability: The stories generated by immersive storytelling module 291 are dynamic and adaptable to progress, achievements, and challenges of individual learners, ensuring that the narratives remain relevant and engaging throughout the learning journey. This adaptability also enables learning platform 200 to cater to learners with diverse backgrounds and learning needs.

Integration with Other Modules: Immersive storytelling module 291 works in harmony with the other modules of learning platform 200, such as the adaptive learning algorithm module 275, collaborative learning module 295, content generation 283 module for AI content production, and interactive AI tutor 270 module. This ensures a cohesive and comprehensive learning experience that combines the power of storytelling with cutting-edge educational technology.

By incorporating immersive storytelling module 291 into learning platform 200, the system can provide learners with an engaging, captivating, and personalized educational experience that transcends traditional learning methods and enhances overall user satisfaction.

Conversational AI Engagement Architecture 205:

Conversational AI engagement architecture 205 is designed to assess current engagement levels of users and generate contextually relevant inquiries to achieve specific goals. Conversational AI engagement architecture 205 enhances the AI-driven tutoring and mentorship experience, allowing for increased personalization and more effective goal attainment.

Example features and interactions of conversational AI engagement architecture 205 include:

Engagement State Assessment: Conversational AI engagement architecture 205 continuously analyzes engagements of individual learners with learning platform 200, determining their current state of engagement and identifying opportunities to generate relevant inquiries that support goal achievement.

Inquiry Generation: Based on an engagement state assessment of individual learners, conversational AI engagement architecture 205 may generate contextually relevant inquiries aimed at gathering information from the user, driving goal-oriented behavior, or improving the overall learning experience.

Message Queuing and Delivery: Conversational AI engagement architecture 205 may periodically generate inquiries which are automatically queued up and sent to users at a frequency determined by their ongoing preferences and engagement levels. This adaptive messaging approach ensures that users receive timely and relevant information without feeling overwhelmed or disengaged.

Integration with Other Modules: Conversational AI engagement architecture 205 seamlessly interacts with other modules, such as interactive AI tutor 270, emotional intelligence module 292, and adaptive learning algorithm module 275. This integration ensures that the inquiries generated by conversational AI engagement architecture 205 are aligned with learning platform 200 other features, providing a comprehensive and engaging learning experience.

AI-Driven Calendar Integration 245 Module:

AI-Driven calendar integration 245 module consumes, processes, and contextualizes calendar information of individual learners for enhanced scheduling and optimization of learning modules. By understanding lifestyle patterns and commitments of individual learners, learning platform 200 adapts the learning experience to fit seamlessly into their daily routine.

Example features and interactions of AI-Driven calendar integration 245 module include:

Calendar Processing: AI-Driven calendar integration 245 module may access and process calendar information of individual learners, extracting relevant information about their schedule, commitments, and lifestyle patterns.

Contextualization: AI-Driven calendar integration 245 module may analyze extracted calendar information, understanding preferences, habits, and time constraints of individual learners to inform the scheduling and optimization of learning modules.

Learning Module Scheduling: Based on calendar information and lifestyle patterns of individual learners, AI-Driven calendar integration 245 module may schedule learning modules in a way that accommodates commitments and preferences of users, ensuring that learning activities align with their daily routine.

Lifestyle Pattern Optimization: AI-Driven calendar integration 245 module may identify patterns and trends of individual learners lifestyles and use this information to optimize the learning experience, adapting the scheduling and pacing of learning modules as needed.

Integration with Other Modules: AI-Driven calendar integration 245 interacts seamlessly with other modules, such as adaptive learning algorithm module 275 and learning analytics module 240. This integration ensures that learning platform 200 can adapt the learning experience based on calendar insights, providing a truly personalized and optimized learning journey.

Figure 9:
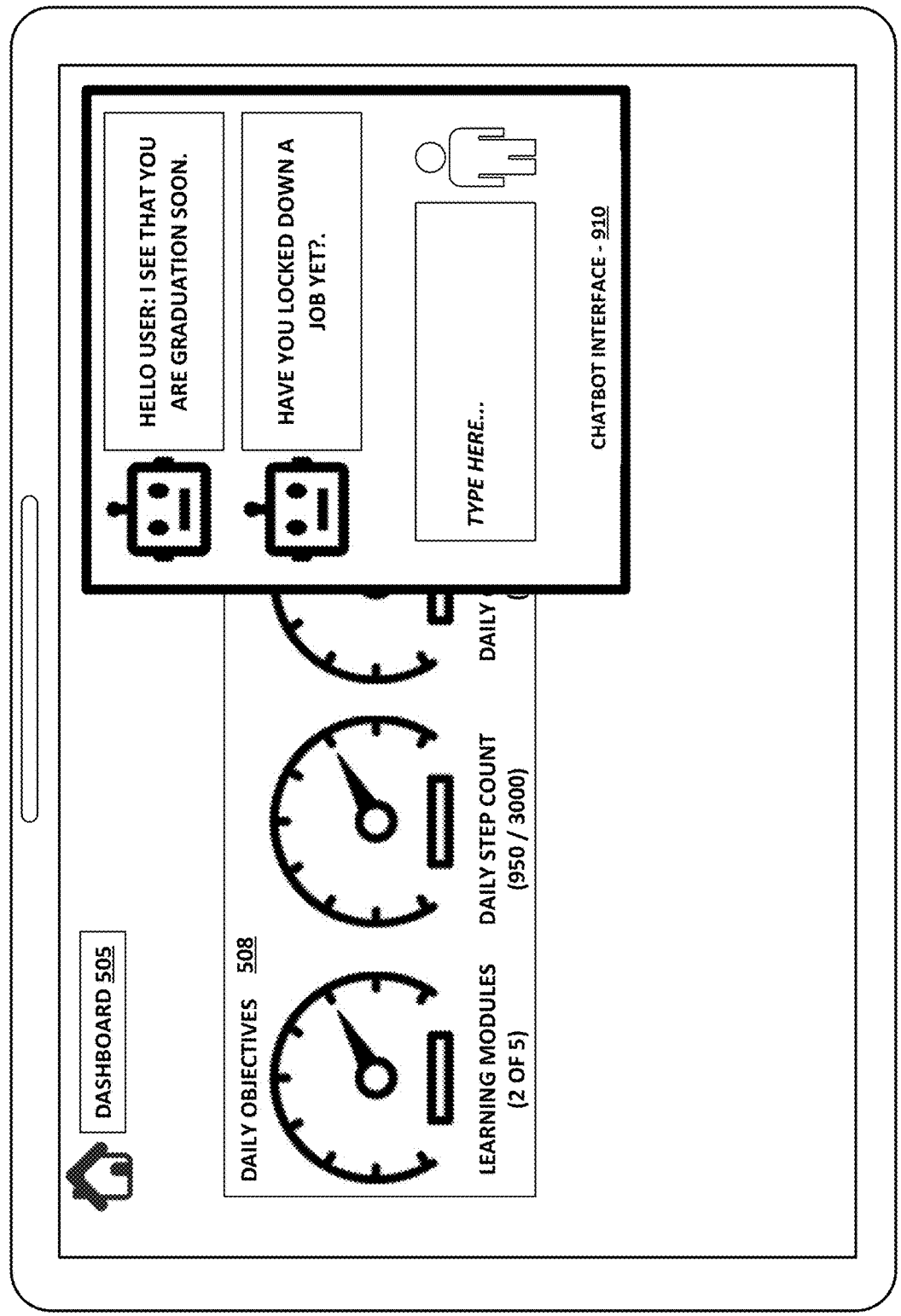
FIG. 9 illustrates an example AI interface 901 performing the queuing up of contextually relevant engagements using integration with a calendar module, in accordance with aspects of the disclosure.

FIG. 9 illustrates an example AI interface 901 performing the queuing up of contextually relevant engagements using integration with a calendar module, in accordance with aspects of the disclosure.

In particular, depicted here as an overlay within AI interface 901 over dashboard 505 is a chatbot interface 910, with the chatbot greeting the user, and then remarking that it sees that the learner is graduating soon. The chatbot then enquires the user whether they have secured a job.

AI interface 901 may be powered by emotional intelligence module 292 in collaboration with other components of learning platform 200.

Emotional Intelligence Module 292:

Emotional intelligence module 292 is a sophisticated extension of learning platform 200 that detects and responds to detected emotions of the users (also referred to as sentiment) to enhance the learning experience. Emotional intelligence module 292 integrates emotional intelligence and empathy into the AI-driven interactive AI tutor 270 component, creating a more supportive, engaging, and personalized educational environment.

Example features and interactions of emotional intelligence module 292 include:

Emotion Detection: Emotional intelligence module 292 uses advanced emotion recognition technology, such as natural language processing and facial expression analysis, to detect user emotions and sentiments during their learning journey. This allows learning platform 200 to better understand emotional states of the learners and adjust the learning experience appropriately.

Responsive AI Tutoring: By incorporating emotional intelligence into the AI-driven tutoring component, emotional intelligence module 292 enables interactive AI tutor 270 to respond empathetically and effectively to learner emotions. This can involve offering words of encouragement, adjusting the pace or difficulty of the content, or suggesting breaks or stress-reducing activities.

Personalized Emotional Support: Emotional intelligence module 292 tailors its emotional support to each individual learner, considering their unique emotional needs, preferences, and challenges. This personalization fosters a more nurturing and empathetic learning environment that can ultimately improve learner motivation, resilience, and overall well-being.

Integration with Other Modules: Emotional intelligence module 292 works in harmony with the other modules of learning platform 200, such as adaptive learning algorithm module 275, collaborative learning module 295, and interactive AI tutor 270. This ensures a cohesive and comprehensive learning experience that addresses not only cognitive but also emotional aspects of the learning process.

By incorporating emotional intelligence module 292 into learning platform 200, the system provides learners with a more emotionally attuned and supportive educational experience, ultimately contributing to improved learning outcomes and user satisfaction.

Ethical and Moral Framework Module 290:

With reference again to FIG. 2, ethical and moral framework module 290 fosters the development of ethical reasoning and moral values in learners. Ethical and moral framework module 290 addresses the need for a comprehensive and holistic educational experience that imparts not only academic knowledge but also cultivates a strong ethical and moral foundation in learners.

Example features and interactions of ethical and moral framework module 290 include:

Content and Activities Encouraging Ethical Reasoning and Moral Values: Ethical and moral framework module 290 incorporates a wide range of content and activities specifically designed to engage learners in ethical discussions and moral dilemmas. These activities include case studies, simulations, debates, and interactive scenarios that challenge learners to think critically about ethical issues and make morally responsible choices. By exposing learners to diverse perspectives and complex situations, the module helps them develop their ethical reasoning skills, empathy, and understanding of the nuances of moral values.

Integration of Ethical and Moral Teaching Alongside Academic Subjects: Ethical and moral framework module 290 is seamlessly integrated into learning platform 200, ensuring that ethical and moral considerations are woven into the fabric of the overall learning experience. This integration occurs at various levels, such as embedding ethical discussions within academic subjects, offering standalone courses on ethics and morality, and providing opportunities for learners to engage in service-learning projects. By integrating ethical and moral teaching with academic subjects, the module reinforces the importance of ethical considerations in all aspects of life, equipping learners to navigate real-world challenges with a strong moral compass.

Customized Ethical and Moral Learning Pathways: Ethical and moral framework module 290 works in conjunction with adaptive learning algorithm module 275 to create personalized ethical and moral learning pathways. These pathways consider interests, background, and prior knowledge of individual learners, tailoring the ethical and moral learning experience to their unique needs and preferences.

Real-World Applications and Reflection: Ethical and moral framework module 290 may encourage learners to apply their ethical reasoning and moral values to real-world situations and engage in reflective practices. This approach helps learners connect their understanding of ethics and morality to their everyday lives, promoting the development of ethical decision-making skills and moral values that extend beyond the learning environment.

Assessment and Feedback: Ethical and moral framework module 290 may integrate with assessment module 276 to evaluate learners for understanding of ethical concepts and the development of moral values. Assessments can include written assignments, group discussions, or reflective journals that encourage learners to articulate and evaluate their ethical beliefs and moral values. Feedback from educators, peers, or interactive AI tutor 270 can further support learner growth in this area.

Ethical and moral framework module 290 helps provide a well-rounded and values-based educational experience. By incorporating engaging content, activities, and personalized learning pathways, the module helps learners develop a strong ethical and moral foundation that will serve them well in their personal and professional lives.

User Interface 250 and Engagement Support:

The personalized learning platform provides a comprehensive user interface 250 and engagement support system to drive user engagement across various devices and contexts, including web and mobile apps, virtual reality headsets, and an embodied, visual conversational AI. User interface 250 and engagement support system ensures that learners seamlessly engage with the educational content, learning pathways, and various modules of the system, making the learning experience more accessible and adaptable to various contexts.

Example features and interactions of user interface 250 and engagement support module include:

Cross-Platform Compatibility: User interface 250 and engagement support system is compatible with various devices and operating systems, ensuring that learners can access learning platform 200 from their preferred device, be it a desktop computer, laptop, tablet, smartphone, or virtual reality headset. This cross-platform compatibility enables the learning experience to adapt to different contexts and ensures that learners can engage with learning platform 200 whenever and wherever is most convenient for them.

Figure 10:
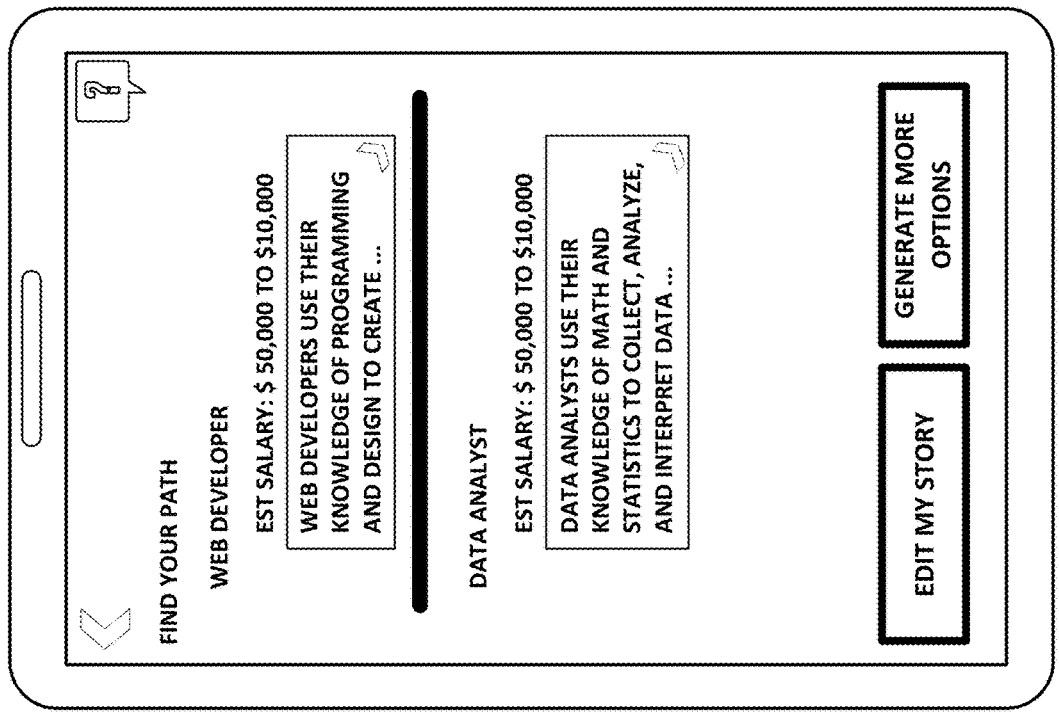
FIG. 10 illustrates an example AI learning interface 1001 depicting a user sharing their "path" and "life story" as input and AI system learning interface 1002 responsively generating relevant learning path options with AI generated images to support the learner, in accordance with aspects of the disclosure.
Figure 10:
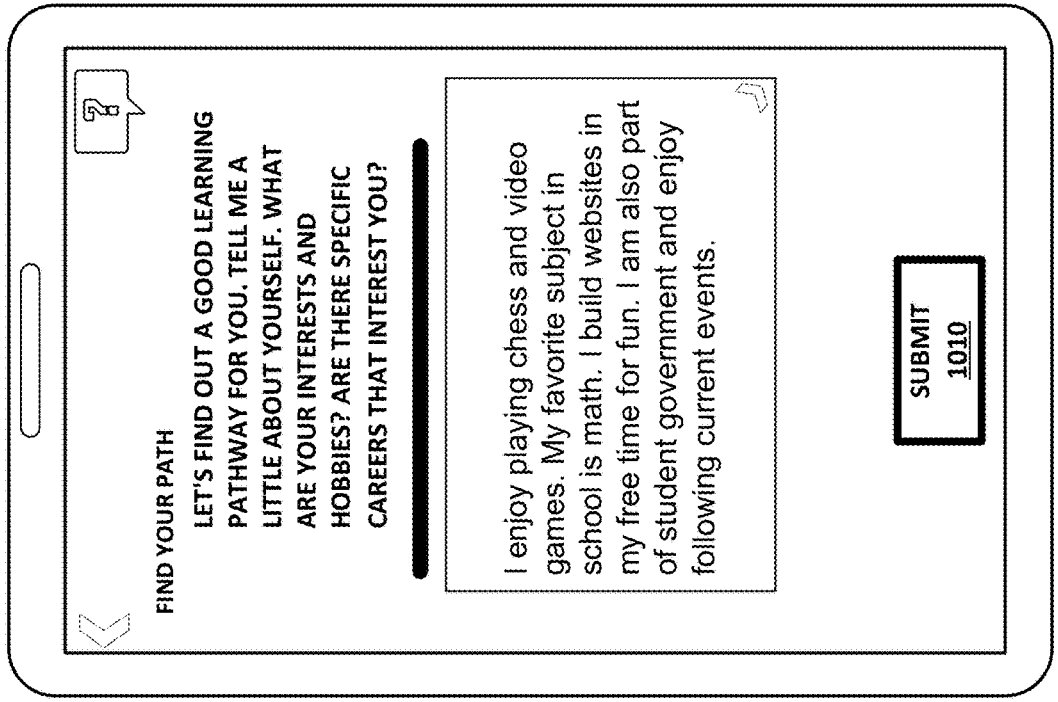

FIG. 10 illustrates an example AI learning interface 1001 depicting a user sharing their "path" and "life story" as input and AI system learning interface 1002 responsively generating relevant learning path options with AI generated images to support the learner, in accordance with aspects of the disclosure.

In particular, AI learning interface 1001 depicts a user responding to the "find your path" prompt. Specifically, users enter information about their enjoyment of playing chess and video games, their favorite subject being match, and the fact that they build websites for fun. The user may then click the submit button 1010 and AI learning interface 1002 responsively generates as output, suggested career development paths. As depicted within AI learning interface 1002, learning platform 200 has suggested a "web developer" and a "data analyst" as possible options for the student learner, supported by salary estimates and description of each of the potential career paths.

The learner may interact with either of the suggested career development paths within AI learning interface 1002 to gather more information or the learner may click on either of the prompts at the bottom of AI learning interface 1002, including "edit my story" which permits the user to return to AI learning interface 1001 via which they may alter or supplement their original input responsive to the "find your path" prompt or the user may click the "generate more options" button, responsive to which AI learning interface 1002 will generate modified suggested career development paths which are still based on the user's response to the "find your path" prompt at AI learning interface 1001, but different than the suggested career development paths shown.

Intuitive User Interface and Navigation: Learning platform 200 offers an intuitive user interface across all supported devices, allowing learners to easily navigate through the system, select learning pathways, access content, and engage with the various modules. The user interface 250 is designed with user experience in mind, ensuring that learners can quickly find and access the resources they need without any unnecessary complexity.

Figure 11:
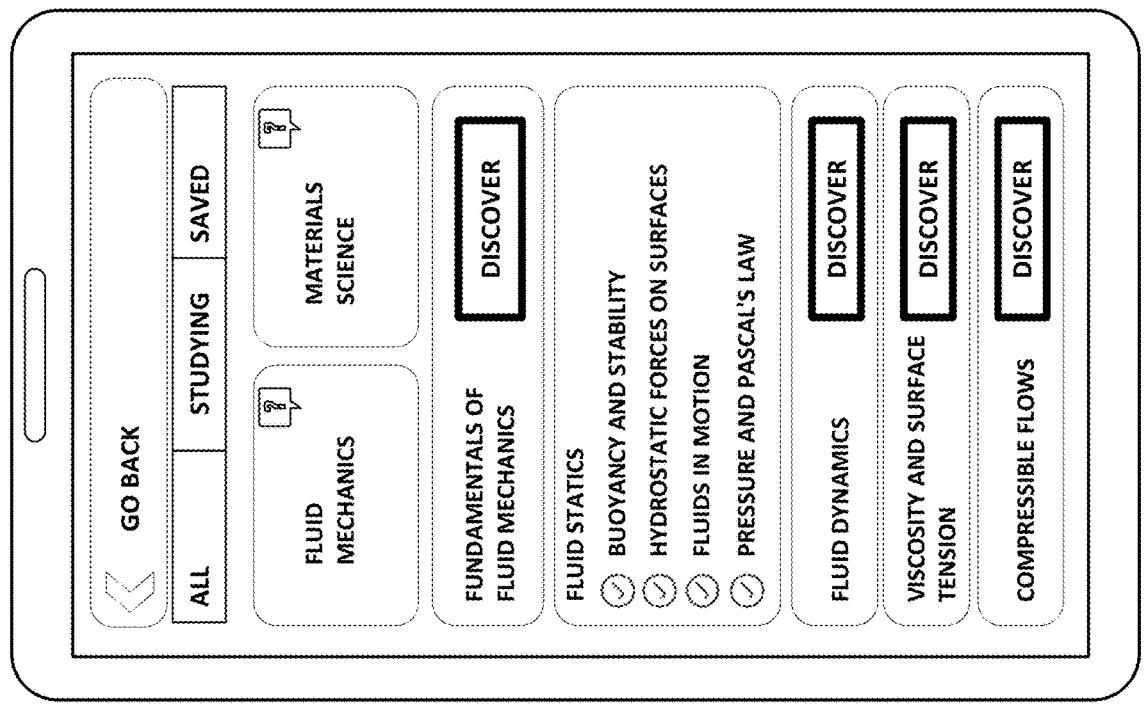
FIG. 11 illustrates AI learning interface 1101 and 1102 via which a user may search their learning pathways and explore potential learning pathways, in accordance with aspects of the disclosure.
Figure 11:
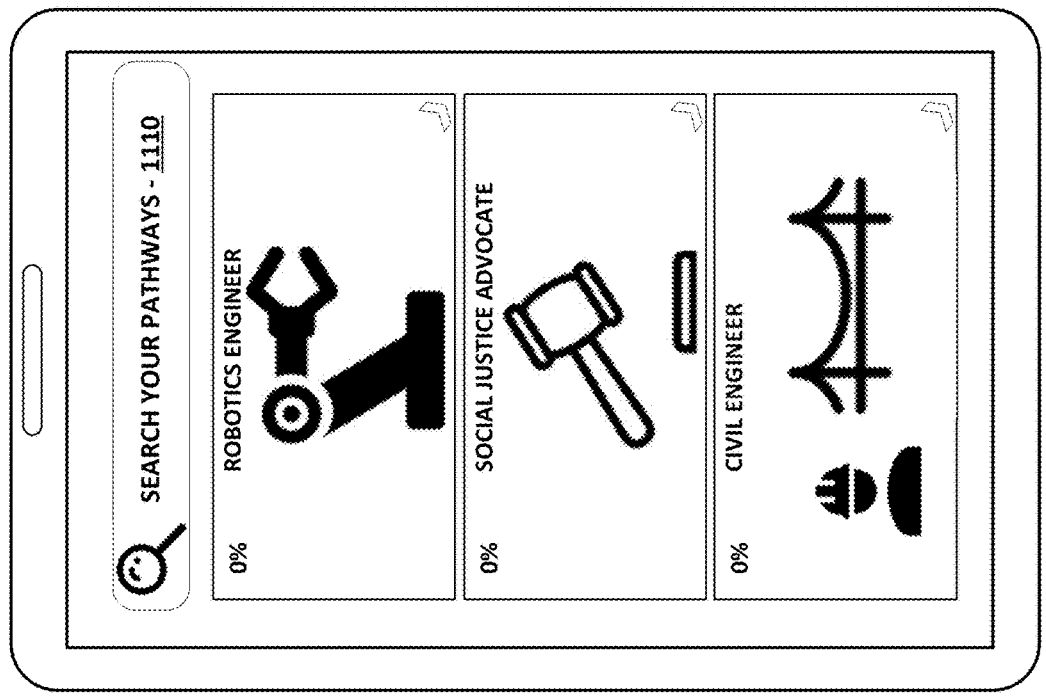

FIG. 11 illustrates AI learning interface 1101 and 1102 via which a user may search their learning pathways and explore potential learning pathways, in accordance with aspects of the disclosure.

In particular, AI learning interface 1101 depicts various suggested learning pathways for an individual learner as well as a search box via which the learner may respond to the prompt to "search your pathways" 1110. When the user enters a search, they may be navigated to AI learning interface 1102 depicting the structure of a searched learning path down to the learning units, all of which is generated by LLM 210 AI model and injected into graph database 230 for further refinement, retrieval, and display responsive to relevant queries.

As shown here, the user likely explored either robotics engineer or civil engineer from AI learning interface 1101 and is responsively presented with information about fluid mechanics and materials science. In the "fluid statics" sub-discipline, the learner is presented with various modules required to complete the fluid statics course. The learner may explore other sub-disciplines by interacting with them via user interface 250, such as clicking on the "discover" button next to any of the sub modules for fundamentals of fluid mechanics, fluid dynamics, viscosity and surface tension, and compressible flows. Clicking or interacting with any of the displayed sub-disciplines will cause learning platform 200 to responsively display relevant learning units, all of which are again generated by LLM 210 AI model.

Personalized Dashboard: Learning platform 200 integrates with adaptive learning algorithm module 275 to provide learners with a personalized dashboard 505 (see FIG. 5) that displays their current learning pathway, progress, recommendations, and achievements. Dashboard 505 is accessible across supported devices and enables learners to track their learning journey, access relevant resources, and set personal goals.

Content Access and Engagement: With reference again to FIG. 2, user interface 250 of learning platform 200 supports various content formats and engagement styles, ensuring that learners can engage with the material in a way that suits their preferences and learning styles. This includes accessing learning units 605 (see FIG. 6), assessments, collaborative learning activities, and multimedia resources, as well as immersive experiences through virtual reality headsets.

Embodied Visual Conversational AI: Learning platform 200 may utilize an embodied, visual conversational AI (e.g., an expressive AI powered avatar) that leverages multiple factors, such as color, size, sound, and shape, to express its emotional state and facilitate meaningful engagements with learners. This innovative approach to AI engagement provides a more engaging and intuitive experience, helping learners build a stronger connection with learning platform 200 and enhancing the overall learning process.

Figure 12:
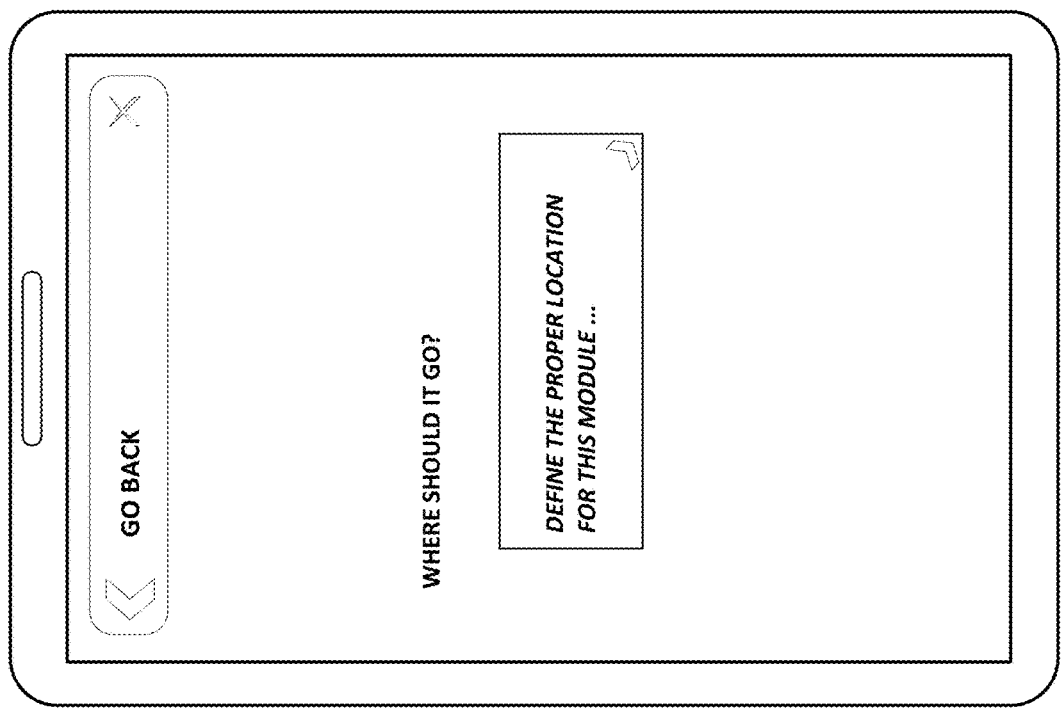
FIG. 12 illustrates AI reporting interface 1201 and 1202 providing the student learner a reporting mechanism, in accordance with aspects of the disclosure.
Figure 12:
Figure 12:
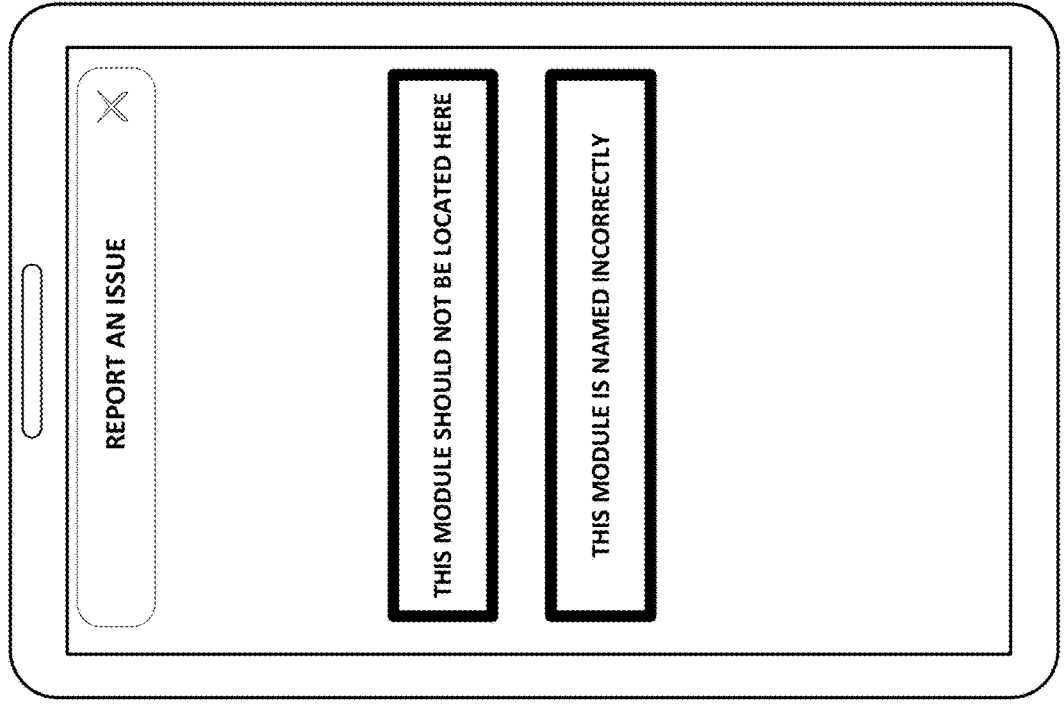

FIG. 12 illustrates AI reporting interface 1201 and 1202 providing the student learner a reporting mechanism, in accordance with aspects of the disclosure.

As depicted here, AI reporting interface 1201 enables a user to report a problem or an issue utilizing the interactive prompts provided, including an interactive button indicating that a module should not be located in its current place or another interactive button indicating that the module is named incorrectly. Clicking or interacting with the interactive reporting prompts will navigate the user to AI reporting interface 1202 which provides a text entry prompt where the user may enter information, such as where the learning unit 605 (see FIG. 6) at issue should be located or how it should be named.

Figure 13A:
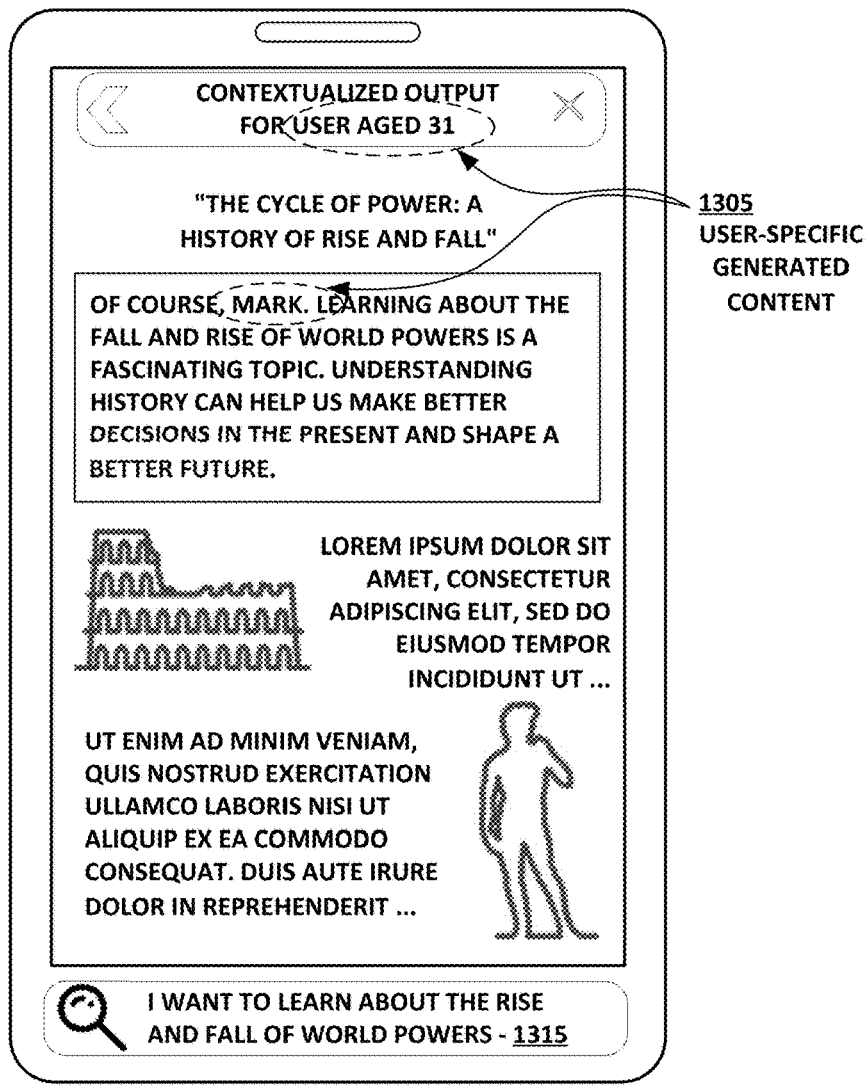
FIGS. 13A and 13B illustrate example AI learning interfaces 1301 and 1302 providing student learners with user-specific and contextualized outputs, in accordance with aspects of the disclosure.
Figure 13B:
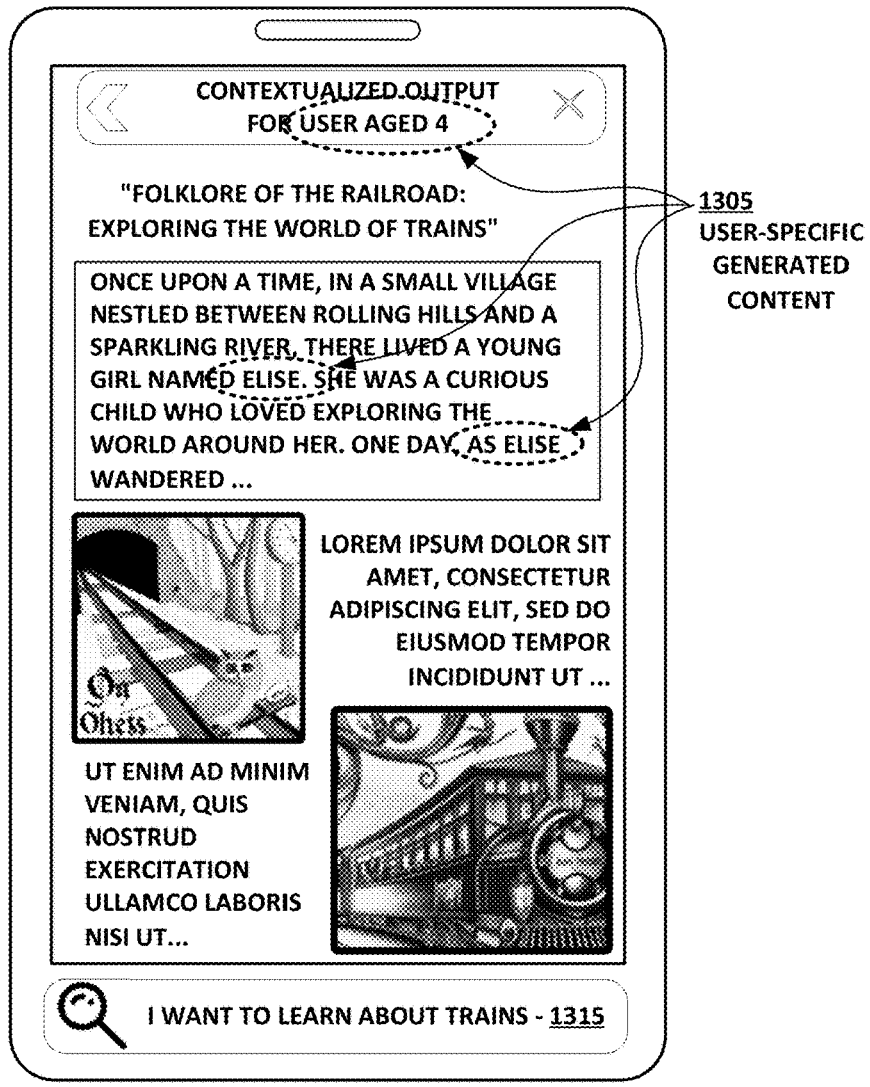

FIGS. 13A and 13B illustrate example AI learning interfaces 1301 and 1302 providing student learners with user-specific and contextualized outputs, in accordance with aspects of the disclosure.

With reference to FIG. 13A, all content output for display to AI learning interface 1301, including images depicting roman statues and Colosseum, are AI Generated in real time or near real time responsive to input provided by individual learners. For instance, learners may utilize prompt 1315 to input a question, such as the prompt here which asks, "I want to learn about the rise and fall of world powers." Responsive to the question asked at prompt 1315, AI learning interface 1301 responsively generates as its output an answer to the question provided at prompt 1315. Specifically, AI learning interface 1301 provides information about the rise and fall of world powers in reply to the prompt 1315. Notably, the output includes user-specific generated content 1305 which is contextually aware of the user, who is noted here as being 31 years old and named "Mark." Stated differently, user-specific generated content 1305 is age-appropriate for the user. Further depicted are AI model learnings about user 1320. In particular, the AI model has learned the specified elements about the user, including that user "Mark" is interested in the rise and fall of world powers, the user has a category of interest corresponding to "history," the user has an interest in history which began on a specified date and was updated on a specified date. In certain examples, AI learning interface 1301 modifies generated content output for display by adapting the content to at least the age and gender of the user.

With reference to FIG. 13B, user-specific generated content 1305 output is again self-generated by learning platform 200, however, now it is presented for the user "Elise" who is aged "4." Notably, all of the content is self-generated as output by learning platform 200 and specifically via the executing AI LLM 210 models, which takes into consideration what it "knows" about each of the distinct users, thus resulting in vastly different output presentations.

By leveraging different learning modalities based on its knowledge of the user, for Elise's case, due to her age, the system leverages the immersive storytelling module to teach her through culturally relevant folklore. The system interface shows a sticky note indicating what AI model learnings about user 1320 were learned from the user input/engagement, and what has now been stored to graph database 230 for future use and contextualization to the adaptive AI learning platform 200.

Feedback and Reporting: Learning platform 200 enables learners to provide feedback on the educational content, functionality, and their overall learning experience across all supported devices. This feedback is then used to inform improvements to learning platform 200, as well as adjustments to individual learning pathways. Additionally, users can report any issues they encounter with the content or the system, ensuring a continuous process of refinement and enhancement (see FIG. 12).

User interface 250 and engagement support system provides a user-friendly and accessible means for learners to engage with the educational content, learning pathways, and system modules across various devices and contexts. By offering a seamless and personalized learning experience, learning platform 200 ensures that it remains adaptable, accessible, and effective in meeting the diverse needs of its users.

System Overview—Modules and Sub-Modules Outline:

With reference again to FIG. 2, the following outline provides a system-centric overview of how the various modules and sub-modules of learning platform 200 may be logically interconnected to achieve the overall objective of creating a highly effective, personalized, and engaging learning experience for users.

Massively Scalable Graph Database 230:
  a. Stores the scope and sequence of learning pathways, as well as metadata for various media types.
  b. Facilitates rapid retrieval of educational content, including personalized and collaborative learning experiences.
  c. Supports engagements with other modules, such as adaptive learning algorithm module 275, collaborative learning module 295, media processing and tagging module 225, and AI large language model 210, to deliver a comprehensive and dynamic learning experience.

Large Language Model 210 Synergizes with Graph Database 230:
  a. Generates the full structure of learning pathways.
  b. Works with graph database 230 to create and manage learning content.
  c. Interacts with advanced instructional design subsystem 215 to produce course details and personalized content.

Feedback System 232:
  a. Utilizes multiple AI large language model 210 APIs with a system context to vote on the relevance of proposed changes to content based on user feedback.
  b. Generates relevant queries to update graph database 230 when needed.
  c. Ensures accurate and appropriate adjustments to learning content and pathways.

Advanced Instructional Design Subsystem 215:
  a. Leverages AI large language model 210 to produce course details, such as learning objectives, assessments, prerequisites, reading materials, assignments, and lecture notes.
  b. Creates personalized content based on preferences of individual learners.
  c. Collaborates AI large language model 210 and other modules to produce coherent, relevant, and pedagogically sound learning content.

Content Generation 283 Module and Generative AI Content Production:
  a. AI-driven content creation:
    i. Leverages advanced AI large language model 210s to generate diverse learning materials.
    ii. Supports content in various formats, including text, audio, video, and interactive elements.
  b. Context-aware content generation:
    i. Adapts content based on needs, preferences, and progress of individual learners.
    ii. Ensures relevance and personalization for improved learning outcomes.
  c. Content quality and consistency:
    i. Utilizes LLM 210 to maintain high-quality and engaging educational content.
    ii. Ensures coherence and accuracy across generated materials.
  d. Integration with Learning Pathways:
    i. Seamlessly incorporates generated content into personalized learning pathways.
    ii. Enhances the overall learning experience by providing relevant and engaging materials.
  e. Feedback-driven iterations:
    i. Incorporates user feedback to improve and refine generated content.
    ii. Continuously evolves and adapts content based on user engagements and platform analytics.

Adaptive Learning Algorithm Module 275:
  a. Integrates adaptive learning algorithms for dynamic personalization of content and learning pathways.
  b. Analyzes individual performance, preferences, and progress of individual learners to adjust the learning experience in real-time.
  c. Works with graph database 230 and AI large language model 210 to optimize learning content for each user.

Collaborative Learning Module 295:
  a. Incorporates group discussions, project-based activities, and peer review to enhance the learning experience.
  b. Fosters engagement and engagement between learners.
  c. Interacts with graph database 230 and AI large language model 210 to deliver collaborative learning content and activities.

Learning Analytics Module 240:
  a. Implements tools that provide insights into progress, engagement, and performance of individual learners.
  b. Supports data-driven decisions and optimization of the learning experience.
  c. Works closely with adaptive learning algorithm module 275 to inform the personalization of content and learning pathways.

Career Module 281 and Job Placement Services:
  a. Integrates with career development and job placement services to align educational goals with professional aspirations.

b. Offers features such as job market trend analysis, personalized career recommendations, resume building, interview preparation, and job placement support.

c. Interacts with graph database 230 to tailor learning pathways for specific career objectives.

Accessibility Module 255:
  a. Ensures platform accessibility for learners with diverse needs.
  b. Incorporates features such as adjustable font sizes, screen readers, closed captioning, and multi-language support.
  c. Works in conjunction with other modules to deliver accessible learning content and experiences.

Teacher and Mentor Support Module 285:
  a. Integrates features to facilitate communication and engagement between learners and educators.
  b. Bridges the gap between AI-generated content and human mentorship.
  c. Connects with graph database 230 and AI large language model 210 to support mentor-guided learning experiences.

Offline Access Module 293:
  a. Allows users to download content and access learning platform 200 offline.
  b. Enhances platform utility for learners in remote or low-resource environments.
  c. Works in sync with other modules to provide consistent learning experiences regardless of internet connectivity.

Gamification Module 294:
  a. Introduces game-like elements, such as badges, points, leaderboards, and challenges, to increase user motivation and engagement.
  b. Makes learning more enjoyable, rewarding, and interactive.
  c. Interacts with learning analytics module 240 and other modules to provide a cohesive and immersive learning environment.

Interactive AI Tutor 270:
  a. Enhances teacher and mentor support module 285 to incorporate an AI-driven tutoring component that simulates human-like engagement and support.
  b. Provides personalized guidance, feedback, and mentorship throughout the learning process.

Immersive Storytelling Module 291:
  a. Leverages AI large language model 210 to generate contextually relevant and engaging stories that intertwine with the learning content.
  b. Offers immersive narratives that adapt to interests and experiences of individual learners.

Emotional Intelligence Module 292:
  a. Detects and responds to user emotions to enhance the learning experience.
  b. Integrates emotional intelligence and empathy into the AI-driven tutoring component.

Conversational AI Engagement Architecture 205:
  a. Assesses current state of engagement of individual learners.
  b. Generates relevant inquiries to achieve various goals, such as gathering information for personalization, driving goal-oriented behavior, or enhancing the user experience.
  c. Sends messages to users at a frequency determined by their preferences and engagement levels.

AI-Driven Calendar Integration 245:
  a. Processes and contextualizes calendar information of individual learners.
  b. Schedules learning modules deliverables appropriately, based on an understanding of lifestyle patterns.
  c. Optimizes the learning experience based on calendar information and patterns.

Learning Content Deployment Module 220 with LMS Integration:
  a. Facilitates seamless deployment of learning content to various learning management systems (LMS).
  b. Ensures compatibility and interoperability with existing LMS platforms, making integration more accessible for institutions and organizations.
  c. Automates the process of transferring learning content, assessments, and learning pathways from the AI-driven personalized learning platform 200 to external LMS environments.
  d. Maintains advanced features of learning platform 200 and capabilities while providing a familiar interface for learners and educators already using an LMS.

Media Processing and Tagging Module 225:
  a. Processes various types of incoming media, such as video, text, audio, and more.
  b. Leverages machine learning to produce a set of relevant tags conducive to search.
  c. Works at scale to tag and search existing and new content, enabling efficient retrieval of data to support users' learning outcomes.

Ethical and Moral Framework Module 290:
  a. Provides content and activities that encourage the development of ethical reasoning and moral values.
  b. Integrates ethical and moral teaching alongside academic subjects.

As illustrated through the preceding outline, modules and sub-modules of learning platform 200 are interconnected to create a highly effective, personalized, and engaging learning experience. Graph database 230 serves as the foundation for content storage and retrieval, while the language model enabled by AI large language model 210 generates learning pathways and structures. Adaptive learning algorithm module 275, collaborative learning module 295, and advanced instructional design subsystem 215 work together to provide dynamic, personalized, and collaborative learning experiences.

Meanwhile, learning analytics module 240, feedback system 232, career module 281, which provides career development and job placement services, accessibility module 255, teacher and mentor support module 285, offline access module 293, and gamification module 294 enhance the learning experience by providing insights, feedback, career support, accessibility, mentorship, offline access, and motivational elements.

All modules and sub-modules are specially configured to work in synergy to achieve the overall objective of delivering an effective, engaging, and personalized learning experience that can adapt to unique needs and preferences of individual learners, fostering long-term success and achievement.

Example Use-Cases and Scenarios

Scenario 1: Imagine a user named Alice who is interested in learning more about data science to advance her career. She discovers AI-driven personalized learning platform 200 and decides to sign up.

Account Creation: Alice creates an account on learning platform 200 utilizing user interface 250 (see FIG. 2), providing basic information about herself, her learning preferences, and her educational goals. This information will be used by learning platform 200 to personalize her learning experience.

Personalized Dashboard: After logging in, Alice is presented with a personalized dashboard 505 (see FIG. 5) displaying her current learning pathway, progress, recommendations, and achievements. Adaptive learning algorithm module 275 has analyzed her information and generated a tailored learning pathway for data science (see FIG. 6).

Accessing Content: Alice starts by exploring the learning units provided in her learning pathway (see FIG. 11). Learning platform 200 exposes user interface 250 to be available across various devices such as desktop computers, laptops, tablets, smartphones, and virtual reality headsets, offering a seamless user experience. Alice can access various content formats such as text, audio, video, and interactive content (see FIG. 6). An embodied, visual conversational AI (e.g., an expressive AI powered avatar) assists Alice throughout her learning journey, leveraging multiple factors such as color, size, sound, and shape to express an emotional state and engage with her effectively.

Collaborative Learning: Along her learning journey, Alice engages in group discussions, project-based activities, and peer reviews through collaborative learning module 295. This fosters engagement and engagement with other learners pursuing similar goals.

Learning Analytics: Alice's progress and performance are continuously analyzed by learning analytics module 240, which provides insights and data-driven recommendations to optimize her learning experience.

Media Processing and Tagging Module 225: As Alice uploads a project report, media processing and tagging module 225 analyzes the document, generating relevant tags, and categorizing it within graph database 230 of learning platform 200. This helps Alice and other users easily search and access related content in the future.

AI-Driven calendar integration 245: Learning platform 200 integrates with Alice's calendar, understanding her lifestyle patterns and scheduling learning modules accordingly. This optimizes her learning experience based on her availability.

Conversational AI Engagement: To maintain Alice's engagement, conversational AI engagement architecture 205 (see FIG. 2) assesses her current state of engagement and sends relevant inquiries, helping her stay focused on her learning goals.

Interactive AI tutor 270: Alice receives personalized guidance, feedback, and mentorship from an AI-driven tutor which simulates human-like engagement and support, enhancing her learning experience.

Gamification: To keep Alice motivated, gamification module 294 introduces game-like elements, such as badges, points, and challenges, making her learning experience enjoyable and interactive.

Accessibility and Offline Access: Alice can access learning platform 200 using various devices, including virtual reality headsets, and enjoys a visually engaging conversational AI. Learning platform 200 also allows her to download content for offline access, ensuring consistent learning experiences regardless of internet connectivity.

Career Development and Job Placement: As Alice progresses, learning platform 200 aligns her educational goals with professional aspirations, offering job market trend analysis, personalized career recommendations, and job placement support.

Feedback System 232: As Alice encounters learning content that she finds particularly helpful or unclear, she provides feedback using learning platform 200 feedback system 232. The system uses AI large language model 210 APIs to assess the relevance of her suggestions and generates queries to update graph database 230 accordingly, improving the learning content and pathways.

Accessibility module 255: Alice, who has a hearing impairment, benefits from accessibility module 255, which ensures that learning platform 200 is inclusive for learners with diverse needs. This module incorporates features such as adjustable font sizes, screen readers, closed captioning, and multi-language support, enhancing her learning experience.

Immersive storytelling module 291: To further engage Alice, immersive storytelling module 291 leverages AI large language model 210 to generate contextually relevant and engaging stories that intertwine with the learning content. This feature provides Alice with immersive narratives that adapt to her interests and experiences.

Emotional intelligence module 292: Emotional intelligence module 292 detects and responds to Alice's emotions during her learning process. It integrates emotional intelligence and empathy into the AI-driven tutoring component, creating a more supportive and understanding learning environment.

Ethical and moral framework module 290: As Alice pursues her data science studies, ethical and moral framework module 290 provides content and activities that encourage the development of ethical reasoning and moral values. This module ensures that Alice not only acquires technical knowledge but also learns to apply her skills responsibly and ethically.

Throughout her learning journey, Alice benefits from a comprehensive set of components working in harmony to provide an accessible, personalized, and engaging educational experience. The AI-driven personalized learning platform addresses Alice's specific needs, interests, and goals, empowering her to effectively learn data science and ultimately achieve her career objectives.

Figure 14:
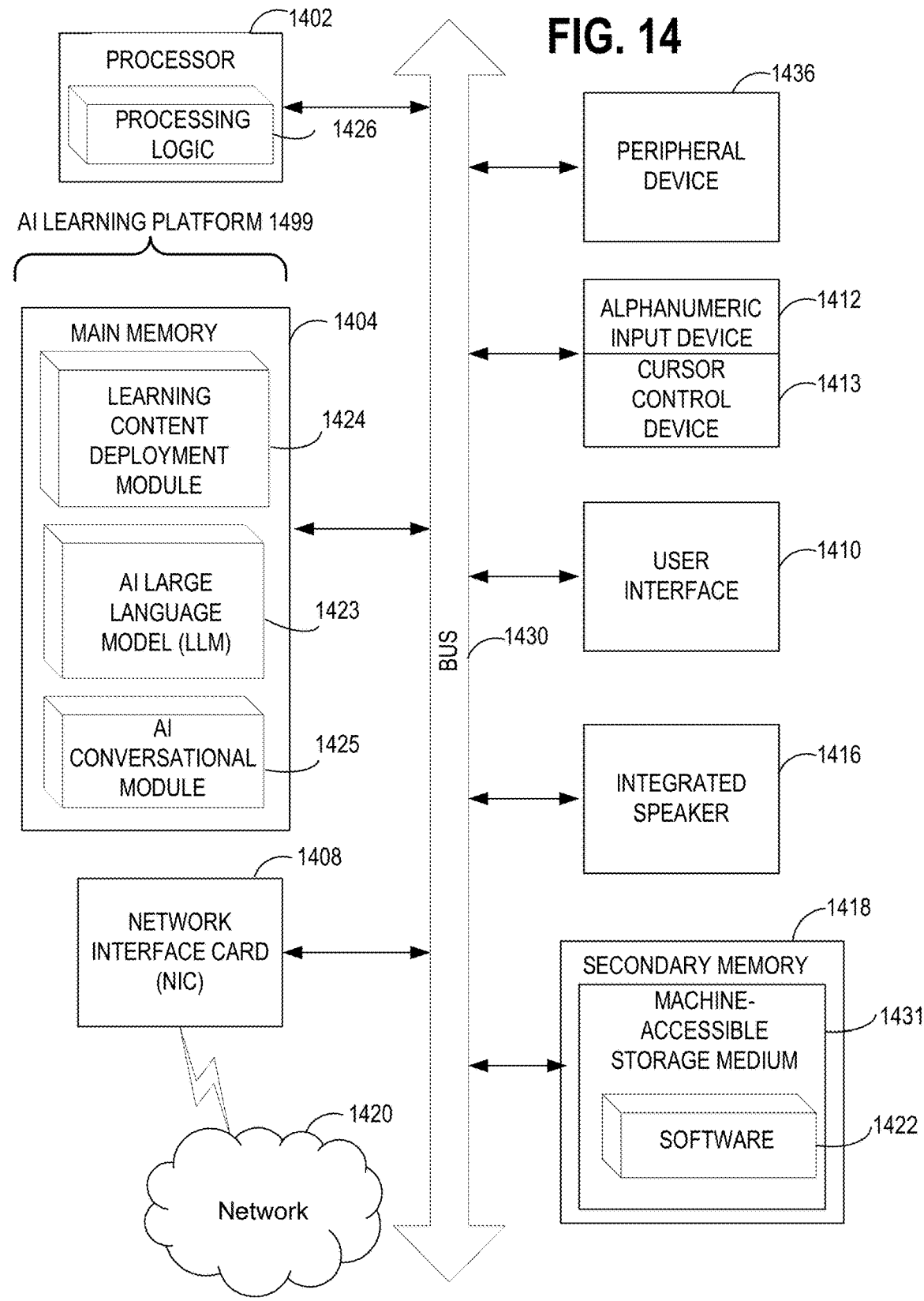
FIG. 14 illustrates a diagrammatic representation of machine 1401 in the example form of a computer system, in accordance with one example.

FIG. 14 illustrates a diagrammatic representation of machine 1401 in the example form of a computer system, in accordance with one example, within which a set of instructions, for causing the machine/computer system to perform any one or more of the methodologies discussed herein, may be executed.

In alternative examples, machine 1401 may be connected (e.g., networked) to other machines in a Local Area Network (LAN), an intranet, an extranet, or the public Internet. Machine 1401 may operate in the capacity of a server or a client machine in a client-server network environment, as a peer machine in a peer-to-peer (or distributed) network environment, as a server or series of servers within an on-demand service environment. Certain examples of machine 1401 may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

In this example, machine 1401 includes processor 1402, main memory 1404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and secondary memory 1418 (e.g., a persistent storage device including hard disk drives and a persistent database and/or a multi-tenant database implementation), which communicate with each other via bus 1430. Main memory 1404 includes instructions for executing the various components of AI learning platform 1499 as described herein, including learning content deployment module 1424, AI large language model (LLM) 1423, and AI conversational module 1425, in support of the methodologies and techniques described herein. Main memory 1404 and its sub-elements are further operable in conjunction with processing logic 1426 and processor 1402 to perform the methodologies discussed herein.

Processor 1402 represents one or more specialized and specifically configured processing devices such as a microprocessor, central processing unit, or the like. More particularly, processor 1402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1402 may also be one or more special-purpose processing devices such as an application-specific integrated circuit (ASIC), a field programmable gate array (FPGA), a digital signal processor (DSP), network processor, or the like. Processor 1402 is configured to execute processing logic 1426 for performing the operations and functionality which is discussed herein.

Machine 1401 may further include network interface card 1408. Machine 1401 also may include user interface 1410 (such as a video display unit, a liquid crystal display, etc.), an alphanumeric input device 1412 (e.g., a keyboard), cursor control device 1413 (e.g., a mouse), and signal generation device 1416 (e.g., an integrated speaker). Machine 1401 or computer system may further include peripheral device 1436 (e.g., wireless or wired communication devices, memory devices, storage devices, audio processing devices, video processing devices, etc.).

Secondary memory 1418 may include a non-transitory machine-readable storage medium or a non-transitory computer readable storage medium or a non-transitory machine-accessible storage medium 1431 on which is stored one or more sets of instructions (e.g., software 1422) embodying any one or more of the methodologies or functions described herein. Software 1422 may also reside, completely or at least partially, within main memory 1404 and/or within processor 1402 during execution thereof by machine 1401, main memory 1404 and processor 1402 also constituting machine-readable storage media. Software 1422 may further be transmitted or received over a network 1420 via network interface card 1408.

Figure 15:
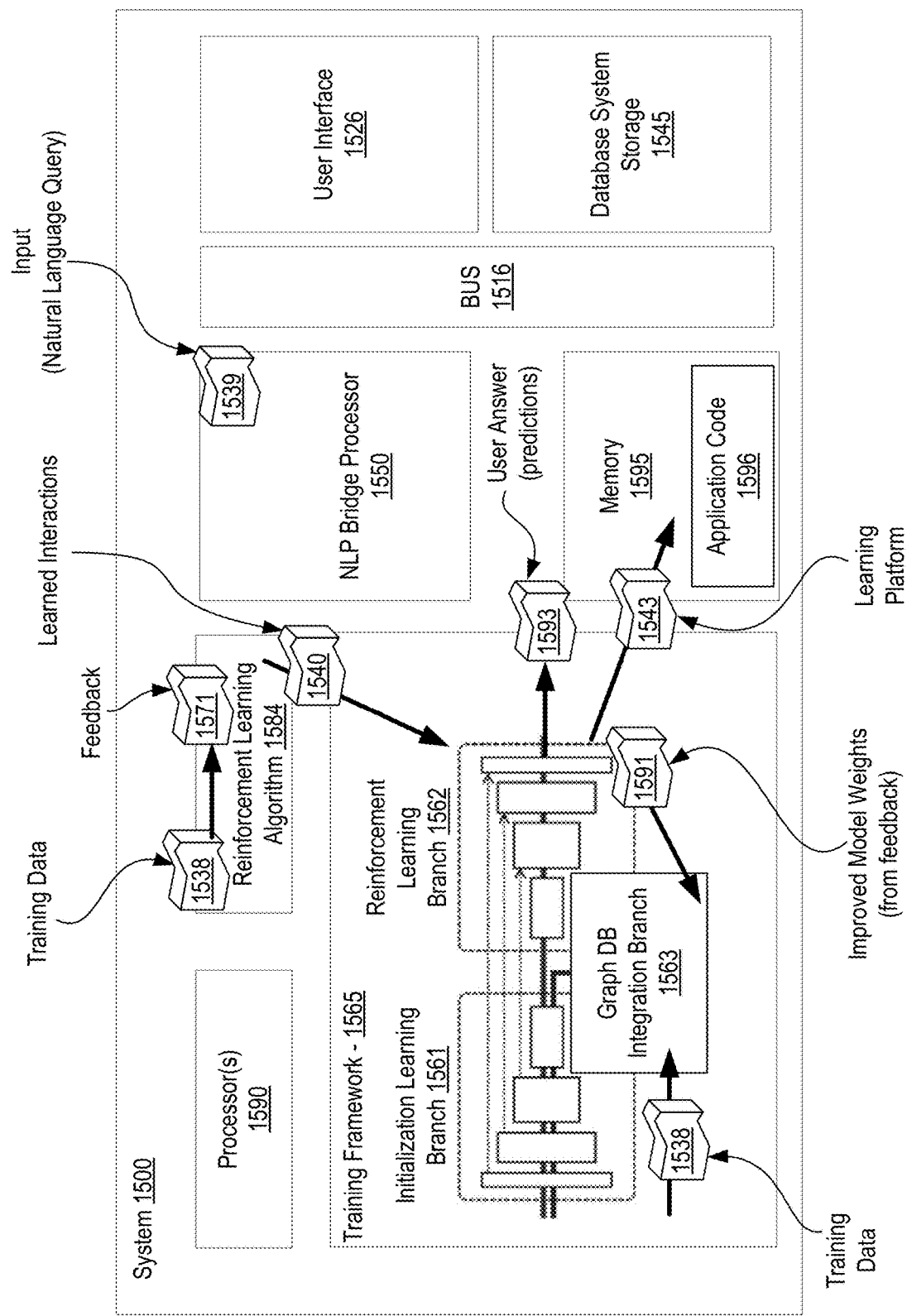
FIG. 15 depicts a diagrammatic representation of a system 1500 within which examples may operate, be installed, integrated, or configured.

FIG. 15 depicts a diagrammatic representation of a system 1500 within which examples may operate, be installed, integrated, or configured. In accordance with one example, system 1500 includes at least processor 1590 and memory 1595 therein to execute implementing application code 1596. System 1500 may communicatively interface with and cooperatively execute with the benefit of remote systems, such as a user device sending questions, data, feedback 1571, or natural language queries as user input 1539 to system 1500. Similarly, a user device may be configured to receive output from system 1500 via user interface 1526. Such output generated via trained learning platform 1543 configured for interacting with users and learners utilizing natural language (NLP) based queries. Learning platform 1543 may translate or convert such NLP based queries into a graph database compliant query syntax for execution against unstructured data and complex data structures stored within database system storage 1545 of system 1500 including graph database type systems. Further depicted is training framework 1565 having initializing learning branch 1561 and reinforcement learning branch 1562, each of which are used to consume training data 1538 and improved model weights 1591 from feedback 1571 into graph database integration branch 1563.

According to the depicted example, system 1500 includes processor 1590 and memory 1595 to execute instructions at system 1500. System 1500 as depicted here is specifically customized and configured to systematically generate learning platform 1543 which is generated as output and when executed, consumes user input 1539 in natural language form to generate a user answer 1593 (e.g., a prediction or predictive output) as output from system 1500, which may take the form of an AI model prediction.

According to a particular example, there is a specially configured system 1500 which is custom configured to generate learning platform 1543 through the combined use of deep learning techniques and improved NLP system processing techniques to integrate NLP system capabilities with graph database query and analysis techniques. According to such an example, system 1500 includes: a memory 1595 to store instructions via executable application code 1596; a processor 1590 to execute the instructions stored in memory 1595; in which system 1500 is specially configured to execute the instructions stored in the memory via the processor which causes the system to receive training data 1538 having at a framework.

Further processing by the system includes the application of reinforcement learning via a feedback system capable of integrating feedback 1571 from learners into improved model variants of learning platform 1543 via improved model weights 1591.

The system then outputs a learning platform 1543 in the form of a pre-trained AI model from training framework 1565 based on the training.

According to another example of system 1500, a user interface 1526 communicably interfaces with a user client device remote from the system and communicatively interfaces with the system via a public Internet.

Bus 1516 interfaces the various components of system 1500 amongst each other, with any other peripheral(s) of system 1500, and with external components such as external network elements, other machines, client devices, database system storage 1545, cloud computing services, etc. Communications may further include communicating with external devices via a network interface over a LAN, WAN, or the public Internet.

Figure 16:
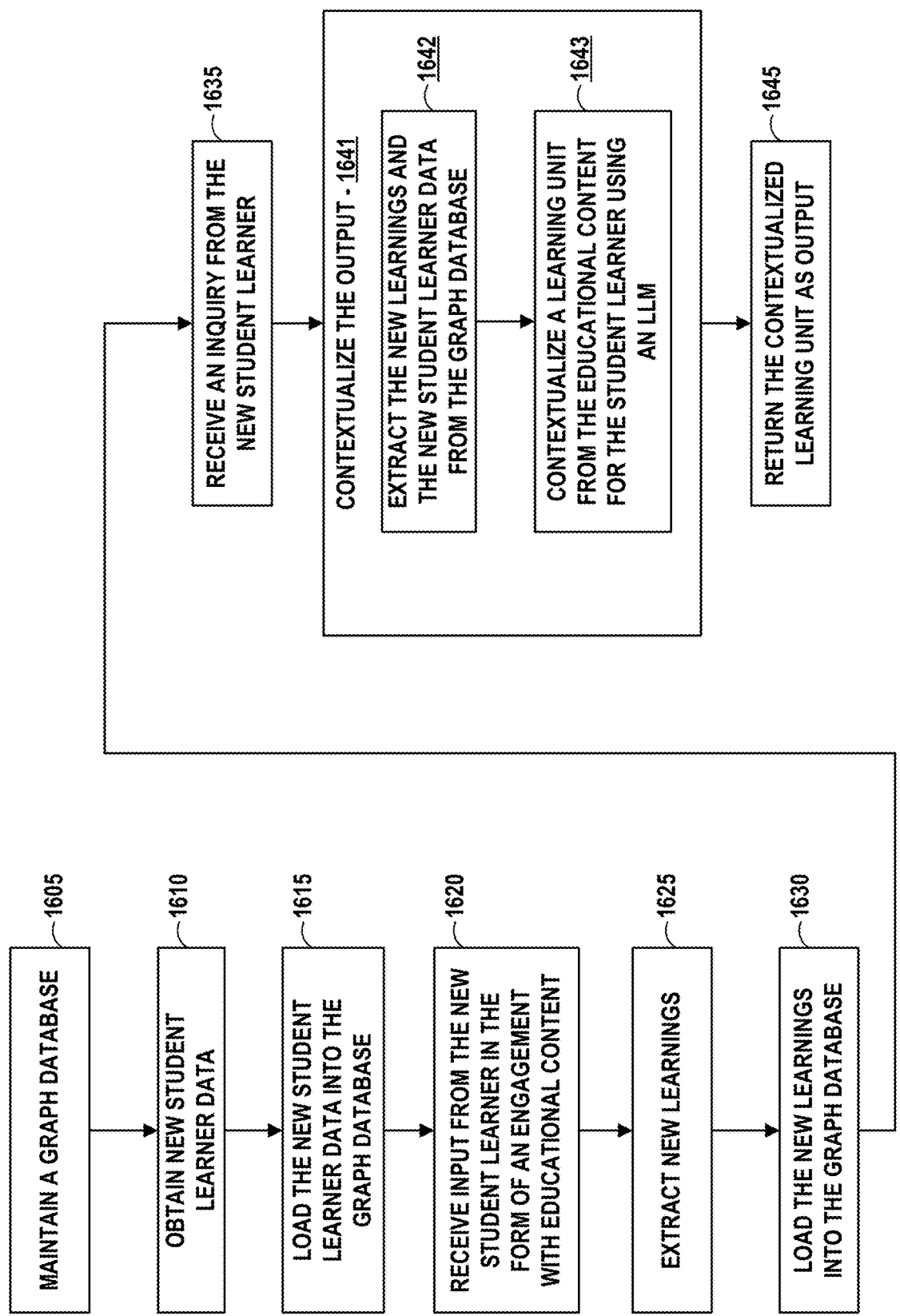
FIG. 16 is a flow chart illustrating an example mode of operation for computing device 100 to implement an adaptive and scalable Artificial Intelligence (AI) driven personalized learning platform, in accordance with aspects of the disclosure.

FIG. 16 is a flow chart illustrating an example mode of operation for computing device 100 to implement an adaptive and scalable Artificial Intelligence (AI) driven personalized learning platform, in accordance with aspects of the disclosure. The mode of operation is described with respect to computing device 100 and FIGS. 1-15.

Computing device 100 may maintain a graph database 230 (1605). For example, processing circuitry 199 of computing device 100 may maintain, by the processing circuitry, a graph database describing student learners subscribed to educational content provided by the learning platform.

Computing device 100 may obtain new student learner data (1610). For example, processing circuitry 199 of computing device 100 may obtain, by the processing circuitry, new student learner data about a new student learner subscribed to the educational content provided by the learning platform.

Computing device 100 may load the new student learner data into the graph database 230 (1611). For example, processing circuitry 199 of computing device 100 may load, by the processing circuitry into the graph database, the new student learner data within new nodes and new relationships with directionality between the new nodes and having metadata parameters within the new nodes describing the new student learner data loaded into the graph database.

Computing device 100 may receive input from the new student learner in the form of an engagement with educational content (1620). For example, processing circuitry 199 of computing device 100 may receive, by the processing circuitry, input from the new student learner as an engagement with the educational content provided by the learning platform.

Computing device 100 may extract new learnings (1625). For example, processing circuitry 199 of computing device 100 may, responsive to receipt of the input from the new student learner as the engagement with the educational content provided by the learning platform, extract, by the processing circuitry, new learnings about the new student learner.

Computing device 100 may load the new learnings into the graph database (1630). For example, processing circuitry 199 of computing device 100 may, responsive to extraction of the new learnings about the new student learner, load, by the processing circuitry, the new learnings about the new student learner into the graph database in association with one or more of the new nodes for the new student learner.

Computing device 100 may receive an inquiry from the new student learner (1635). For example, processing circuitry 199 of computing device 100 may receive, by the processing circuitry, an inquiry from the new student learner.

Computing device 100 may contextualize the output (1641). For instance, processing circuitry may contextualize the output by extracting the new learnings and the new student learner data from the graph database (1642) and contextualizing a learning unit from the educational content for the student learner using an LLM (1643). According to such an example, processing circuitry 199 of computing device 100 may, in response to receipt of the inquiry from the new student learner, extract, by the processing circuitry, the new student learner data and the new learnings about the new student learner from the graph database and further responsive to receipt of the inquiry from the new student learner, contextualize, by the processing circuitry and using a large language model communicably interfaced with the graph database, a learning unit from the educational content provided by the learning platform as a response to the inquiry using at least the new student learner data and the new learnings about the new student learner extracted from the graph database provided as contextual input to the large language model.

Computing device 100 may return the contextualized learning unit as output (1645). For example, processing circuitry 199 of computing device 100 may return, by the processing circuitry, as output to the new student learner, the learning unit contextualized by the large language model.

In some examples, processing circuitry 199 is further configured to self-generate, by the processing circuitry using the large language model, graph database compliant queries to extract the new student learner data and the new learnings about the new student learner from the graph database.

In some examples, processing circuitry 199 is further configured to provide, by the processing circuitry as the contextual input to the large language model, the new student learner data and the new learnings about the new student learner.

In some examples, processing circuitry 199 is further configured to generate, by the processing circuitry using the large language model, a uniquely customized learning unit for the new student learner based on the contextual input provided by the to the large language model.

In some examples, processing circuitry 199 is further configured to return, by the processing circuitry, as the output to the new student learner, the uniquely customized learning unit for the new student learner.

In some examples, processing circuitry 199 is further configured to self-generate, by the processing circuitry using the large language model, graph database queries to load the new student learner data within the new nodes and the new relationships into the graph database.

In some examples, processing circuitry 199 is further configured to receive, by the processing circuitry, the input from the new student learner as the engagement with the educational content provided by the learning platform by receiving at least one of: a natural language question from the new student learner, an interaction with educational content requesting additional detail about sub-disciplines of the educational content, a natural language narrative from the new student learner about educational objectives, the natural language narrative from the new student learner about career objectives, and feedback from the new student learner regarding an issue encountered with the learning platform or an issue with the educational content provided by the learning platform.

In some examples, processing circuitry 199 is further configured to contextualize, by the processing circuitry and using the large language model, the learning unit from the educational content provided by the learning platform as a response to the inquiry based at least in part on one or more of: an age of the new student learner, a gender assessed by the learning platform for the new student learner, a career path for the student learner, an assessment of sentiment by the learning platform of the new student learner, an objective academic assessment by the learning platform of the new student learner in the learning unit contextualized by the large language model and returned as output to the new student learner, and an assessment of academic interests detected by the learning platform using the new learnings about the new student learner.

In some examples, processing circuitry 199 is further configured to implement an adaptive and scalable AI-driven personalized learning platform for the student learners subscribed to the educational content provided by the learning platform.

In some examples, the large language model includes one or more collaborative linguistically capable machine learning LLM agents. In such an example processing circuitry 199 may be further configured to dynamically generate and refine, using at least one of the one or more collaborative linguistically capable machine learning LLM agents, a self-adapting knowledge graph stored within the graph database.

In some examples, processing circuitry 199 is further configured to deploy, by the processing circuitry, a plurality of the one or more collaborative linguistically capable machine learning LLM agents to collaboratively engage in recursive operations for the development, assessment, and refinement of the self-adapting knowledge graph.

In some examples, the self-adapting knowledge graph organizes the educational content provided by the learning platform across varying degrees of specificity including one or more of fields, subfields, topics, chapters, and learning units.

In some examples, processing circuitry 199 is further configured to generate, by the processing circuitry using the one or more collaborative linguistically capable machine learning LLM agents, new dimensions of the educational content provided by the learning platform within the self-adapting knowledge graph stored by the graph database by reviewing and editing the generated new dimensions of the educational content provided by the learning platform using an iterative process incorporating both autonomous agent analysis and user feedback.

In some examples, the iterative process modifies the generated new dimensions of the educational content to conform to specified educational standards and configured user preferences.

In some examples, processing circuitry 199 is further configured to mark, by the processing circuitry using the one or more collaborative linguistically capable machine learning LLM agents, points of purity within the self-adapting knowledge graph defining benchmarks of integrity and reliability for portions of the educational content provided by the learning platform.

In some examples, processing circuitry 199 is further configured to schedule subsequent reviews of the points of purity within the self-adapting knowledge graph at configurable intervals to maintain recency and relevance of the educational content provided by the learning platform.

In some examples, processing circuitry 199 is further configured to establish, by the processing circuitry, a symbiotic relationship between using the one or more collaborative linguistically capable machine learning LLM agents and the student learners subscribed to educational content provided by the learning platform.

In some examples, the symbiotic relationship includes at least the learning platform to receive user feedback from the student learners subscribed to educational content provided by the learning platform.

In some examples, processing circuitry 199 is further configured to integrate, by the processing circuitry using a recursive review and refinement process, the user feedback into the graph database enabling the self-adapting knowledge graph to self-adapt within the graph database responsive to engagements by the student learners and the user feedback.

In some examples, processing circuitry 199 is further configured to incorporate, by the processing circuitry, new learnings from the student learners subscribed to educational content provided by the learning platform using reinforcement learning applied to the new learnings by the one or more collaborative linguistically capable machine learning LLM agents.

In some examples, the new learnings include at least one or more of: new input from the student learners subscribed to educational content provided by the learning platform, user feedback from the student learners subscribed to educational content provided by the learning platform, and complaints from the student learners subscribed to educational content provided by the learning platform.

In some examples, processing circuitry 199 is further configured to generate, by the processing circuitry, new educational content or modifications to the educational content provided by the learning platform using the new learnings.

In some examples, processing circuitry 199 is further configured to submit, by the processing circuitry, the new educational content or the modifications to the educational content provided by the learning platform to consensus voting using the one or more collaborative linguistically capable machine learning LLM agents.

In some examples, responsive to a failure to attain a successful consensus to accept the new educational content or the modifications to the educational content provided by the learning platform, processing circuitry is configured to reject inclusion of the new educational content or the modifications to the educational content provided by the learning platform into the self-adapting knowledge graph.

In some examples, processing circuitry 199 is further configured to attain, by the processing circuitry using the one or more collaborative linguistically capable machine learning LLM agents, a successful consensus to accept the new educational content or the modifications to the educational content provided by the learning platform.

In some examples, processing circuitry 199 is further configured to incorporate, by the processing circuitry using the one or more collaborative linguistically capable machine learning LLM agents, the new educational content or the modifications to the educational content provided by the learning platform into the self-adapting knowledge graph.

In some examples, the new educational content or the modifications to the educational content provided by the learning platform becomes available to the student learners subscribed to educational content provided by the learning platform subsequent to the incorporation into the self-adapting knowledge graph.

In some examples, processing circuitry 199 is further configured to add, by the processing circuitry using the one or more collaborative linguistically capable machine learning LLM agents, a new data structure representing the new educational content or the modifications to the educational content provided by the learning platform with associated prerequisites and post-requisites for the new educational content or the modifications to the educational content provided by the learning platform.

In some examples, the associated prerequisites and post-requisites for the new educational content or the modifications to the educational content provided by the learning platform increase both depth and breadth of the new educational content or the modifications to the educational content provided by the learning platform within the self-adapting knowledge graph stored within the graph database.

In some examples, a new data structure representing the new educational content or the modifications to the educational content provided by the learning platform enables the student learners subscribed to the educational content provided by the learning platform to navigate through a comprehensive and interconnected educational landscape formed by the new educational content or the modifications to the educational content provided by the learning platform within the self-adapting knowledge graph.

EXAMPLES: It is therefore described in accordance with aspects of the disclosure in view of the preceding description, the following examples:

In accordance with one example, there is a massively scalable learning platform for implementing an adaptive and scalable AI-driven personalized learning platform. Such an example includes: a scalable graph database that stores the scope and sequence of learning pathways; a language model enabled by AI large language model 210 that generates the full structure of learning pathways down to the learning unit level; adaptive learning algorithm module 275 that dynamically personalizes content and learning pathways based on individual learners' performance, preferences, and progress; collaborative learning module 295 that fosters engagement and engagement among learners through group discussions, project-based activities, and peer review; learning analytics module 240 that provides insights into learners' progress, engagement, and performance; feedback system 232 uses AI large language model 210 APIs to vote on the relevance of proposed changes to content based on user feedback, and generate the relevant query to make the needed change in graph database 230; a career development and job placement services module that helps learners align their educational goals with professional aspirations; accessibility module 255 that ensures learning platform 200 is accessible to learners with diverse needs, such as disabilities or language barriers; teacher and mentor support module 285 that facilitates communication and engagement between learners and educators; offline access module 293 that allows users to download content and access learning platform 200 without an internet connection; an advanced instructional design subsystem 215 that leverages AI large language model 210 to produce course details, including learning objectives, assessments, prerequisites, reading materials, assignments, lecture notes, and personalized content; and gamification module 294 that incorporates elements such as badges, points, leaderboards, and challenges to increase user motivation and engagement.

According to alternative examples, the system further includes: interactive AI tutor 270 that provides personalized guidance, feedback, and mentorship throughout the learning process.

According to alternative examples, the system further includes: immersive storytelling module 291 that leverages AI large language model 210 or another advanced language model to generate contextually relevant and engaging stories intertwined with learning content.

According to alternative examples, the system further includes: emotional intelligence module 292 that detects and responds to users' emotions to enhance the learning experience, integrating emotional intelligence and empathy into the AI-driven tutoring component.

According to alternative examples, the system further includes: ethical and moral framework module 290 that provides content and activities encouraging the development of ethical reasoning and moral values, integrating ethical and moral teaching alongside academic subjects.

According to alternative examples, learning platform 200 is capable of integrating with various learning management systems (LMS) through LTI standards like xAPI or SCORM, enabling seamless content deployment across different platforms.

According to alternative examples, learning platform 200 is capable of creating, managing, and decaying learning pathways based on user engagement and feedback, ensuring efficient and cost-effective database management.

According to alternative examples, learning platform 200 supports multi-modal content delivery, including text, audio, video, virtual reality, and augmented reality, to cater to different learning preferences and technological capabilities.

According to alternative examples, learning platform 200 is capable of generating generative AI materials for each content delivery type, enhancing the diversity and novelty of learning content.

According to alternative examples, learning platform 200 allows for the integration of external tools, resources, and technologies to enhance the learning experience, creating a comprehensive and adaptable learning ecosystem.

According to alternative examples, learning platform 200 features a module for automatically linking prerequisites and related content, enhancing the coherence and continuity of learning pathways.

According to alternative examples, learning platform 200 provides real-time notifications and updates to learners, educators, and administrators regarding progress, achievements, and relevant learning opportunities.

According to alternative examples, learning platform 200 supports the creation of customized learning plans based on users' specific learning goals, career aspirations, and personal interests.

According to alternative examples, learning platform 200 allows for the integration of external APIs and services, such as job market trend analysis, personalized career recommendations, resume building, interview preparation, and job placement support, to provide comprehensive career development resources.

According to alternative examples of the system, graph database 230 of learning and AI components are designed to continuously update and refine content based on user feedback, improving the overall quality and relevance of learning materials over time.

According to alternative examples, learning platform 200 supports diverse learning modalities, including self-paced learning, instructor-led courses, group projects, and social learning experiences.

According to alternative examples of the system, user interface 250 of learning platform 200 user interface is designed to be intuitive, engaging, and user-friendly, promoting case of use and a seamless learning experience for users of all ages and backgrounds.

According to alternative examples of learning platform 200, infrastructure is designed to be highly scalable, adaptable, and resilient, supporting the rapid growth of content, user engagements, and technological advancements.

According to alternative examples, learning platform 200 incorporates privacy and security measures to protect users' personal information and ensure the confidentiality of learning data.

According to alternative examples, learning platform 200 is designed to be compatible with a wide range of devices and platforms, including web, mobile, and emerging technologies, ensuring accessibility and flexibility for learners worldwide.

According to alternative examples, learning platform 200 incorporates interactive AI tutor 270 module to provide personalized guidance, feedback, and mentorship throughout the learning process, simulating human-like engagement and support.

According to alternative examples, learning platform 200 includes immersive storytelling module 291 that leverages advanced language models to generate contextually relevant and engaging stories that intertwine with learning content, offering adaptive narratives that cater to interests and experiences of individual learners.

Alternative examples of learning platform 200, emotional intelligence module 292 that detects and responds to users' emotions to enhance the learning experience, integrating emotional intelligence and empathy into the AI-driven tutoring component.

According to alternative examples, learning platform 200 contains ethical and moral framework module 290 that provides content and activities encouraging the development of ethical reasoning and moral values, integrating ethical and moral teaching alongside academic subjects.

According to alternative examples of learning platform 200, architecture and algorithms are designed to support ongoing innovation and enhancement, allowing for the integration of new modules, features, and technologies as they emerge.

According to alternative examples, learning platform 200 supports the integration and interoperability of various learning management systems (LMS) through the use of standardized formats such as xAPI or SCORM, enabling seamless deployment of learning content across multiple platforms.

According to alternative examples of learning platform 200, content generation capabilities extend to various forms of multimedia, including video, audio, interactive simulations, virtual reality, and augmented reality, offering a rich and immersive learning experience.

According to alternative examples, learning platform 200 allows users to provide feedback on learning content, including suggestions for improvement, reports of stale content, or identification of incorrect structure, which is then processed and acted upon by the AI-driven feedback system 232 to refine and optimize content quality.

According to alternative examples of the system, graph database 230 of learning platform 200 incorporates a module to decay and delete unused or outdated pathways over time, optimizing efficiency and reducing the costs associated with maintaining graph database 230.

According to alternative examples, learning platform 200 is designed to provide a comprehensive and cohesive learning experience, bridging the gap between traditional education methods and cutting-edge AI-driven learning technologies.

According to alternative examples, learning platform 200 supports the integration of third-party tools and resources to enrich the learning experience and provide additional functionality, such as productivity tools, communication platforms, and content libraries.

According to alternative examples of learning platform 200, design and infrastructure support accessibility and inclusivity, ensuring that learners with diverse needs, including disabilities or language barriers, can effectively engage with learning platform 200 and achieve their learning goals.

Alternative examples of analytics and reporting capabilities provide insights into user behavior, learning outcomes, and content effectiveness, supporting data-driven decision-making and continuous improvement of the learning experience.

According to alternative examples of the system, user interface 250 of learning platform 200 and content are designed to be visually appealing, engaging, and contextually relevant, promoting user retention and satisfaction.

According to alternative examples, learning platform 200 supports integration with professional networking platforms, online communities, and industry-specific resources, connecting learners with opportunities for networking, collaboration, and career advancement.

According to alternative examples, learning platform 200 enables users to create and share their learning portfolios, showcasing their achievements, skills, and knowledge acquired through learning platform 200.

According to alternative examples of the system, assessment tools and mechanisms of learning platform 200 measure and evaluate learners' knowledge, skills, and understanding in an accurate, reliable, and meaningful way, supporting continuous improvement and mastery of learning objectives.

According to alternative examples of learning platform 200, content generation and curation processes are designed to adhere to established educational standards, frameworks, and best practices, ensuring that the learning experience is pedagogically sound and academically rigorous.

According to alternative examples of learning platform 200, architecture supports seamless integration with existing educational institutions, systems, and processes, enabling learning platform 200 to complement and enhance traditional learning environments.

According to alternative examples, learning platform 200 is designed to be adaptable and future-proof, ensuring that it remains relevant, effective, and valuable as the educational landscape and technological advancements continue to evolve.

According to alternative examples, personalized learning algorithms support the integration of user-generated content, enabling learners to contribute their own knowledge, experiences, and insights to learning platform 200 and the wider learning community.

According to alternative examples, AI-driven components are designed to be transparent and explainable, promoting trust and understanding between users and the AI-driven components of the system.

According to alternative examples, security and privacy features ensure that user data and personal information are protected, adhering to relevant data protection regulations and industry best practices.

According to alternative examples, learning platform 200 supports the creation and management of user groups, enabling educators, administrators, and learners to collaborate, communicate, and share resources within the context of specific learning pathways or objectives.

According to alternative examples, technology stack and infrastructure are designed to be scalable, resilient, and fault-tolerant, ensuring consistent and reliable performance, even as learning platform 200 user base and content library continue to grow.

According to alternative examples, instructional design subsystem 215 supports the integration of project-based learning, case studies, and real-world problem-solving activities, promoting deeper understanding, critical thinking, and the application of knowledge in relevant contexts.

According to alternative examples user interface 250 supports various input modalities, including touch, voice, and gesture-based engagements, accommodating diverse user preferences and device capabilities.

According to alternative examples, content generation and curation processes are designed to be adaptive and responsive to changes in industry trends, educational standards, and user preferences, ensuring that the learning experience remains relevant and up-to-date.

According to alternative examples, gamification features are designed to promote healthy competition, collaboration, and motivation among learners, while also supporting individualized goal setting and achievement tracking.

According to alternative examples, modular architecture allows for the rapid development, testing, and deployment of new features and functionality, supporting continuous improvement and innovation within learning platform 200.

According to alternative examples, offline access module 293 enables users to download and access learning content, allowing for uninterrupted learning experiences in situations where internet connectivity is limited or unavailable.

According to alternative examples, emotional intelligence module 292 incorporates features that monitor and respond to users' emotional states, adjusting the learning experience to provide optimal support and encouragement.

According to alternative examples, ethical and moral framework module 290 integrates age-appropriate content and activities that foster ethical and moral development, promoting responsible and compassionate behavior.

According to alternative examples, interactive AI tutor 270 module provides individualized feedback, guidance, and support in real-time, simulating the experience of human mentorship and enhancing the overall learning experience.

According to alternative examples, immersive storytelling module 291 generates contextually relevant narratives that are seamlessly interwoven with learning content, creating an engaging and immersive learning experience that adapts to the interests and experiences of individual learners.

According to alternative examples collaborative learning module 295 supports various forms of peer-to-peer engagement, including group discussions, collaborative projects, and peer review, fostering the development of essential teamwork and communication skills.

According to alternative examples, teacher and mentor support module 285 integrates features that facilitate communication and engagement between learners and educators, bridging the gap between AI-generated content and human mentorship.

According to alternative examples, learning analytics module 240 provides tools for tracking and measuring learner progress, engagement, and performance, enabling data-driven decisions and continuous improvement of the learning experience.

According to alternative examples, generative AI materials module automatically generates a variety of content delivery formats based on user preferences and learning objectives, including text, video, audio, and interactive media.

According to alternative examples, LMS deployment module enables seamless integration with various Learning Management Systems (LMS) via standard protocols such as xAPI and SCORM, ensuring compatibility and interoperability with existing educational ecosystems.

According to alternative examples accessibility module 255 supports assistive technologies and accessibility features, such as screen readers, closed captioning, adjustable font sizes, and multi-language support, ensuring that learning platform 200 is inclusive and usable by a diverse range of learners.

According to alternative examples, career development and job placement services module offers resources and tools to help learners align their educational goals with professional aspirations, including job market trend analysis, personalized career recommendations, resume building, interview preparation, and job placement support.

According to alternative examples advanced instructional design subsystem 215 continuously adapts and refines the learning content based on user feedback, performance data, and advances in pedagogical research, ensuring that the learning experience remains relevant, engaging, and effective.

According to alternative examples of the system, adaptive learning algorithm module 275 of learning platform 200 employs machine learning techniques to continuously analyze individual learners' performance, preferences, and progress, dynamically adjusting the learning content and pathways to optimize the learning experience.

According to alternative examples, content decay and deletion module automatically identifies and removes outdated or unused learning pathways, optimizing the efficiency of graph database 230 and reducing the overall costs of maintaining the system.

According to alternative examples of the system, feedback system 232 of learning platform 200 utilizes multiple AI large language model 210 APIs with a system context to review and vote on the relevance of proposed content changes based on user feedback, ensuring that the learning experience continuously improves and adapts to the needs of the user community.

According to alternative examples, multi-modal content generation module supports the creation of diverse content formats, including virtual reality, augmented reality, and mixed reality experiences, to cater to a wide range of learning preferences and enhance user engagement.

According to alternative examples, prerequisite and related content autolink module automatically identifies and links prerequisite and related learning materials, ensuring a cohesive and logically structured learning experience for users.

According to alternative examples, user interface is designed to be intuitive, user-friendly, and customizable, accommodating diverse user preferences, learning styles, and device capabilities.

According to alternative examples, API and integration module supports seamless integration with various third-party tools, services, and platforms, enabling the development of a rich and diverse ecosystem of learning resources, tools, and experiences.

According to alternative examples, interactive AI tutor 270 module simulates human-like engagement, providing personalized guidance, feedback, and mentorship throughout the learning process, enhancing the overall support system for learners.

According to alternative examples, immersive storytelling module 291 leverages advanced language models to generate contextually relevant and engaging stories that intertwine with learning content, offering adaptive narratives that cater to learners' interests and experiences.

According to alternative examples, emotional intelligence module 292 detects and responds to users' emotions, integrating emotional intelligence and empathy into the AI-driven tutoring component to enhance the learning experience.

According to alternative examples, ethical and moral framework module 290 provides content and activities that promote the development of ethical reasoning and moral values, integrating ethical and moral teaching alongside traditional academic subjects.

According to alternative examples, gamification module 294 introduces elements such as badges, points, leaderboards, and challenges to increase user motivation and engagement, making the learning experience more enjoyable and rewarding.

According to alternative examples, teacher and mentor support module 285 facilitates communication and engagement between learners and educators through features like messaging, video conferencing, or shared workspaces, bridging the gap between AI-generated content and human mentorship.

According to alternative examples, learning analytics module 240 provides valuable insights into learners' progress, engagement, and performance, enabling data-driven decision-making and optimization of the learning experience for educators, administrators, and learners themselves.

According to alternative examples, collaborative learning module fosters engagement and engagement among learners through features such as group discussions, project-based activities, and peer review, promoting essential teamwork and communication skills.

According to alternative examples, offline access module 293 allows users to download content and access learning platform 200 offline, improving the utility of learning platform 200 for learners in remote or low-resource environments.

According to alternative examples, assessment and progress tracking module generates assessments, quizzes, and tests, leveraging graph database 230 to track and manage users' learning progress, providing a comprehensive overview of learner achievements and areas for improvement.

According to alternative examples, accessibility module 255 ensures learning platform 200 accommodates diverse learners' needs, such as those with disabilities or language barriers, by incorporating features like adjustable font sizes, screen readers, closed captioning, and multi-language support.

According to alternative examples, career development and job placement services module integrates with external services to provide job market trend analysis, personalized career recommendations, resume building, interview preparation, and job placement support, aligning learners' educational goals with their professional aspirations.

According to alternative examples, advanced instructional design subsystem 215 produces course details, including Learning Objectives, Assessments, Prerequisites, Reading Materials, Assignments, Lecture Notes, and Personalized Content based on user preferences, ensuring coherent, relevant, and pedagogically sound content.

According to alternative examples, learning unit creation module utilizes generative AI materials to create learning content for various delivery types, including text, audio, video, augmented reality, virtual reality, and interactive simulations, enhancing the learning experience by catering to diverse learning preferences and styles.

According to alternative examples, a module for linking prerequisites and related content establishes connections between relevant learning units, ensuring learners have the necessary foundational knowledge before advancing to more complex topics.

According to alternative examples, a module for decaying and deleting unused pathways manages the efficiency and costs of the database by removing learning pathways that have not been traveled over a specified period, optimizing the overall performance and storage utilization of the system.

According to alternative examples, content import module retrieves existing educational content from various sources and incorporates it into the learning units, reducing the need for generating new content when suitable materials are already available.

According to alternative examples, LMS deployment module allows learning content to be exported and deployed to external Learning Management Systems via standards such as xAPI or SCORM, facilitating seamless integration with other educational platforms and systems.

According to alternative examples, interactive AI tutor 270 module enhances teacher and mentor support module 285 by providing personalized guidance, feedback, and mentorship throughout the learning process, simulating human-like engagement and support.

According to alternative examples, immersive storytelling module 291 leverages AI large language model 210 or another advanced language model to generate contextually relevant and engaging stories that intertwine with the learning content, creating immersive narratives that adapt to interests and experiences of individual learners.

According to alternative examples, emotional intelligence module 292 detects and responds to users' emotions to enhance the learning experience, integrating emotional intelligence and empathy into the AI-driven tutoring component for a more personalized and empathetic learning experience.

According to alternative examples, ethical and moral framework module 290 provides content and activities that encourage the development of ethical reasoning and moral values, integrating ethical and moral teaching alongside academic subjects for a more well-rounded education.

According to alternative examples, collaborative learning module fosters engagement, enhances the learning experience, and allows learners to interact with their peers, exchange ideas, and develop essential teamwork and communication skills through group discussions, project-based activities, and peer review.

According to alternative examples, learning analytics module 240 provides valuable insights into learners' progress, engagement, and performance, enabling educators, administrators, and learners themselves to make data-driven decisions, identify areas for improvement, and optimize the learning experience.

According to alternative examples, gamification module 294 introduces elements such as badges, points, leaderboards, and challenges to increase user motivation and engagement, making learning more enjoyable and rewarding, and which encourages users to achieve their learning goals.

According to alternative examples, offline access module 293 allows users to download content and access learning platform 200 offline, improving learning platform 200 utility for learners in remote or low-resource environments where internet connectivity is limited or unavailable.

According to alternative examples of the system, adaptive learning algorithm module 275 of learning platform 200 continuously analyzes performance, preferences, and progress of individual learners to adjust the learning experience in real-time, optimizing both the pace and content for each user, allowing for more dynamic personalization of content and learning pathways.

According to alternative examples, teacher and mentor support module 285 integrates features that facilitate communication and engagement between learners and educators, such as messaging, video conferencing, or shared workspaces, bridging the gap between AI-generated content and human mentorship, and enhancing the learning experience.

According to alternative examples, accessibility module 255 employs inclusive design principles, ensuring that learning platform 200 can be used by a diverse range of learners, including those with disabilities or language barriers, and enabling equal access to educational content.

According to alternative examples, feedback system 232 facilitates the continuous improvement of the learning content by incorporating user feedback, assisted by AI, allowing graph database 230 to infinitely scale and correct itself over time.

According to alternative examples, integration module allows for seamless integration with other educational technologies and partners, creating a foundation for the future of learning and enabling the sharing of resources, data, and educational content across different platforms and systems.

According to alternative examples, career development and job placement services module helps learners align their educational goals with their professional aspirations, providing personalized career recommendations, job market trend analysis, resume building, interview preparation, and job placement support.

According to alternative examples, advanced instructional design subsystem 215 leverages AI large language model 210 to produce course details, including Learning Objectives, Assessments, Prerequisites, Reading Materials, Assignments, Lecture Notes, and Personalized Content, ensuring that the generated content is coherent, relevant, and pedagogically sound while adapting to unique needs of individual learners.

According to alternative examples, generative AI materials module creates materials of various content delivery types, including text, images, videos, interactive simulations, virtual reality experiences, and other multimedia formats, to enrich the learning experience and accommodate different learning preferences.

According to alternative examples, LMS deployment module allows any of the learning content to be deployed to a Learning Management System (LMS) with Learning Tools Interoperability (LTI) via a standard like xAPI or SCORM, ensuring interoperability and compatibility with different LMS platforms.

According to alternative examples, prerequisite and related content auto-linking module enables the automatic linking of prerequisite and related content, helping learners to navigate the learning pathways more efficiently and effectively.

According to alternative examples, pathway decay and deletion module manages the efficiency and costs of graph database 230 by decaying and deleting pathways which are not traversed or which are traversed and traveled with less frequency over time, thus ensuring learning platform 200 remains optimized and up-to-date. In a similar manner, anything that is captured into the graph DB as info and data about the unique student learner may also be subjected to the decay and deletion module function to ensure that what LLM 210 and graph database "knows" about a particular user remains relative, fresh, and up-to-date. Essentially, the decay and deletion module function permits learning platform 200 to "forget" information learned about a particular user which is no longer important or relevant as internal thinking, goals, desires, and interests change over time for all individual learners.

According to alternative examples, emotional intelligence module 292 detects and responds to users' emotions, enhancing the learning experience by integrating emotional intelligence and empathy into the AI-driven tutoring component.

According to alternative examples, ethical and moral framework module 290 offers content and activities that encourage the development of ethical reasoning and moral values, integrating ethical and moral teaching alongside academic subjects to create well-rounded learners.

According to alternative examples, interactive AI tutor 270 simulates human-like engagement and support, providing personalized guidance, feedback, and mentorship throughout the learning process, enhancing teacher and mentor support module 285.

According to alternative examples, immersive storytelling module 291 leverages AI large language model 210 or another advanced language model to generate contextually relevant and engaging stories that intertwine with the learning content, creating immersive narratives that adapt to interests and experiences of individual learners.

According to alternative examples, gamification module 294 introduces elements such as badges, points, leaderboards, and challenges to increase user motivation and engagement, making learning more enjoyable and rewarding, and encouraging users to spend more time on learning platform 200 and achieve their learning goals.

According to alternative examples, offline access module 293 allows users to download content and access learning platform 200 offline, making it more versatile and useful in situations where internet connectivity is limited or unavailable, and improving learning platform 200 utility for learners in remote or low-resource environments.

According to alternative examples, collaborative learning module incorporates features such as group discussions, project-based activities, and peer review, fostering engagement, enhancing the learning experience, and allowing learners to interact with their peers, exchange ideas, and develop essential teamwork and communication skills.

According to alternative examples, learning analytics module 240 implements tools that provide valuable insights into learners' progress, engagement, and performance, enabling educators, administrators, and learners themselves to make data-driven decisions, identify areas for improvement, and optimize the learning experience.

According to alternative examples, accessibility module 255 ensures that learning platform 200 is accessible to learners with diverse needs, such as those with disabilities or language barriers, incorporating features like adjustable font sizes, screen readers, closed captioning, and multi-language support to make learning platform 200 more inclusive and usable for a wider audience.

According to alternative examples, multi-modal content module 282 facilitates the delivery of educational content through various formats, including text, images, videos, interactive simulations, virtual reality experiences, and other multimedia formats, accommodating different learning preferences and enhancing user engagement.

According to alternative examples, the system further includes: conversational AI engagement architecture 205 that assesses a current state of engagement for individual learners and generates relevant inquiries to achieve various goals, such as gathering information for personalization, driving goal-oriented behavior, or enhancing the user experience.

According to alternative examples of the system, conversational AI engagement architecture 205 sends messages to users at a frequency determined by their preferences and engagement levels.

According to alternative examples, the system further includes: AI-Driven calendar integration 245 that processes and contextualizes a calendar of individual learners, enabling learning platform 200 to schedule learning modules, accordingly, understand lifestyle patterns, and optimize the learning experience based on this knowledge.

According to alternative examples of the system, AI-Driven calendar integration 245 accesses and processes the calendar of individual learners, extracting relevant information about their schedule, commitments, and lifestyle patterns for scheduling and optimization purposes.

According to a particular example, there is a method, utilizing media processing and tagging module 225, for processing and tagging media files in a personalized learning platform, in which the method includes the following operations: receiving and processing various types of media files, including video, text, audio, and other multimedia content; leveraging machine learning algorithms to analyze the content of the media files and generate a set of relevant tags based on the key themes, topics, and concepts; indexing and categorizing the media files within learning platform 200 database using the generated tags; and enabling efficient search and retrieval of the media files based on the tags to support users' learning outcomes.

According to another example of the method, the machine learning algorithms are designed to scale efficiently, handling large volumes of content and continuously updating the tagging system as new media files are added.

According to another example of the method, learning platform 200 integrated feedback system 232 consists of multiple AI large language model 210 APIs with a system context that vote on the relevance of proposed changes to content based on user feedback, ensuring accurate and appropriate adjustments are made when a majority vote is affirmative, and updating graph database 230 through the generation of relevant queries by AI large language model 210.

According to another example of the method, adaptive learning algorithm module 275 of learning platform 200 analyzes performance, preferences, and progress of individual learners, continuously adjusting the learning experience in real-time to optimize both the pace and content for each user, facilitating a more dynamic personalization of content and learning pathways.

According to another example of the method, learning platform 200 advanced instructional design subsystem 215 leverages AI large language model 210 to produce course details, including Learning Objectives, Assessments, Prerequisites, Reading Materials, Assignments, Lecture Notes, and Personalized Content based on preferences of individual learners, ensuring that the generated content is coherent, relevant, and pedagogically sound while adapting to unique needs of individual learners.

According to another example of the method, learning platform 200 career development and job placement services module helps learners align their educational goals with their professional aspirations by offering features such as job market trend analysis, personalized career recommendations, resume building, interview preparation, and job placement support.

According to another example, there is a computer-implemented method for dynamically generating and refining a self-adapting knowledge graph through collaborative linguistically capable machine learning (LLM) agents.

According to one example, the method includes: (i) deploying a plurality of LLM agents to collaboratively engage in recursive operations for the development, assessment, and refinement of a knowledge graph, wherein the knowledge graph organizes educational content across varying degrees of specificity including fields, subfields, topics, chapters, and learning units.

According to one example, the method includes: (ii) enabling said LLM agents to propose new dimensions of learning content within the knowledge graph, followed by reviewing and editing these proposals through an iterative process that incorporates both autonomous agent analysis and user feedback, thereby ensuring the content's alignment with educational standards and user requirements.

According to one example, the method includes: (iii) marking points of 'purity' within the knowledge graph by the LLM agents to denote benchmarks of content integrity and reliability, and scheduling subsequent reviews at predefined intervals to maintain the currency and relevance of the educational content.

According to one example, the method includes: (iv) facilitating a symbiotic relationship between the LLM agents and the user base, wherein user feedback is systematically integrated into the recursive review and refinement process, thereby enabling the knowledge graph to adapt and evolve in response to user interactions and feedback.

According to one example, the method includes: (v) processing and incorporating new input from users, including suggestions, feedback, or complaints, through reinforcement learning mechanisms employed by the LLM agents, thereby generating new or modified learning content which is subjected to consensus voting within the LLM agent framework.

According to one example, the method includes: (vi) upon achieving a successful consensus, incorporating the new or modified learning content into the knowledge graph, thereby making it available to users, or, in the event of a failed consensus, rejecting the inclusion of said content, ensuring that only content that meets the established criteria of integrity, relevance, and educational value is made accessible.

According to another example, there is a computer-implemented method in which the recursive operations further comprise adding to the knowledge graph a data structure representing the newly refined educational content and associated prerequisites and post-requisites, enhancing the depth and breadth of the learning content available within the knowledge graph, and enabling users to navigate through a comprehensive and interconnected educational landscape.

According to one example, the method includes: utilizing the marked points of 'purity' as triggers for the LLM agents to re-evaluate the knowledge graph at the scheduled intervals, ensuring continuous improvement and adaptation of the educational content in alignment with emerging educational trends, standards, and user feedback.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with the examples of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

What is claimed is:

1. A learning platform including a neural network with weighting parameters trained on unlabeled text using self-supervised learning, comprising:

processing circuitry;

non-transitory computer readable media storing instructions that, when executed by the processing circuitry of the learning platform, the instructions configure the processing circuitry to:

maintain, by the processing circuitry, a graph database describing student learners subscribed to educational content provided by the learning platform;

obtain, by the processing circuitry, new student learner data about a new student learner subscribed to the educational content provided by the learning platform;

generate, by the processing circuitry using the neural network, self-written loading code to load the new student learner data into the graph database within new nodes and with new relationships with directionality between the new nodes and having metadata parameters within the new nodes describing the new student learner data;

load the new student learner data into the graph database using the self-written loading code;

receive, by the processing circuitry, input from the new student learner as an engagement with the educational content provided by the learning platform;

self-modify the graph database responsive to receipt of the input from the new student learner, wherein to self-modify the graph database, the instructions further configure the processing circuitry to:

extract, by the processing circuitry, new learnings about the new student learner from the input from the new student learner, generate, using the neural network, new self-written loading code to load the new learnings about the new student learner into the graph database in association with one or more of the new nodes for the new student learner, and load the new learnings into the graph database using the new self-written loading code;

receive, by the processing circuitry, an inquiry from the new student learner in a natural human language format;

responsive to receipt of the inquiry from the new student learner, generate, by the processing circuitry using natural language processing of the neural network, a self-written query to the graph database based on the inquiry received from the new student learner, extract, by the processing circuitry using the self-written query to the graph database, at least a portion of the new student learner data and the new learnings about the new student learner from the graph database, and further responsive to receipt of the inquiry from the new student learner, modify, by the processing circuitry and using the neural network, a learning unit from the educational content provided by the learning platform to contextualize a response from the new student learner using at least the portion of the new student learner data and the new learnings about the new student learner extracted from the graph database; and output, by the processing circuitry, the response contextualized using at least the portion of the new student learner data and the new learnings about the new student learner extracted from the graph database.

2. The learning platform of claim 1, wherein the instructions further configure the processing circuitry to:
- self-generate, by the processing circuitry using the neural network, graph database compliant queries to extract the new student learner data and the new learnings about the new student learner from the graph database;
- provide the new student learner data and the new learnings about the new student learner extracted into a large language model of the learning platform;
- generate, by the processing circuitry using the large language model, a modified learning unit for the new student learner based on the contextual input provided to the large language model; and
- return, by the processing circuitry, the modified learning unit to the new student learner.

3. The learning platform of claim 1, wherein the instructions further configure the processing circuitry to:
- self-generate, by the processing circuitry using a large language model, graph database queries to load the new student learner data within the new nodes and the new relationships into the graph database.

4. The learning platform of claim 1, wherein the instructions further configure the processing circuitry to:
- receive, by the processing circuitry, the input from the new student learner as the engagement with the educational content provided by the learning platform by receiving at least one of:
- a natural language question from the new student learner;
- an interaction with educational content requesting additional detail about sub-disciplines of the educational content;
- a natural language narrative from the new student learner about educational objectives;
- the natural language narrative from the new student learner about career objectives; and
- feedback from the new student learner regarding an issue encountered with the learning platform or an issue with the educational content provided by the learning platform.

5. The learning platform of claim 1, wherein the instructions further configure the processing circuitry to:
- contextualize, by the processing circuitry and using a large language model, the learning unit from the educational content provided by the learning platform based at least in part on one or more of:
- an age of the new student learner;
- a gender assessed by the learning platform for the new student learner,
- a career path for the new student learner;
- an assessment of sentiment by the learning platform of the new student learner;
- an objective academic assessment by the learning platform of the new student learner in the learning unit contextualized by the large language model and returned as output to the new student learner; or
- an assessment of academic interests detected by the learning platform using the new learnings about the new student learner.

6. The learning platform of claim 1, wherein the instructions further configure the processing circuitry to:
- implement an adaptive and scalable AI-driven personalized learning platform for the student learners subscribed to the educational content provided by the learning platform.

7. The learning platform of claim 1, further comprising:
- a large language model that includes one or more collaborative linguistically capable machine learning LLM agents; and
- wherein the instructions further configure the processing circuitry to:
- dynamically generate and refine, by the processing circuitry using at least one of the one or more collaborative linguistically capable machine learning LLM agents, a self-adapting knowledge graph stored within the graph database.

8. The learning platform of claim 7, wherein the instructions further configure the processing circuitry to:
- deploy, by the processing circuitry, a plurality of the one or more collaborative linguistically capable machine learning LLM agents to collaboratively engage in recursive operations for development, assessment, and refinement of the self-adapting knowledge graph; and
- wherein the self-adapting knowledge graph organizes the educational content provided by the learning platform across varying degrees of specificity including one or more of fields, subfields, topics, chapters, and learning units.

9. The learning platform of claim 7, wherein the instructions further configure the processing circuitry to:
- generate, by the processing circuitry using the one or more collaborative linguistically capable machine learning LLM agents, new dimensions of the educational content provided by the learning platform within the self-adapting knowledge graph stored by the graph database by reviewing and editing the generated new dimensions of the educational content provided by the learning platform using an iterative process incorporating both autonomous agent analysis and user feedback; and
- wherein the iterative process modifies the generated new dimensions of the educational content to conform to specified educational standards and configured user preferences.

10. The learning platform of claim 7, wherein the instructions further configure the processing circuitry to:
- mark, by the processing circuitry using the one or more collaborative linguistically capable machine learning LLM agents, points of purity within the self-adapting knowledge graph defining benchmarks of integrity and reliability for portions of the educational content provided by the learning platform; and
- schedule subsequent reviews of the points of purity within the self-adapting knowledge graph at configurable intervals to maintain recency and relevance of the educational content provided by the learning platform.

11. The learning platform of claim 7, wherein the instructions further configure the processing circuitry to:
- establish, by the processing circuitry, a symbiotic relationship between using the one or more collaborative linguistically capable machine learning LLM agents and the student learners subscribed to educational content provided by the learning platform;
- wherein the symbiotic relationship includes at least the learning platform to receive user feedback from the student learners subscribed to educational content provided by the learning platform; and
- wherein the instructions further configure the processing circuitry to:
- integrate, by the processing circuitry using a recursive review and refinement process, the user feedback into the graph database enabling the self-adapting knowledge graph to self-adapt within the graph database responsive to engagements by the student learners and the user feedback.

12. The learning platform of claim 7, wherein the instructions further configure the processing circuitry to:
incorporate, by the processing circuitry, new learnings from the student learners subscribed to educational content provided by the learning platform using reinforcement learning applied to the new learnings by the one or more collaborative linguistically capable machine learning LLM agents;
wherein the new learnings include at least one or more of:
new input from the student learners subscribed to educational content provided by the learning platform;
user feedback from the student learners subscribed to educational content provided by the learning platform; and
complaints from the student learners subscribed to educational content provided by the learning platform.

13. The learning platform of claim 12, wherein the instructions further configure the processing circuitry to:
generate, by the processing circuitry, new educational content or modifications to the educational content provided by the learning platform using the new learnings; and
submit, by the processing circuitry, the new educational content or the modifications to the educational content provided by the learning platform to consensus voting using the one or more collaborative linguistically capable machine learning LLM agents.

14. The learning platform of claim 13, wherein the instructions further configure the processing circuitry to:
responsive to a failure to attain a successful consensus to accept the new educational content or the modifications to the educational content provided by the learning platform, reject, by the processing circuitry, inclusion of the new educational content or the modifications to the educational content provided by the learning platform into the self-adapting knowledge graph.

15. The learning platform of claim 13, wherein the instructions further configure the processing circuitry to:
attain, by the processing circuitry using the one or more collaborative linguistically capable machine learning LLM agents, a successful consensus to accept the new educational content or the modifications to the educational content provided by the learning platform; and
incorporate, by the processing circuitry using the one or more collaborative linguistically capable machine learning LLM agents, the new educational content or the modifications to the educational content provided by the learning platform into the self-adapting knowledge graph; and
wherein the new educational content or the modifications to the educational content provided by the learning platform becomes available to the student learners subscribed to educational content provided by the learning platform subsequent to the incorporation into the self-adapting knowledge graph.

16. The learning platform of claim 15, wherein the instructions further configure the processing circuitry to:
add, by the processing circuitry using the one or more collaborative linguistically capable machine learning LLM agents, a new data structure representing the new educational content or the modifications to the educational content provided by the learning platform with associated prerequisites and post-requisites for the new educational content or the modifications to the educational content provided by the learning platform;
wherein the associated prerequisites and post-requisites for the new educational content or the modifications to the educational content provided by the learning platform increase both depth and breadth of the new educational content or the modifications to the educational content provided by the learning platform within the self-adapting knowledge graph stored within the graph database; and
wherein new data structure representing the new educational content or the modifications to the educational content provided by the learning platform enables the student learners subscribed to the educational content provided by the learning platform to navigate through a comprehensive and interconnected educational landscape formed by the new educational content or the modifications to the educational content provided by the learning platform within the self-adapting knowledge graph.

17. A computer-implemented method performed by a learning platform including a neural network with weighting parameters trained on unlabeled text using self-supervised learning, the method comprising:
maintaining, by processing circuitry, a graph database describing student learners subscribed to educational content provided by a learning platform;
obtaining, by the processing circuitry, new student learner data about a new student learner subscribed to the educational content provided by the learning platform;
generating, by the processing circuitry using the neural network, self-written loading code to load the new student learner data into the graph database within new nodes and with new relationships with directionality between the new nodes and having metadata parameters within the new nodes describing the new student learner data;
loading the new student learner data into the graph database using the self-written loading code;
receiving, by the processing circuitry, input from the new student learner as an engagement with the educational content provided by the learning platform;
self-modifying the graph database responsive to receiving the input from the new student learner, wherein self-modifying the graph database includes:
extracting, by the processing circuitry, new learnings about the new student learner from the input from the new student learner,
generating, using the neural network, new self-written loading code to load the new learnings about the new student learner into the graph database in association with one or more of the new nodes for the new student learner, and
loading the new learnings into the graph database using the new self-written loading code;
receiving, by the processing circuitry, an inquiry from the new student learner in a natural human language format;
responsive to receiving the inquiry from the new student learner,
generating, by the processing circuitry using natural language processing of the neural network, a self-written query to the graph database based on the inquiry received from the new student learner,
extracting, by the processing circuitry using the self-written query to the graph database, at least a portion of the new student learner data and the new learnings about the new student learner from the graph database, and further responsive to receiving the inquiry from the new student learner, modifying, by the processing circuitry and using the neural network, a learning unit from the educational content provided by the learning platform to contextualize a response to the inquiry using at least the portion of the new student learner data and the new learnings about the new student learner extracted from the graph database; and outputting by the processing circuitry, the response contextualized using at least the portion of the new student learner data and the new learnings about the new student learner extracted from the graph database.

18. The computer-implemented method of claim 17, further comprising:

self-generating, by the processing circuitry using the neural network, graph database compliant queries to extract the new student learner data and the new learnings about the new student learner from the graph database;

providing the new student learner data and the new learnings about the new student learner extracted into a large language model of the learning platform;

generating, by the processing circuitry using the large language model, a modified learning unit for the new student learner based on the contextual input provided to the large language model; and returning, by the processing circuitry, the modified learning unit to the new student learner.

19. Computer-readable storage media comprising instructions that, when executed, configure processing circuitry to:

execute a learning platform including a neural network with weighting parameters trained on unlabeled text using self-supervised learning;

maintain a graph database describing student learners subscribed to educational content provided by the learning platform;

obtain new student learner data about a new student learner subscribed to the educational content provided by the learning platform;

generate, using the neural network, self-written loading code to load the new student learner data into the graph database within new nodes and with new relationships with directionality between the new nodes and having metadata parameters within the new nodes describing the new student learner data;

receive input from the new student learner as an engagement with the educational content provided by the learning platform;

self-modify the graph database responsive to receipt of the input from the new student learner, wherein to self-modify the graph database, the instructions further configure the processing circuitry to:

extract new learnings about the new student learner from the input from the new student learner, generate, using the neural network, new self-written loading code to load the new learnings about the new student learner into the graph database in association with one or more of the new nodes for the new student learner, and load the new learnings into the graph database using the new self-written loading code;

receive an inquiry from the new student learner in a natural human language format;

responsive to receipt of the inquiry from the new student learner, extract, using the self-written query to the graph database, at least a portion of the new student learner data and the new learnings about the new student learner from the graph database, and further responsive to receipt of the inquiry from the new student learner, modify, using the neural network, a learning unit from the educational content provided by the learning platform to contextualize a response to the inquiry using at least the new student learner data and the new learnings about the portion of the new student learner extracted from the graph database; and output the response contextualized using at least the portion of the new student learner data and the new learnings about the new student learner extracted from the graph database.

20. The computer-readable storage media of claim 19, wherein the instructions, when executed, further configure processing circuitry to:

self-generate, by the processing circuitry using the neural network, graph database compliant queries to extract the new student learner data and the new learnings about the new student learner from the graph database;

provide the new student learner data and the new learnings about the new student learner extracted into a large language model of the learning platform;

generate, by the processing circuitry using the large language model, a modified learning unit for the new student learner based on the contextual input provided to the large language model; and return, by the processing circuitry, the modified learning unit to the new student learner.

* * * * *